40-707
/30/86 X? RE 32,253

United States Patent [19]
Bartulis et al.

[11] E Patent Number: Re. 32,253
[45] Reissued Date of Patent: Sep. 30, 1986

[54] INTERACTIVE USER-MACHINE INTERFACE METHOD AND APPARATUS FOR COPIER/DUPLICATOR

[75] Inventors: Michael V. Bartulis, Redondo Beach; Edwin J. Smura, Los Alamitos; Richard P. Dunn, Van Nuys, all of Calif.; Herbert B. Bebb, Rochester, N.Y.; Anthony J. Ciuffini, Rancho Palos Verdes; Lionel W. Mosing, Huntington Beach, both of Calif.

[73] Assignee: Xerox Corporation, Stamford, Conn.

[21] Appl. No.: 614,191

[22] Filed: May 25, 1984 (Under 37 CFR 1.47)

Related U.S. Patent Documents

Reissue of:
[64] Patent No.: 4,332,464
Issued: Jun. 1, 1982
Appl. No.: 189,441
Filed: Sep. 22, 1980

[51] Int. Cl.[4] ..... G03G 15/00
[52] U.S. Cl. ..... 355/14 C; 340/707; 340/712; 364/900
[58] Field of Search ..... 355/14 C, 14 R, 14 D; 364/900 MS File; 340/711, 712, 707

[56] References Cited

U.S. PATENT DOCUMENTS

| | | | |
|---|---|---|---|
| 3,292,489 | 12/1966 | Johnson et al. | 340/707 X |
| 3,482,241 | 12/1969 | Johnson | 340/337 |
| 3,757,037 | 9/1973 | Bialek | 178/18 X |
| 3,898,643 | 8/1975 | Ettlinger | 340/707 X |
| 4,227,798 | 10/1980 | Steiner | 355/14 C |
| 4,274,093 | 6/1981 | Judge | 340/712 |
| 4,449,186 | 5/1984 | Kelley et al. | 364/900 |

OTHER PUBLICATIONS

*Proceedings of the International Federation for Information Processing-Information Processing 71*, 23rd-28th Aug. 1971, pp. 742-746, Amsterdam, NL.
*Institution of Electrical Engineers-Conference on Displays*, 7th-10th Sep. 1971, pp. 307-303, London, G.B.

*Primary Examiner*—R. L. Moses
*Attorney, Agent, or Firm*—Robert E. Cunha

[57] ABSTRACT

This patent describes a user interface device (UI device) used for machine control. The UI device is comprised of a video display capable of presenting desired images to the machine operator and a touch sensitive device capable of detecting operator requests by means of the operator touching the surface of the video display. A standard keyboard may also be employed when typed responses are required of the operator or for infrequent use a QWERTY keyboard may be displayed on the Display. The UI device is controlled by a general purpose computer, which also controls the on-line machine. Visual elements presented to the user on the UI device's display include instructions in text (orthographic display), and images (imaginal display). Displayed images may include and log status indicators (E.g., meters, thermometers) and buttons which the operator can touch to signal control requests. The displayed images change dynamically so that only relevant indicators and valid control buttons are presented to the user at any given time (termed "conditional disclosure"), and the display format can be changed completely upon operator request, to allow for control of infrequently used or complex features (termed "progressive disclosure"). A set of schematics and flow charts are included to complete the disclosure of the system. The resultant interactive display enables a relatively untrained operator to a control a feature-rich or complex machine system.

9 Claims, 70 Drawing Figures

(1) FUNCTIONS IMPLEMENTED THROUGH COMPUTER PROGRAMS
(2) FUNCTIONS IMPLEMENTED THROUGH DATA TABLES IN COMPUTER MEMORY

MACHINE CONTROL TASK (MT)

DISPLAY IMAGE GENERATOR TASK (DT)

TOUCH FUNCTION DECODE TASK (TT)

OPERATION OF THE MACHINE CONTROL TASK (MT)

OPERATION OF THE USER INTERFACE CONTROL TASK (UT)

OPERATION OF THE DISPLAY IMAGE GENERATOR TASK (DT)

DISPLAY IMAGE GENERATOR TASK (DT)
PROCESS OF UPDATING THE SCREEN IMAGE

DISPLAY IMAGE GENERATOR TASK (DT)
PROCESS OF ADDING AND REMOVING SCREEN ELEMENTS

OPERATION OF THE TOUCH FUNCTION DECODE TASK (TT)

INTERACTIVE USER-MACHINE INTERFACE METHOD AND APPARATUS FOR COPIER/DUPLICATOR

Matter enclosed in heavy brackets [ ] appears in the original patent but forms no part of this reissue specification; matter printed in italics indicates the additions made by reissue.

BACKGROUND OF THE INVENTION

This invention relates to human interfaces for the control of complex machinery, and more particularly, to computer controlled systems wherein the user can specify a number of operating parameters to control machine operation.

Prior art human interfaces characterized by either control panels or keyboard input systems coupled with orthographic (text) video displays. For complex control processes, the control panel becomes a large area composed of various buttons, knobs, indicator lights, and perhaps meters. This array of elements can be quite baffling to the untrained user, and is thus particularly unsuitable for the control of devices intended for casual usage such as the convenience copier.

The use of a common orthographic video display device or printer mechanism, coupled with a keyboard for user input, requires the user to interface with the computer via a dialog whose nature is determined as much by the computer's requirements for input-output protocols as by the operational requirements of the machinery being controlled. This type of user interface typically requires that the user learn a set of commands and then type these commands as required to initiate machine operations. As before, the casual user is effectively discouraged from using the system due to the difficulty of learning its control procedures.

It would be desirable, therefore, to provide a user interface having the attributes of simplicity (so that the casual user would not be discouraged from using the machine) while still offering the full extent of control capabilities required by the trained operator in order to extract full operational advantage from the machine.

SUMMARY OF THE INVENTION

In order to meet these requirements, a unique user interface device (UI device) is offered which is capable of simulating a control panel through the mechanisms of imaginal display and touch screen function selection. A bit-mapped CRT display is used in conjunction with a computer system and special refresh electronics (Ref: U.S. Pat. No. 4,103,331) to present the image of a control panel to the user. Buttons displayed in the image are positioned to correspond with coordinates points within an infrared emitterdetector diode matrix placed around the periphery of the screen and capable of detecting a touch of the screen by the user's finger or similar instrument. In this manner, the user is able to react to the screen display as if it were an actual panel of buttons. Additionally, orthographic (text) data appears on the screen to label the buttons and to provide other information as needed, and imaginal (picture) images are displayed to convey information commonly presented through meters and dials on conventional control panels.

The display scenario for a given machine control application typically consists of multiple distinct display formats termed "frames". The initial frame presented to the user controls only the basic functions of the machine, and additionally presents one or more buttons as appropriate to select special features. When the user selects one of the special feature buttons, the basic frame is replaced by a new frame displaying the controls corresponding to that special feature plus a "RETURN" button used to return to the basic frame after the special control requests have been entered. Further, a special frame can include additional special feature buttons to select still deeper levels of control functions on additional frames. Thus a tree structure is realized wherein the user who requires special features works his way down the branches of the tree (i.e., calls up deeper frames) to reach whatever level of control his application requires. A principle advantage of this system of "progressive disclosure" is that the casual user sees only the relatively simple basic frame, and, when additional features are required, only the controls and indicators revelant to the required features are displayed as the necessary additional frames are called up.

Individual frames implement a "conditional disclosure" feature whereby display elements in the form of buttons, indicators or alphanumeric material are removed from the display whenever their functions are not valid to the current state of the process. For example, a ten digit touch pad, similar to the ubiquitous telephone "touch-tone" pad, appears on the screen whenever the entry of numerical data is a legitimate user operation and disappears when numerical data is not needed.

The system comprises a computer or processor which communicates with the User Interface (UI) through a set of circuits herein called the User Interface Logic (UIL) to display to the operator a set of images and messages, and also communicates with the host system to command the system functions received from the User Interface.

The described embodiment comprises a CRT as the interactive display unit, but any two dimensional display hardware, such as plasma tubes, electrophoretic displays, liquid crystals, rear projection devices, and randomly selectable film strip projectors could be used.

DESCRIPTION OF THE PREFERRED EMBODIMENT

Figure 1:
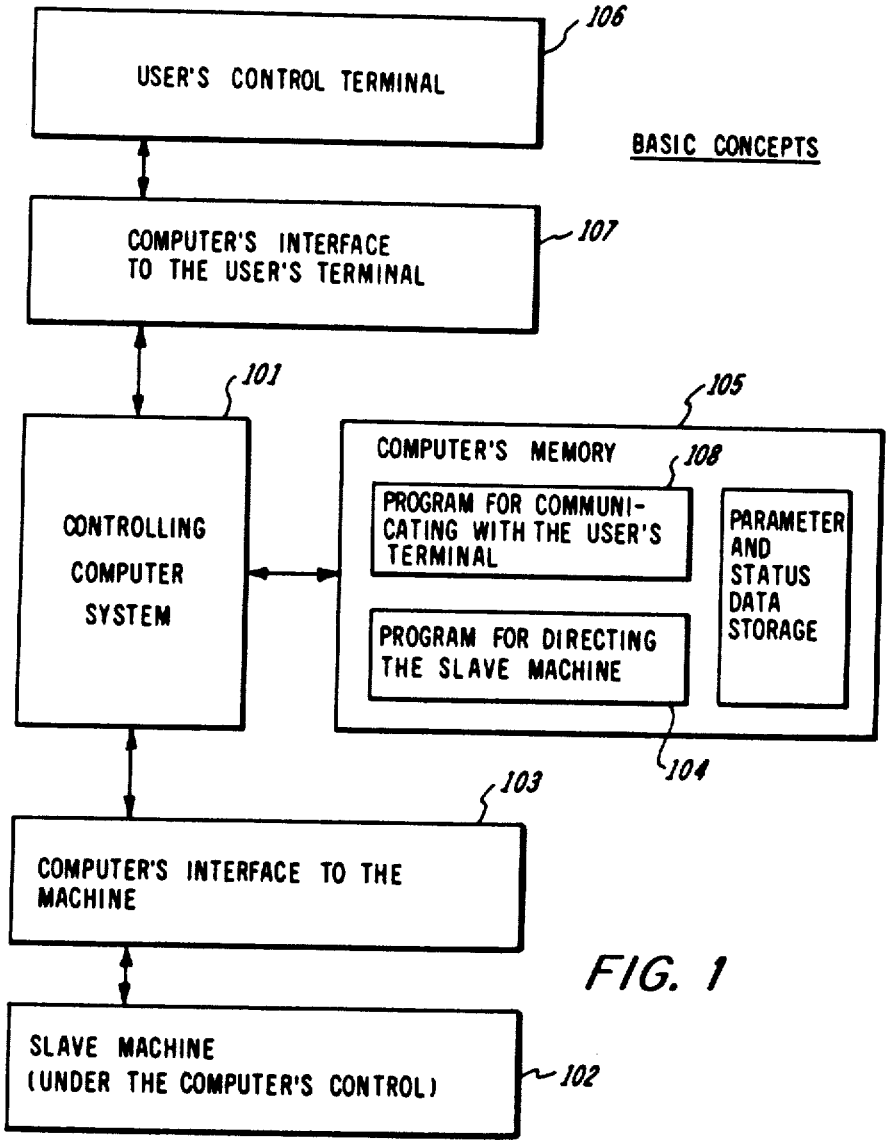
FIG. 1 is a block diagram representation of the basic computer controlled machine concept typical of the state of the art.

Referring to FIG. 1, a computer controlled machine system with user interface of the general case is shown. In this common embodiment, the computer system 101 is interfaced to the machine 102 through interface hardware 103 and is programmed to control the machine through one or more computer programs 104 residing in the computer's main memory or in the computer's microcode 105. The user's interface to the computer is typically through a terminal 106, such as a CRT display with keyboard, interfaced to the computer through interface hardware 107. In this implementation, the computer program for the user's interface 108 communicates with the user by displaying output at the display station of the user's terminal 106, and by accepting input commands typed by the user on the terminal's keyboard. The present invention replaces the User's terminal with a complex user interface device (UI device), but the keyboard may be retained to be used by the operator for any purpose. For example, some displays may request information from the operator which may more easily be supplied by a keyboard. Alphanumeric information for instance, would be conveniently enterable by keyboard. If a keyboard were to be used in conjunction with the display described herein, it would be coupled to the computer or to the display in any well-known manner.

Figure 2A:
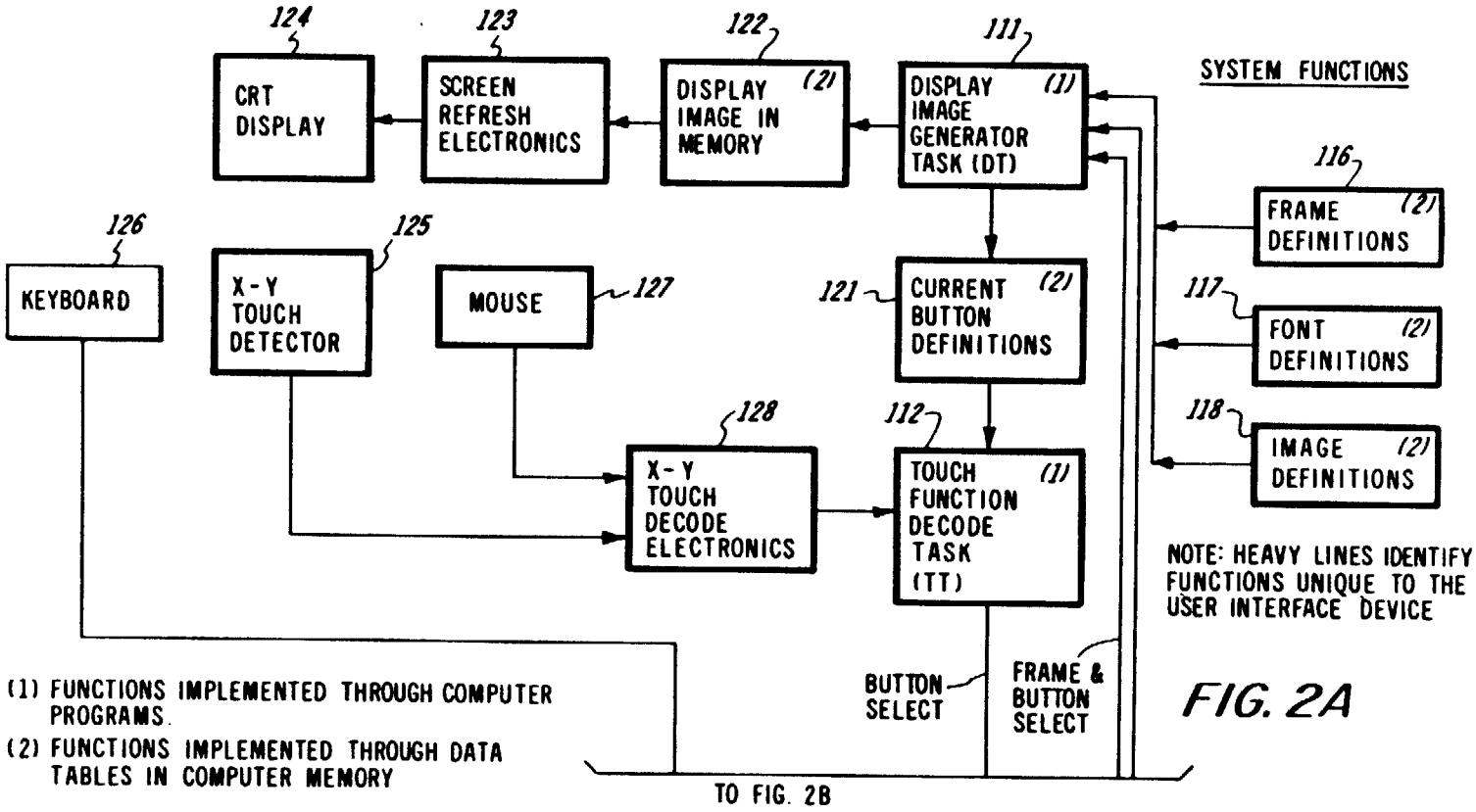
FIG. 2 is a block diagram representation of the system functions present in the computer controlled system of the present invention.
Figure 2B:
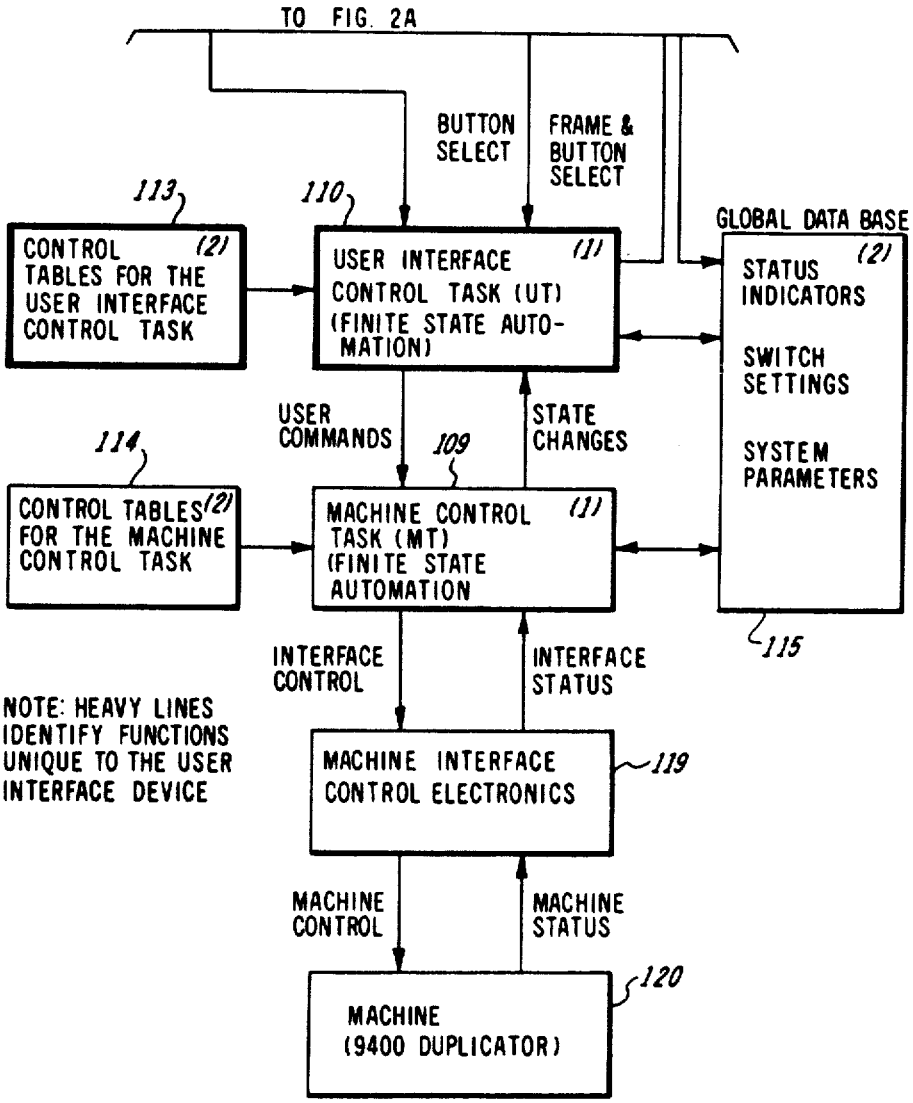

FIG. 2 shows a computer controlled machine system employing the present invention (UI device). Functions unique to the UI device are shown in heavy lines to emphasize the area of the invention. The program functions of Machine Control 109, User Interface Control 110, Display Image Generation 111, and Touch Function Decode 112 are Task implementations as described in U.S. Pat. No. 4,103,330 (TASK HANDLING IN A DATA PROCESSING APPARATUS, Charles P. Thacker, July 25, 1978). The two main tasks, User Interface Control 110 and Machine control 109, are finite state machine implementations, driven from Tables 113 and 114 respectively.

The electronic and program functions of the Machine Control Task 109, the Machine Interface Control Electronics 119, and the Machine itself, 120 (a Xerox 9400 duplicator for the preferred embodiment), are neither unique implementations nor part of the UI device. However, for completeness of the embodiment these functions are now described.

Figure 3:
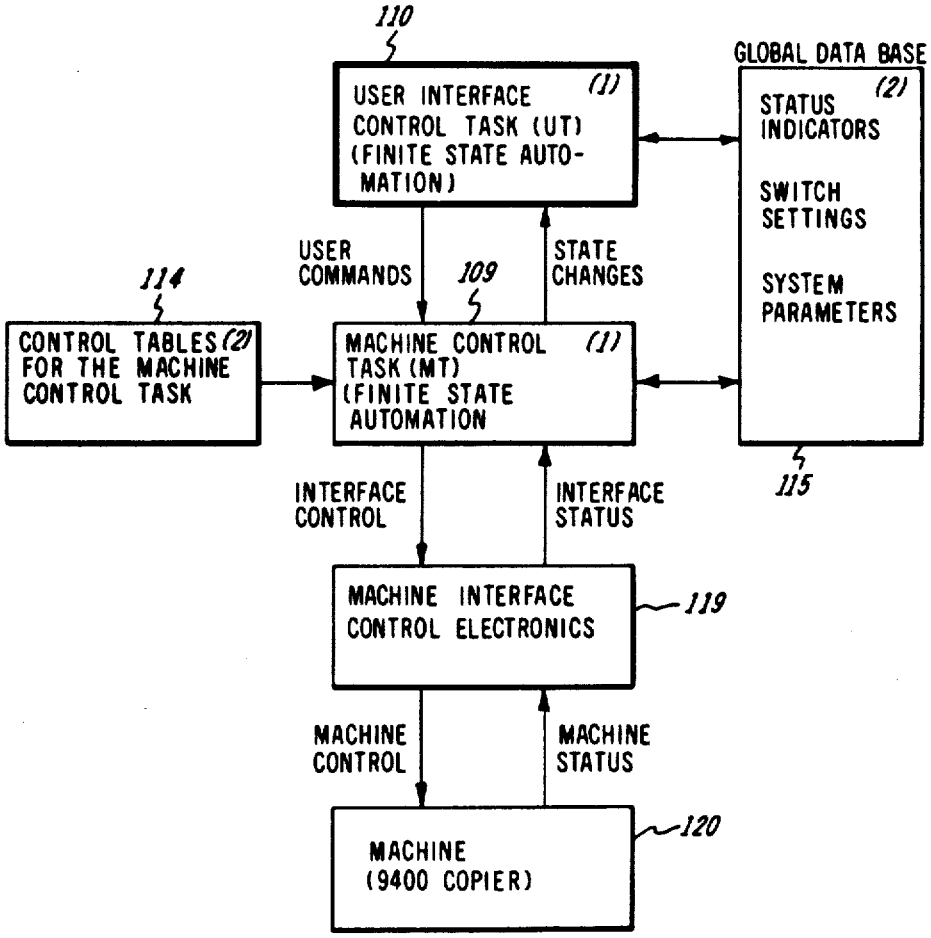
FIG. 3 is a functional block diagram representation of the Machine Control Task (MT), which directly controls the Machine functions.
Figure 7:
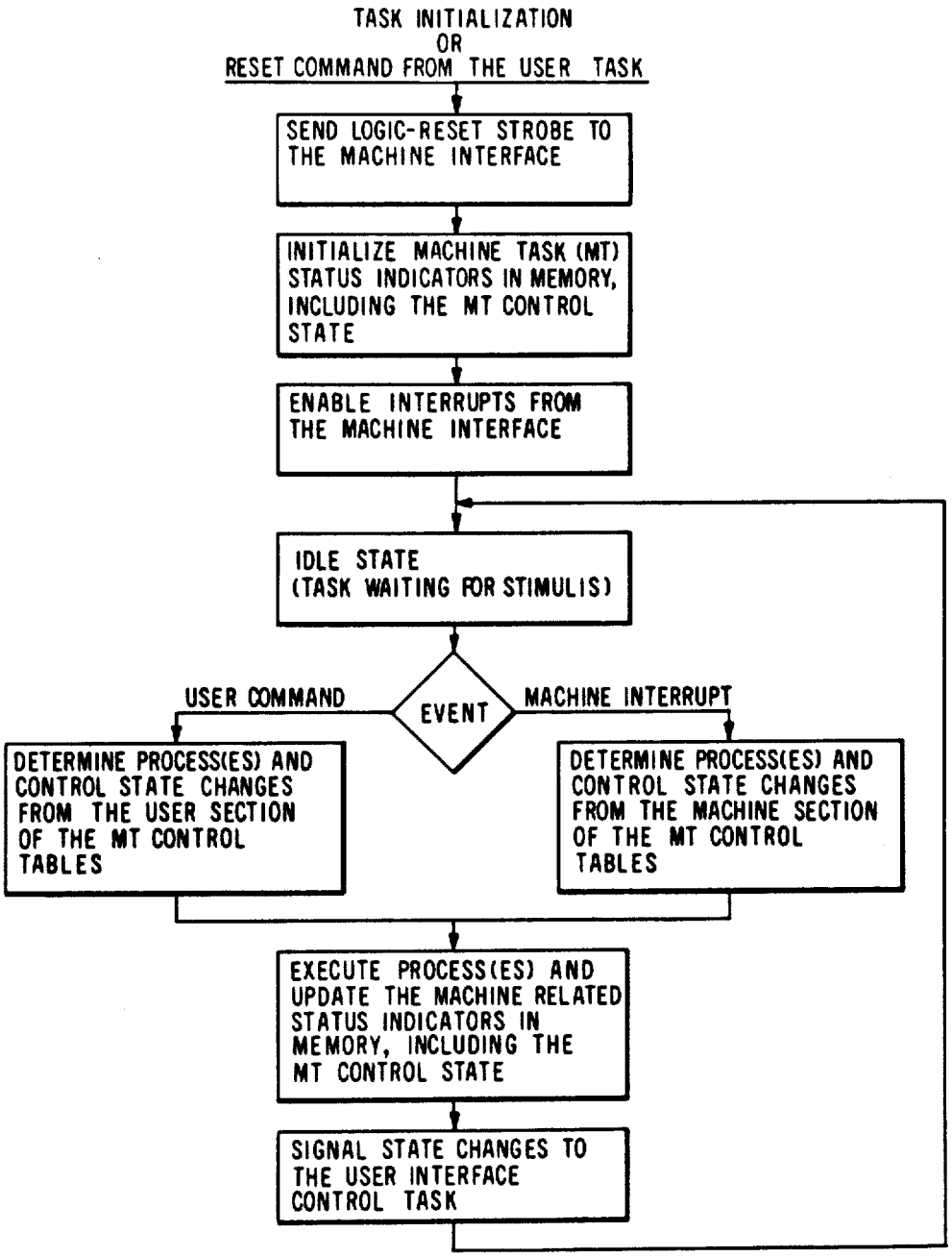
FIG. 7 is a flow chart representation of the operations performed by the Machine Control Task (MT).

The Machine Control Task 109 and related electronic functions including the Machine 120 and its Interface, are shown in FIG. 3 and FIG. 7. FIG. 3 is a block diagram showing the functional relationships between the Machine Control Task (MT) 109 and the other system elements with which the MT interacts. When the system is started the MT begins executing the process shown in FIG. 7. First, the MT performs the reset function to the Machine via the Machine interface in order to assure that the Machine state is known and controlled. MT status words in memory are initialized, and the MT is now in its general idle state waiting for instructions from the User Interface Control Task (UT) 110, or after the Machine is running, for signals (interrupts) from the Machine via its Interface 109. When a user command or machine interrupt is received, the MT determines the action(s) to be taken from its control tables 114, and executes the process(es) and updates its state indicators as appropriate. Significant changes in machine status, as defined in the control tables 114, are signalled back to the UT 110 so that the display can be updated quickly.

Figure 4:
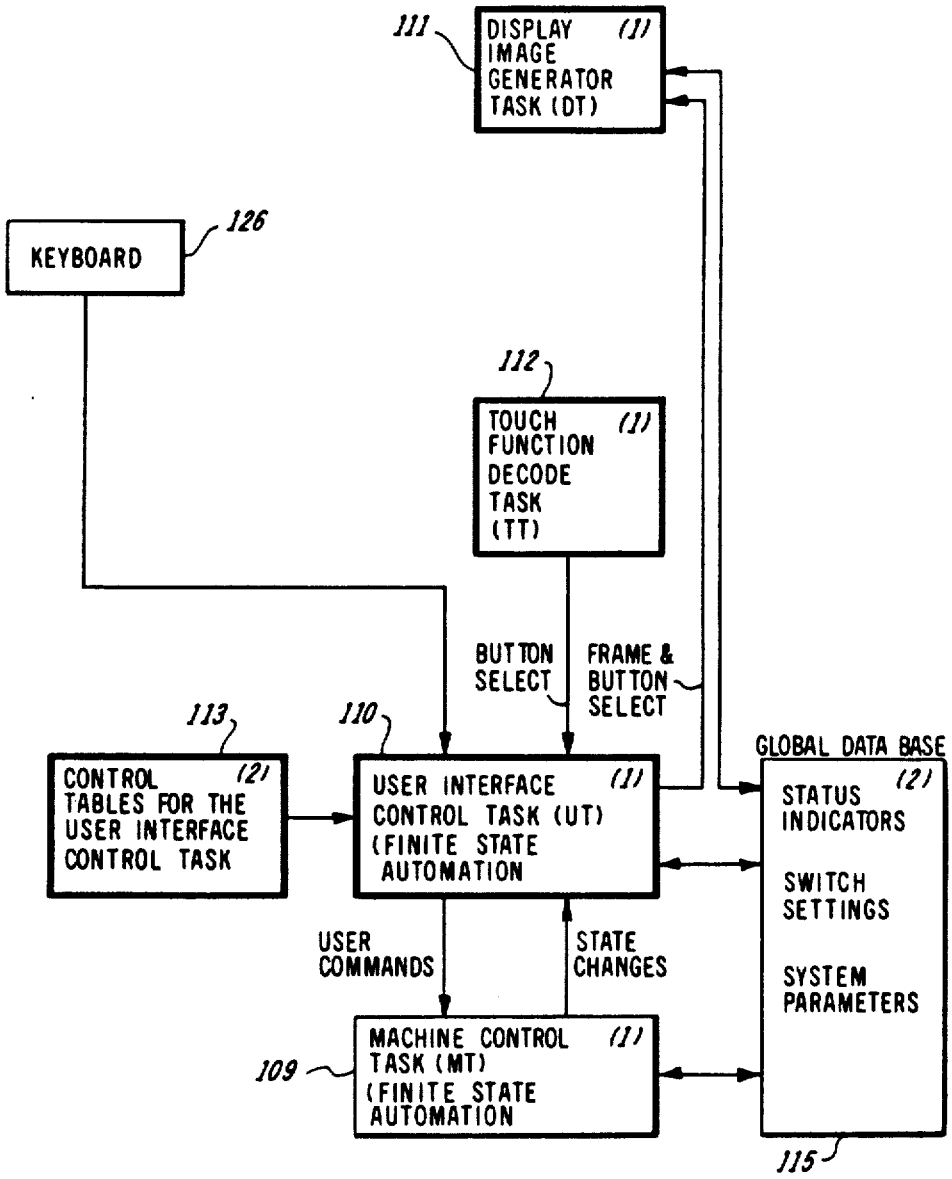
FIG. 4 is a functional block diagram representation of the User Interface Control Task (UT), which controls interaction with the System User and instructs the Machine Control Task.
Figure 8:
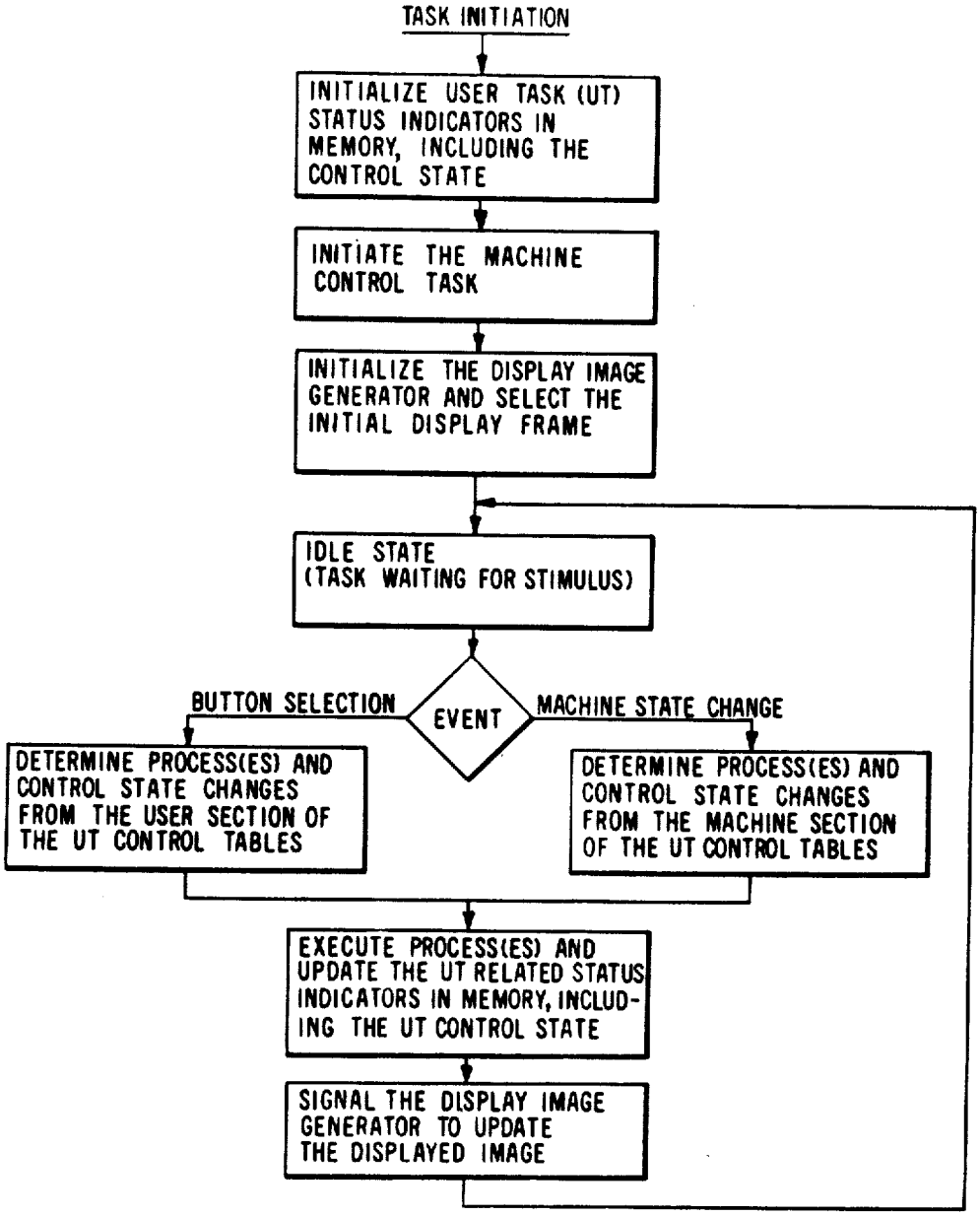
FIG. 8 is a flow chart representation of the operations performed by the User Interface Control Task (UT).

The present invention is that of the unique user interface Device (UI device) that has been developed to interface the Machine Control Task 109 with the system user. A block diagram of the UI device functions are shown in FIG. 4. Control of the UI device resides in the User Interface Control Task (UT) 110. Operation of the UI device begins with power-on to the system, and results in the UT 110 performing the functions shown in FIG. 8. At initialization, the UT 110 initializes its status indicators in memory and sees that the Machine Task 109 is also initialized. (If there is a poweron sequence, the MT will have initialized itself. If not, the UT will cause the MT to initialize). The UT is table driven from its associated Control Tables 113, and from these tables it determines the initial frame to be presented to the user and signals that frame's identification (as an index number) to the Display Image Generator Task (DT) 111. The DT will bring up the display frame automatically from this point, and is described separately below. The UT is now in an idle state, waiting for either operator activity to be signalled from the Touch Function Decode Task (TT) 112, (or possibly from an attached optional keyboard 126), or for machine state changes to be signalled from the Machine Control Task (MT) 109, (although the latter will only happen after the machine has been started). From this point on, operation is repetitive with user commands arriving from the TT 112, the command being executed by the UT 110 through directions from its control tables 113, and with status words being maintained in the Global Data Base (GBD) 115 to reflect the state of the system. The UT 110 controls directly the MT 109 and the DT 111 through software service calls, and the rest of the process indirectly through the indicators it sets in the GDB 115.

The Global Data Base (GDB) 115 is employed to hold the status indicators, switch settings, and system parameters needed to define the software operating states of the system, and to facilitate communication between the various software tasks and processes that make up the programmed functions of the system.

Figure 5:
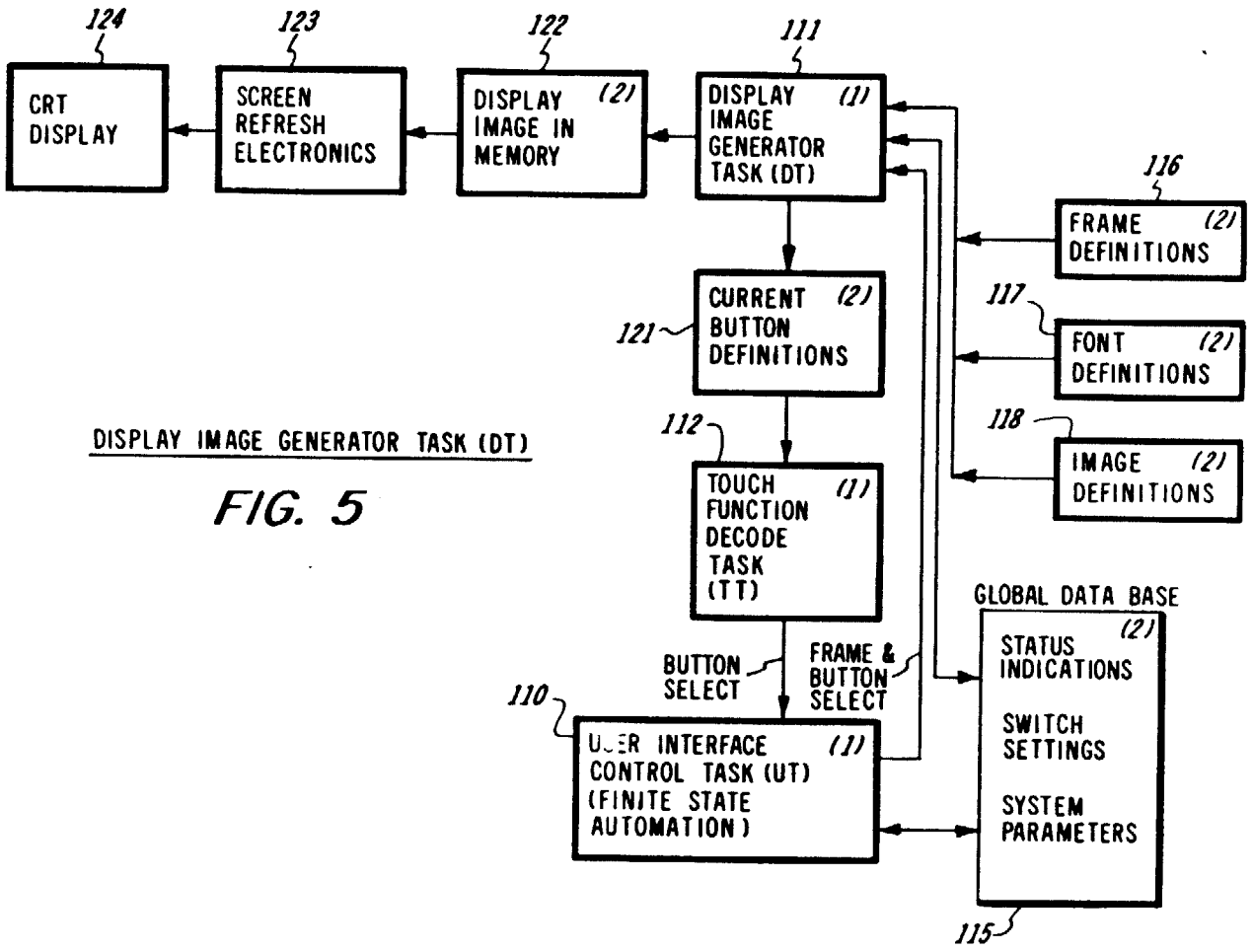
FIG. 5 is a functional block diagram representation of the Display Image Generator Task (DT), which controls the displayed image presented to the System User.
Figure 9:
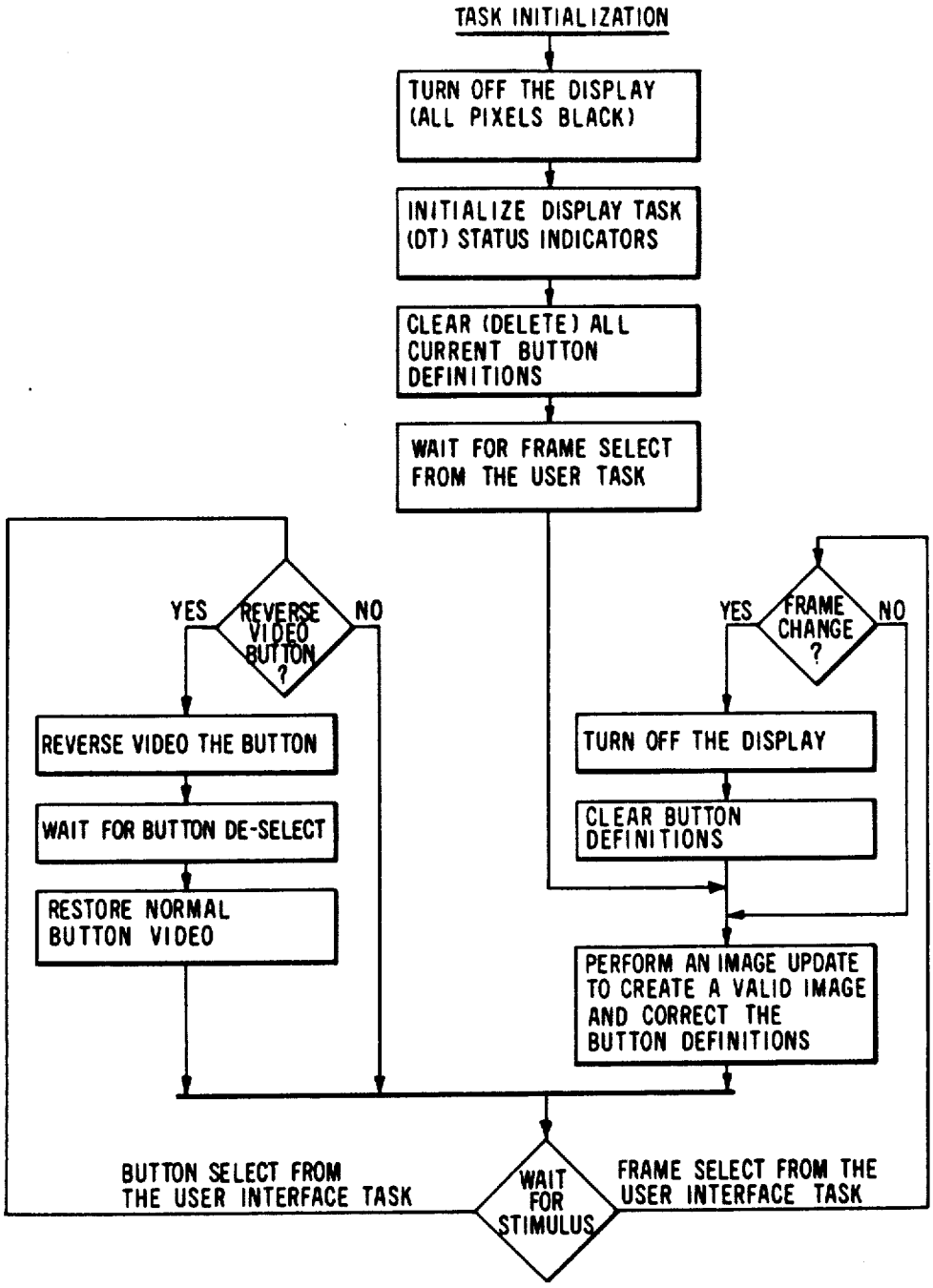
FIG. 9 is a flow chart representation of the operations performed by the Display Image Generator Task (DT).
Figure 10:
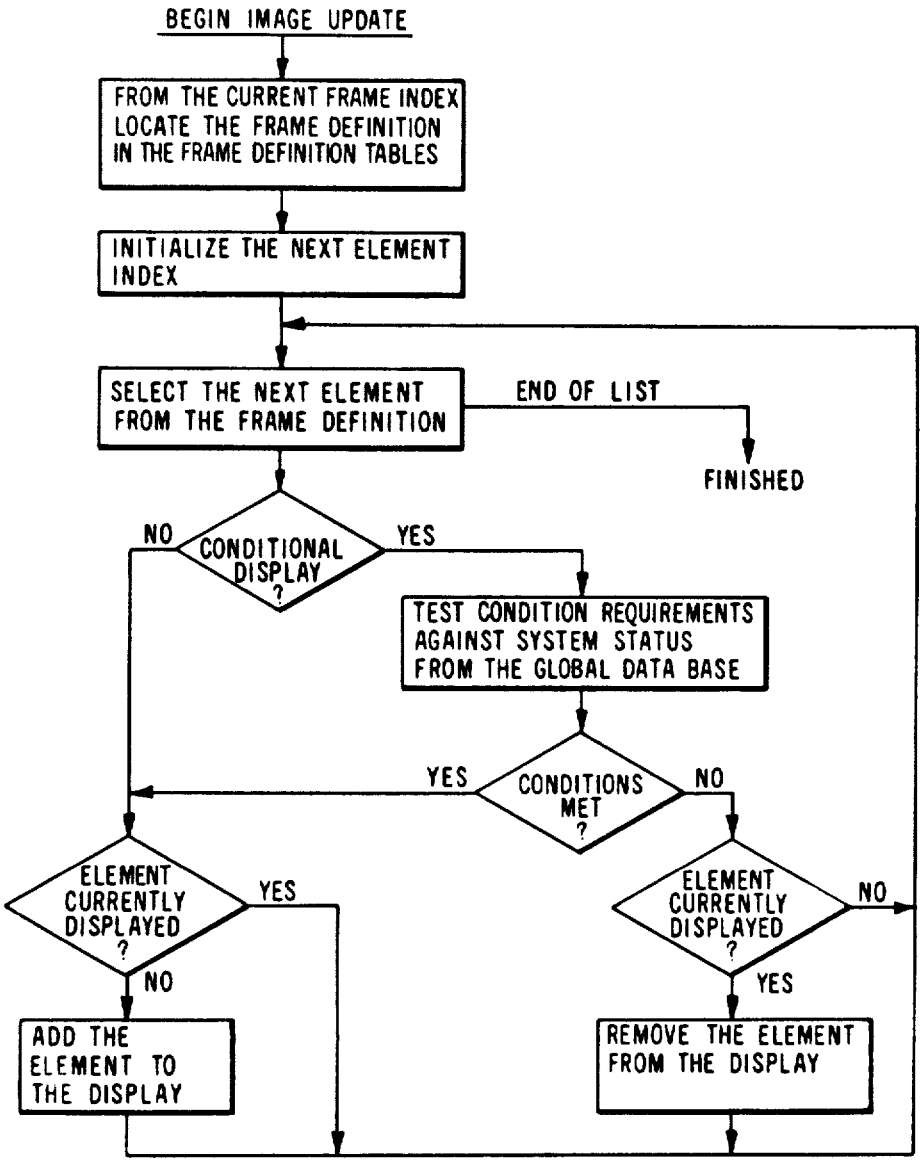
FIG. 10 is a flow chart representation of the process of updating the Display Screen image.
Figure 11:
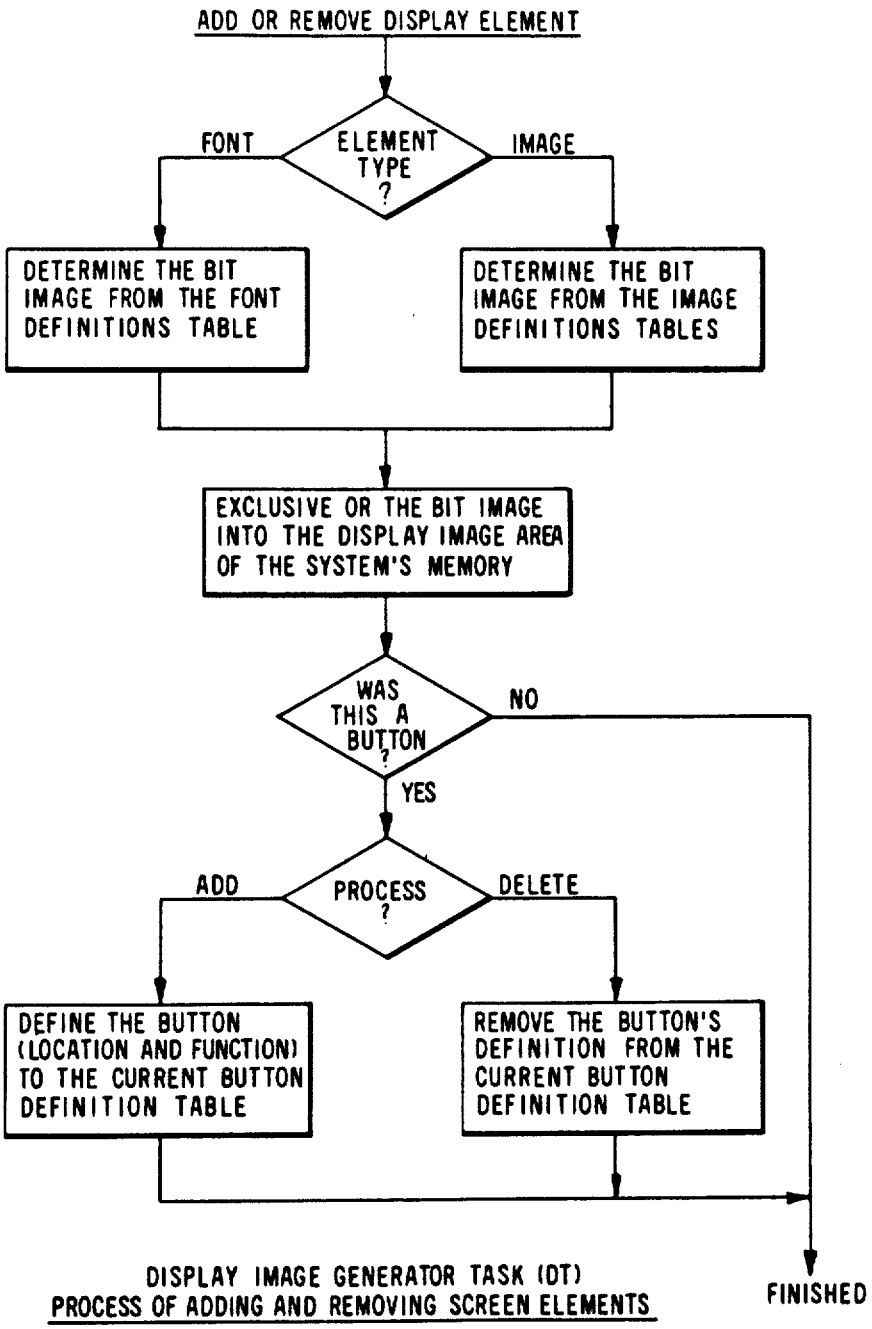
FIG. 11 is a flow chart representation of the process of adding and removing Screen Elements.

The functional organization of the display portion of the UI device is shown in block diagram format in FIG. 5. The Display Image Generator Task (DT) 111 is the main software element driving the display, and its functions are shown in FIG. 9, FIG. 10, and FIG. 11. Referring to the block diagram FIG. 5. The User Interface Control Task (UT) 110 signals the Display Image Generator Task (DT) 111 with the index number of the frame that should be seen by the system user at that point in time. The DT 111 accesses the Frame Definition tables 116 to discover the makeup of the frame, the makeup being defined in terms of a series of Screen Elements (SE) to be positioned at various points on the CRT 124. The SE's exist as orthographic data (text characters) or imaginal data (images formed of bit patterns), and are defined to the DT 111 through the Font Definitions 117 for the orthographic characters and through the Image Definitions 118 for the imaginal images.

The DT 111 follows the Frame Definitions 116 to position orthographic and imaginal images on the screen. The actual display of the data is accomplished through creation of a bit image of the desired CRT image, pixel for pixel, into the Display Image area of the system's memory 122. The hardware display process then reads the pixels from memory and modulates the CRT beam as it scans in real time. This display system is patented separately in U.S. Pat. No. 4,103,331 (Charles P. Thacker, July 25, 1979).

In the creation of the display image by the DT 111, the existence of buttons on the screen for the user to "press" is particularly important, since the detection of a user touch must subsequently be decoded from an X-Y coordinate system used by the touch detect hardware (described below) to a functional signal for use by the User Interface Control Task 110. The operation of the Touch Function Decode Task in decoding the function from the X-Y coordinates of the user's touch is described separately below. To facilitate this decoding, the DT 111 maintains a table in memory of Current Button Definitions 121. When a button's image is formed for screen display, the button's screen coordinates and function are placed into the Current Button Definitions table 121, and when the button is removed from the screen its definition is removed from the table. Because of this, a touch of the screen can quickly be validated as a function request and the function readily decoded.

Referring to FIG. 9: The Display Image Generator Task (DT) 111 initializes by blacking out the display and resetting all indicators, including the button definitions. When a frame select message is received from the UT 110 the DT proceeds to perform an image update process (described below) which will result in the frame image appearing on the CRT display. The DT is now in its normal idle state, and will respond to certain stimulus conditions. A new frame select from the UT 110 will result in an image update process, which may or may not involve a frame change. A button select from the UT 110 (FIG. 5) says that the user has touched a screen button and that the UT is now responding to that button, the usual result being that the DT will reverse video the button on the screen in order to provide sensory feedback to the user (although the Frame Definitions 116 may be set to defeat the reverse video in certain instances). When the touch is removed, or the UT process completed, the UT signals button de-select to the DT and the button's image is returned to normal video.

Figure 13:
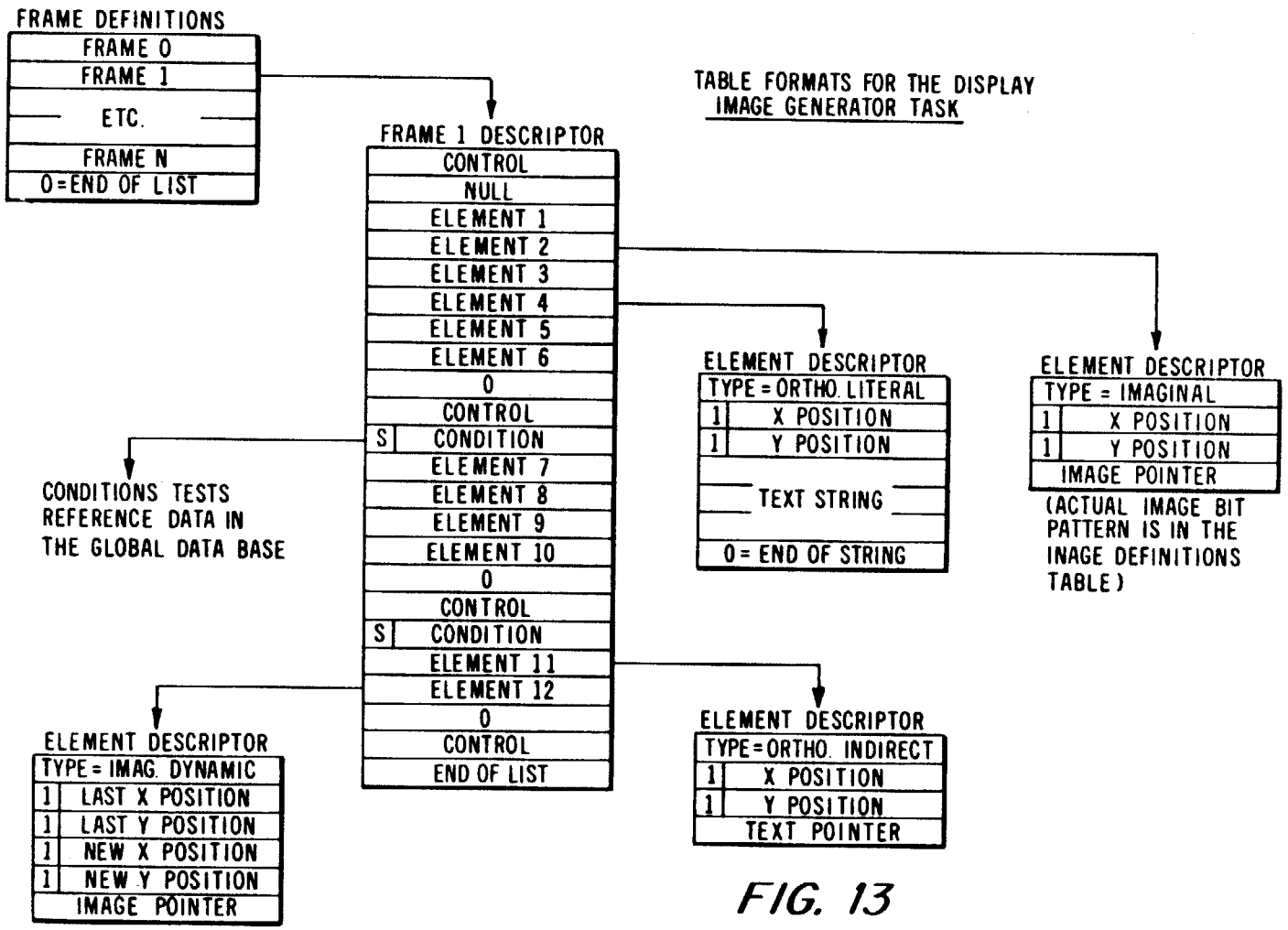
FIG. 13 shows the software table structure used to define the various frame formats to the Display Image Generator Task.

Referring to FIG. 10, the process of updating the screen image is disclosed. The description of the frame to be displayed is addressed within the Frame Definitions 116, and the frame is then created as shown. The format of the tabled frame definitions are shown in FIG. 13. The DT 111 works through the frame descriptor (FIG. 13), evaluating the conditional tests when they occur by testing the values of the status indicators in the Global Data Base 115. If the test results in a false indication, the defined elements are skipped. If the test results in a true indication, the defined elements are included in the screen display image in memory.

The process of adding and removing screen elements is dislosed in FIG. 11. If the element is Font (character) data its bit image is determined from the Font Definitions 117 (FIG. 5). If the element is an image (such as a button), its bit image is determined from the Image Definitions 118. Regardless of whether the image is being added or removed, the element's bit image is exclusive-or'ed into the Display Images area of the system's memory. If the element was already present, the exclusive-or process effectively removes it by resetting the bits that had originally defined it. If the element was not already present, the exclusive-or sets the defining bits and the image now appears on the screen. Note that if the element is a button, the Current Button Definitions 121 will be updated to reflect the new state of the displayed button set.

Figure 6:
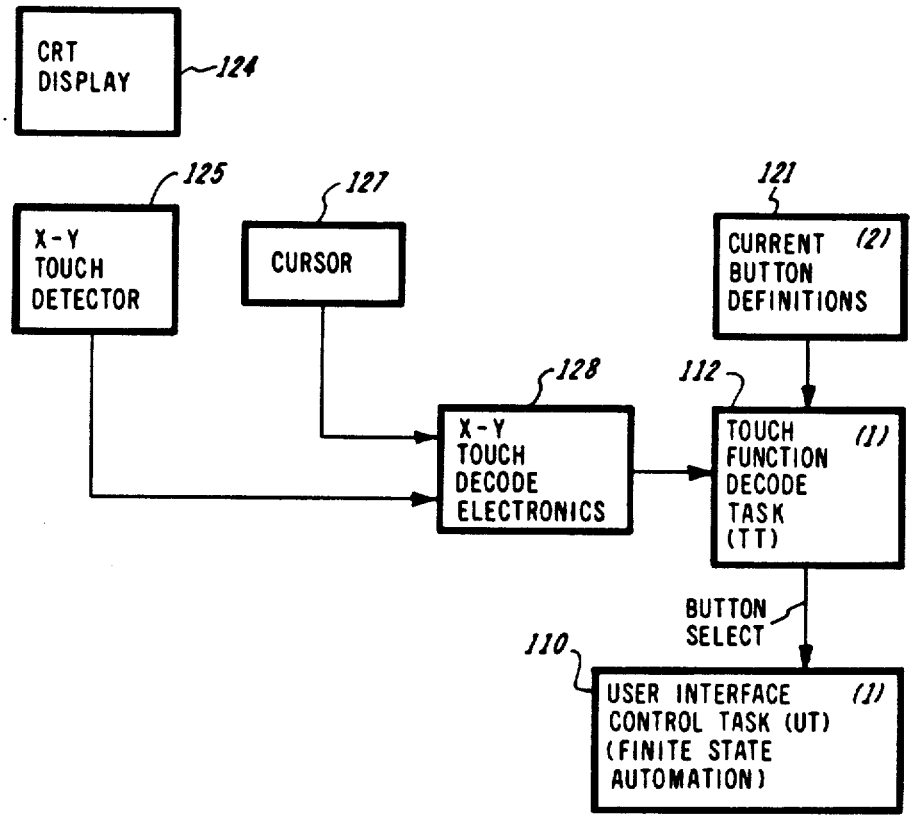
FIG. 6 is a functional block diagram representation of the Touch Function Decode Task (TT), which decodes System User requests from the touch screen or other System User pointing devices.

Referring to FIG. 6: User input to the User Interface Control Task 110 is accomplished (normally) through the action of the user touching the CRT screen at a point where the Display Image Generator Task 111 has displayed the image of a button. The presence of the user's finger is detected by a two dimensional array of infra red diodes (transmitters and detectors). This is the X-Y Touch Detector 125, which detects the finger as an X intercept and Y intercept of the infrared beam matrix. The X-Y Touch Decode Electronics 128 report the interception to the Touch Function Decode Task (TT) 112 as an intercept at an X-Y position within the Touch Detector's 125 coordinate system. The TT 112 decodes the X-Y intercept to a function request by inspecting table entries in the Current Button Definitions 121. The function requested is then signalled to the User Interface Control Task (UT) 110 for processing. (As a follow-on, the UT 110 may then signal the Display Image Generator Task (DT) 111 to reverse video the intercepted button, as described above in the discussion on the operation of the DT 111).

Additionally, the function of the X-Y Touch Detector 125 can be circumvented in cases where touching the screen is not appropriate as a user action, or where the operation of the diode matrix would not be reliable for environmental reasons. In these cases, a cursor control device 127 is used to position a cursor image on the screen. The cursor can then be moved by moving the cursor control 127 to select the button functions. The X-Y Touch Decode Electronics unit 128 serves as the cursor control interface, and operates in the same manner as described above with respect to button select identification from the Current Button Definitions 121.

Figure 12:
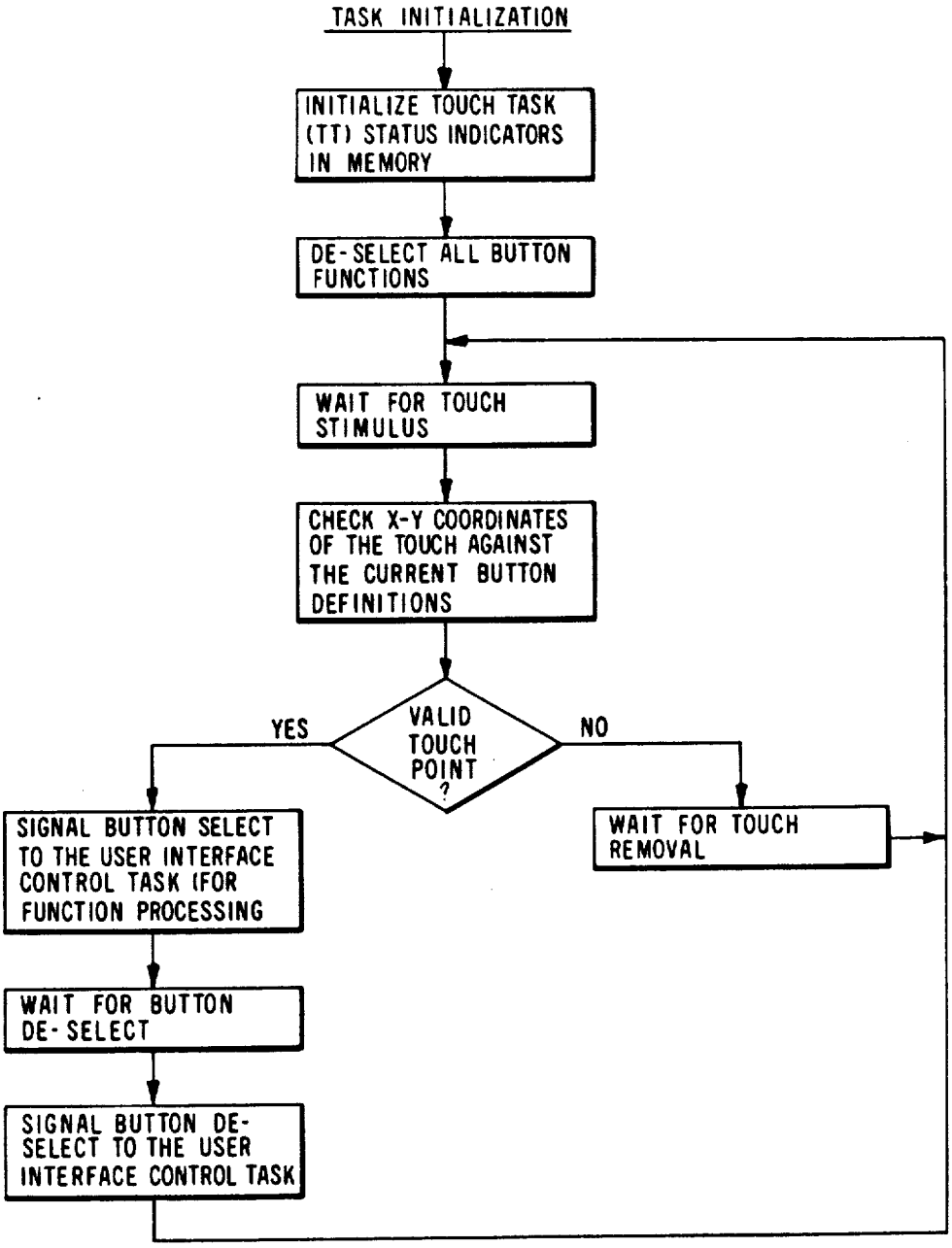
FIG. 12 is a flow chart representation of the operations performed by the Touch Decode Task (TT).

Operation of the Touch Function Decode Task (TT) 112 is shown in FIG. 12. At initialization, the TT 112 resets its status indicators and then waits for the X-Y Touch Decode Electronics unit 128 to signal the X-Y coordinates of a screen touch. When a touch coordinate is received, the TT 112 inspects the Current Button Definitions 121 to identify the button touched. If no button is registered as belonging to the touch coordinates, the TT 112 waits for the touch to be removed and then re-enters its idle state. If a valid button definition is identified as belonging to the touch coordinates, the TT 112 signals the event to the User Interface Control Task (UT) 110. When the button is de-selected (touch removed), that event is also signalled to the UT 110, and the TT 112 then re-enters its idle state.

Figure 14:
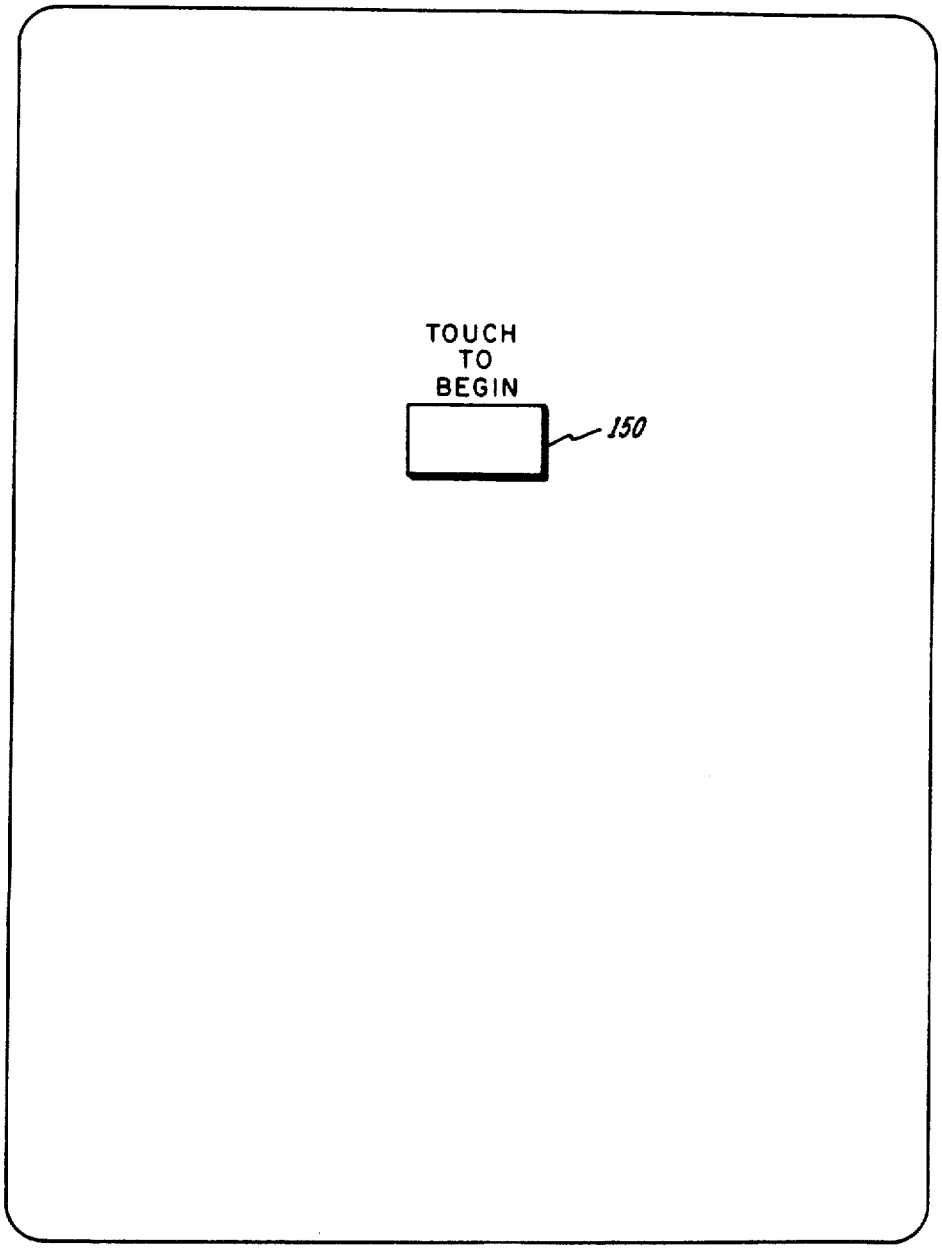
FIG. 14 shows the frame displayed to the user when the system is idle (the "Walking Button").

FIGS. 14, 15, 16, and 17 show the four frames used by the UI device for control of the Xerox 9400 duplicator. FIG. 14 shows the "walking button" frame. This frame is displayed when the system is idle, and consists of a single button labeled "Touch to Begin" 150. The screen background is dark, and the button itself continuously moves in small steps across the screen. The walking button frame avoids the event of a bright image remaining on the screen for a long period of time, a benefit since the bright image would eventually result in phosphor burn. The walking button 150 is the only illuminated element on the frame (FIG. 14), and since it is constantly moving about on the screen the possibility of phosphor burn is eliminated. When the user wishes to use the machine, he touches this "Touch to Begin" button 150 and a new frame, shown in FIG. 15, appears on the screen.

Figure 15:
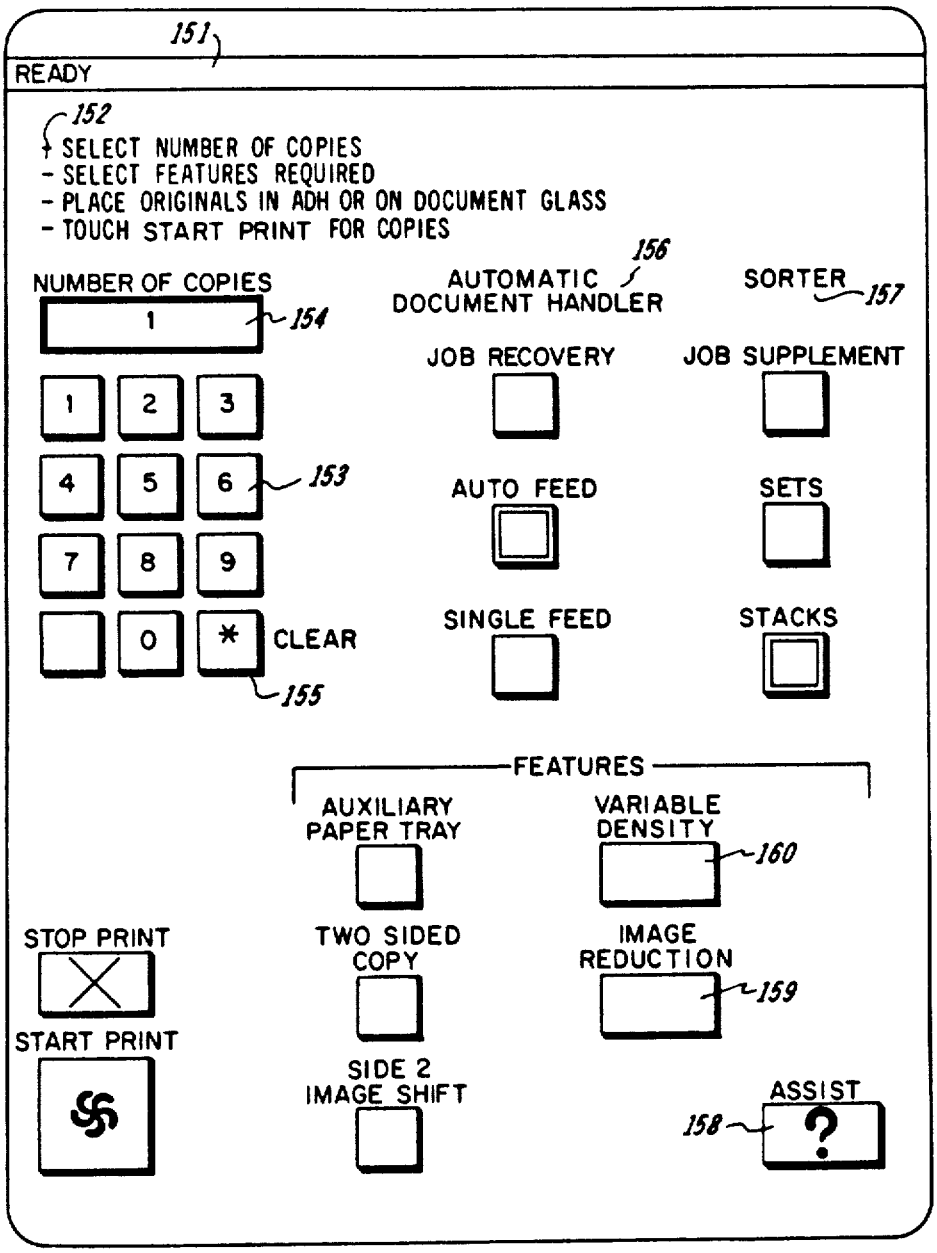
FIG. 15 shows the frame displayed for control of the basic functions of the copier.

FIG. 15 shows the basic user frame. A black bar across the top of the frame 151 displays the word "READY", informing the user that the system is ready for use. This message would read "NOT READY" should that be the case, as when, for example, the copier is waiting for the fuser to reach operating temperature. Simple instructions 152 appear at the top of the frame, and again these can change to reflect immediate requirements. The image of a standard keypad 153 appears at the top left of the frame, and allows the user to enter a copy count by touching the numerical keys in the usual fashion. The count entered is displayed in the window 154 above the keypad, and can be cleared to zero at any time by touching the CLEAR key 155. Buttons controlling system operations, such as the Automatic Document Handler controls 156 and the Sorter controls 157, operate in the usual way of buttons in general, the only modifications being that (1) they are images on the CRT display instead of physical buttons, and (2) when a function is enabled the corresponding button reverse videos (and remains that way until the function is reset). The exception to usual copier operation occurs with the button labeled ASSIST 158, IMAGE REDUCTION 159, and VARIABLE DENSITY 160. These buttons result in new frames replacing the basic frame. The basic frame times out under program control if not used for two minutes, resulting in the reappearance of the walking button frame (FIG. 14).

Figure 16:
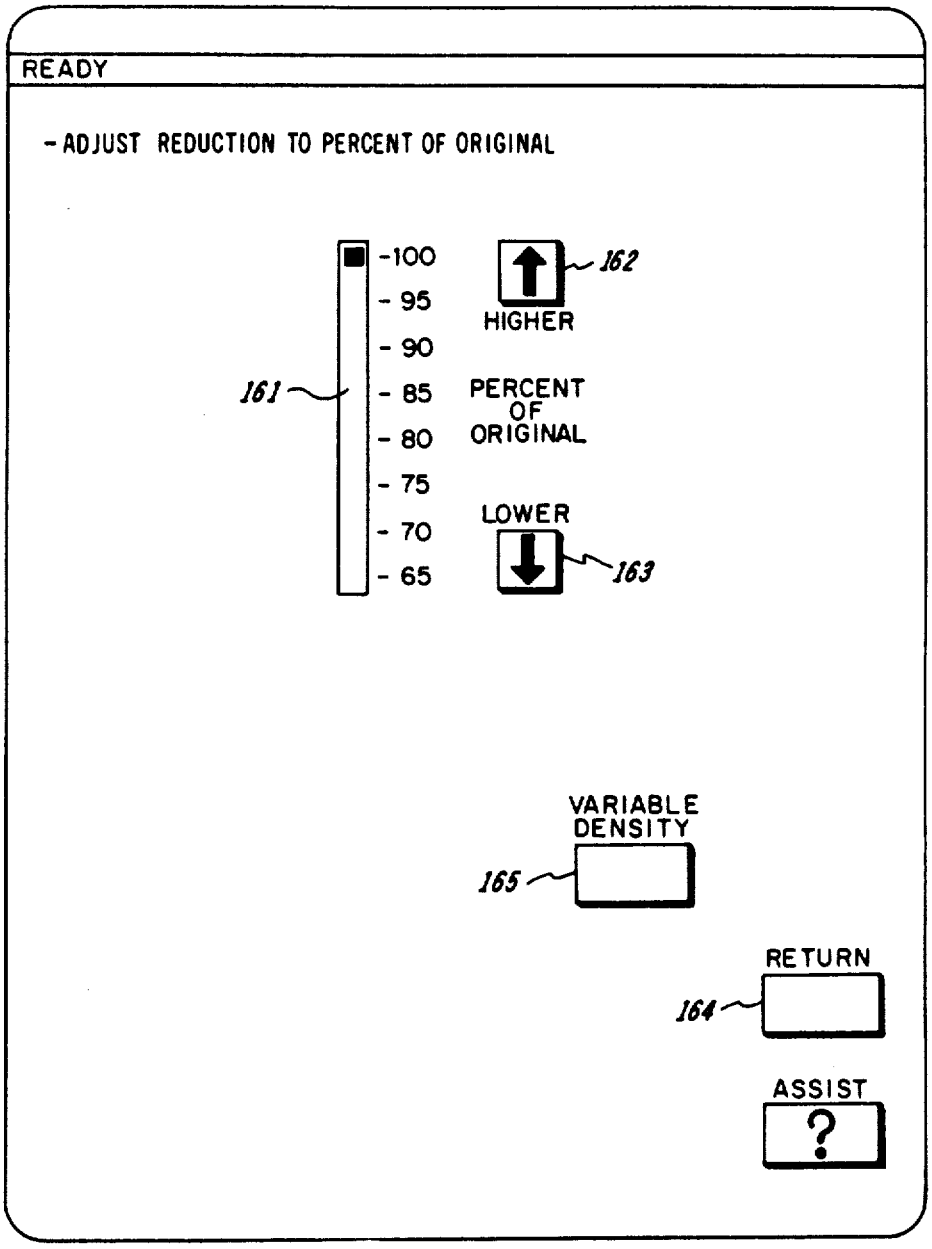
FIG. 16 shows the frame displayed for control of the reduction feature of the copier.
Figure 17:
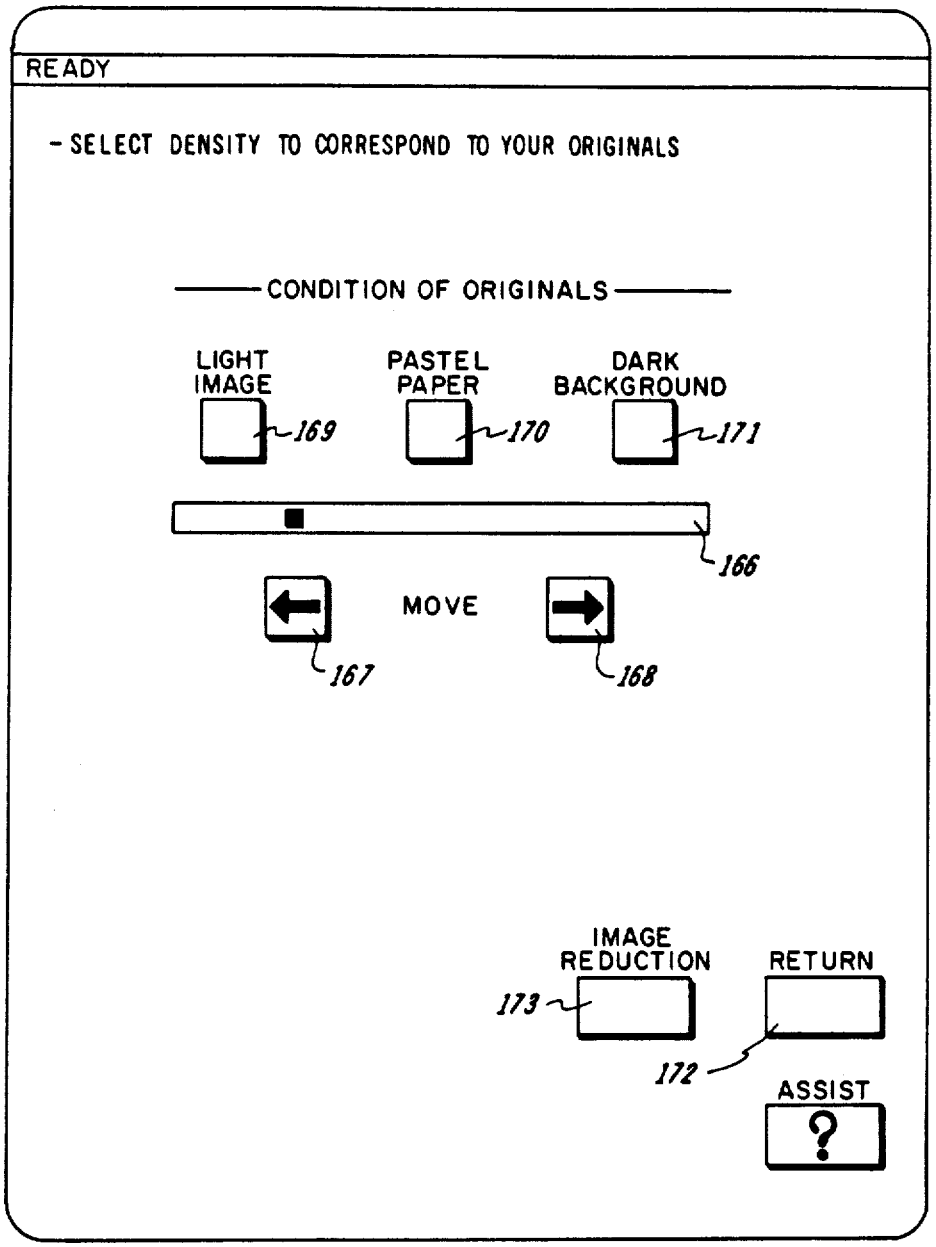
FIG. 17 shows the frame displayed for control of the variable density feature of the copier.

Should the user become uncertain of his next step, he can touch the ASSIST button 158 and a frame of instructions will appear to assist him in using the system. A more interesting effect occurs with the IMAGE REDUCTION 159 and VARIABLE DENSITY 160 buttons, since these bring up operational frames as shown in FIGS. 16 and 17. Referring to FIG. 16, touching IMAGE REDUCTION 159 causes this frame to appear so that the user can select the degree of reduction required. The current setting of the reduction hardware is shown at all times on the scale 161 as a percent reduction of the original. The user controls the degree of reduction by touching either of the two buttons 162–163, which result in the reduction hardware moving to increase or decrease the actual reduction effect. The scale pointer 161a is driven in real time to provide instantaneous feedback to the user.

When the user is satisfied with the reduction adjustment, he can either return to the basic frame (FIG. 15) by touching RETURN 164, or go directly to the variable density adjustment by touching VARIABLE DENSITY 165. Note that touching VARIABLE DENSITY on either the basic frame or the reduction frame will cause the variable density frame to appear. I.e., it is not necessary to back up from the reduction frame to the basic frame in order to reach the variable density frame.

Referring to FIG. 17, operation of the density adjustment is similar to the operation of the reduction adjustment described above. The indicator bar 166 shows the current density setting at all times, and the operator can adjust this setting to any point with the buttons 167 and 168. In addition to the continuous adjustment provided by buttons 167 and 168, three pre-set adjustments can be reached instantly by touching the appropriate button:

LIGHT IMAGE 169, PASTEL PAPER 170, and DARK BACKGROUND 171. When the user is satisfied with the density adjustment, he may directly return to the basic frame by touching RETURN 172, or go directly to the reduction frame by touching IMAGE REDUCTION 173.

Figure 31:
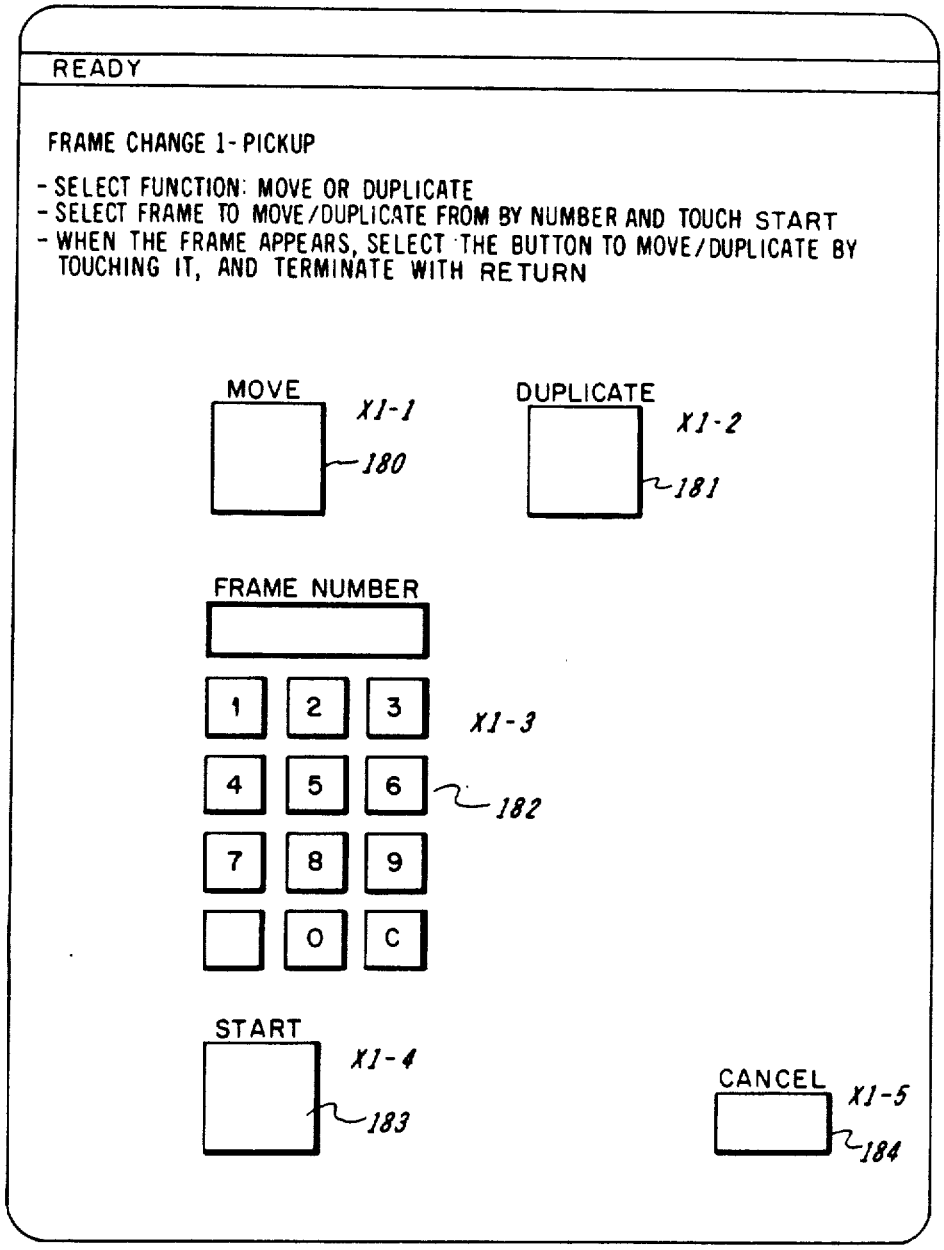
FIGS. 31 and 32 show the frames displayed to the operator for control of the reorganization or alteration of frames.

An additional feature of the system is that the user can perform a limited reconfiguration on the frames to meet the requirements of specific operating environments. For example, in a situation where light originals were a major part of the duplication requirements, it would be inconvenient to have to follow the progressive disclosure process to the variable density frame (FIG. 17) for virtually every reproduction task. Hence the Change Frame feature has been implemented to allow, for example, the user to duplicate the Light Image button 169 from the variable density frame (FIG. 17) onto the basic frame (FIG. 15), where it would be directly available to the operator. To activate this feature the user turns a physical control key, called the Function Key, to the "Change Frame" position. After this is done, the user touches the Touch To Begin button 150 (FIG. 14), and subsequently receives the first of two frames that control the Change Frame function. The first frame (FIG. 31) asks the user to specify whether the function will be moved (that is, deleted from one position and placed in another; probably, but not necessarily, on a different frame) or duplicated (i.e., the function will be moved without being deleted from its original position, presumably onto a different frame.

After selecting Move 180 or Duplicate 181 (FIG. 31), the user keys in the frame number (through the keypad 182) of the frame where the function is currently in residence. The user then touches the button whose function he desires to move or duplicate. In the case of a move, the button is deleted from the selected frame at this time. For duplication, the button simply reverse videos to provide optical feedback that it has been selected. The user then touches either Assist or Return to return to the Change Frame control frames (both buttons may not appear on all frames, hence either may be used for the Return function in Change Frame mode). For example, to duplicate the Light Image function 169 (FIG. 17) so that it appears on the basic frame (FIG. 15) as well as on the variable density frame (FIG. 17), the user would select the variable density frame (FIG. 17) as described above, touch the Light Image function button 169 (which would reverse video), and then touch Return 172.

Figure 32:
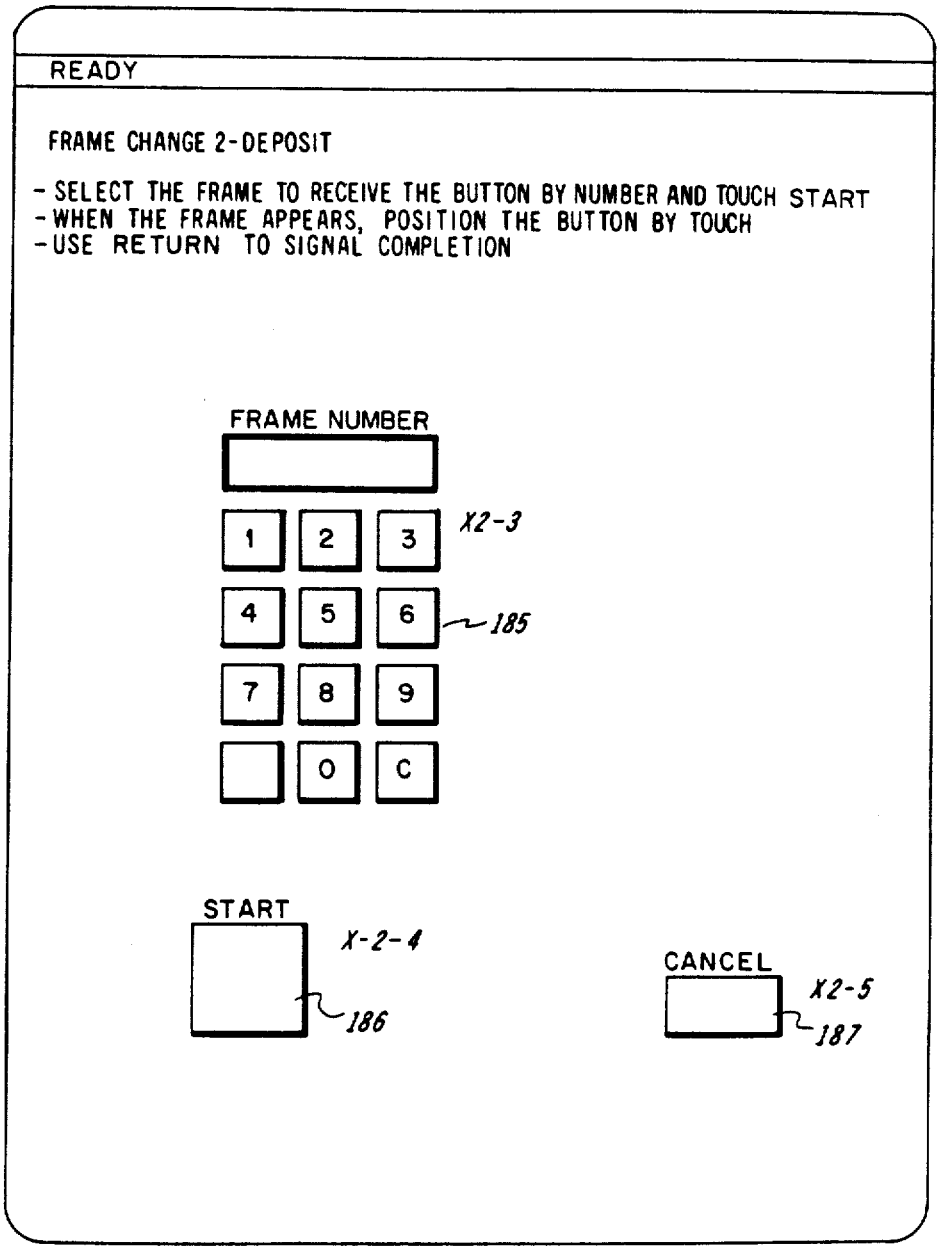

The second of the two Change Frame control frames (FIG. 32) now appears. The user selects the number of the frame onto which the selected function will be deposited. For our example, we wish to move the button to the basic frame (FIG. 15), so this code is entered on the keypad 185 (FIG. 32) and the Start button 186 is touched. The selected frame (FIG. 15 in the example) now appears. To deposit the button on the frame, the user simply touches the frame where he would like to position the button. If the location is valid, the button appears. (Specifically, it would be invalid to place a button on top of existing material, and the space selected must be large enough to receive both the button and its associated function label). The button will move across the screen, following the user's touch, as long as the position selected is valid. As the button moves, it is automatically aligned with the infra-red touch sense matrix.

Figure 33:
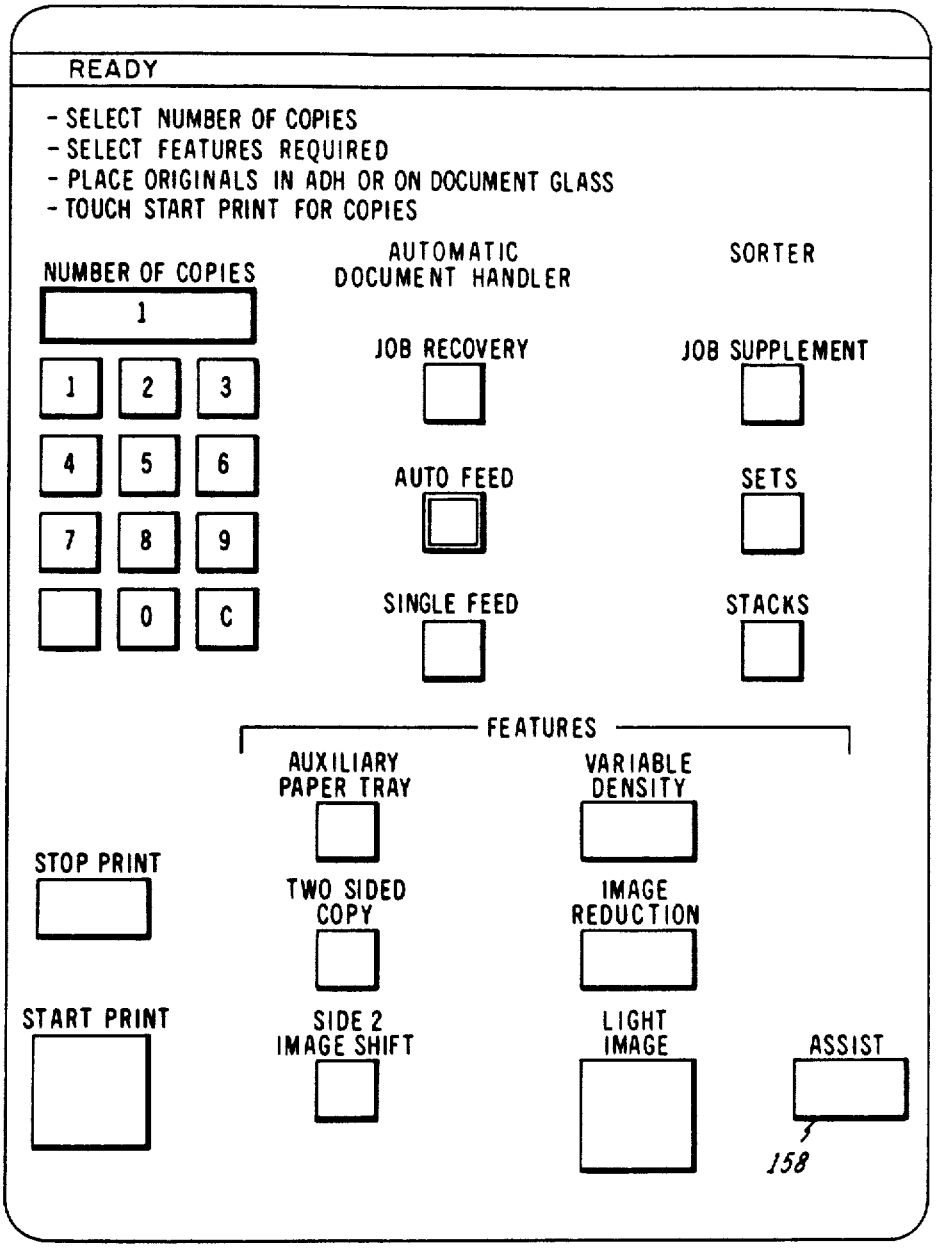
FIG. 33 is an example of an altered frame.

When the user is satisfied as to button placement, he removes his finger from the screen (the button remains) and touches the frame's Assist or Return button (the Assist button 158, FIG. 33, is used for this example). For our example, we have duplicated the Light Image button 169 from the variable density frame (FIG. 17) to the basic frame (FIG. 15 originally, now FIG. 33), and positioned the new button near the existing Assist button 158 (FIG. 33). Note that since we duplicated the function, as opposed to moving the function, the Light Image button 169 now appears on two distinct frames. That is, the function is still on the variable density frame (FIG. 17), so that frame is functionally complete, and the function is additionally now on the basic frame (FIG. 33) for ease of use by the operator.

Both Change Frame frames (FIGS. 31 and 32) contain Cancel buttons 184 and 187. The Cancel buttons allow the user to cancel the move or duplication operations any time prior to selection of the Return button (used to signal completion of the operation). If a deletion is cancelled, the operation is simply terminated. If a move is cancelled after the moving button has been selected (and thus removed from the source frame), the button is returned to its original frame and original position.

The ability to recomfigure frames may be used in the context of defining a button to represent a complete job step or job where the job step or job consists of a sequence of steps already implemented. This is the equivalent of defining a "command file" type of operation typically implemented in a UCL (User Command Language) for a computer application. The keyboard may be used to define a label for the newly defined button.

Figure 18:
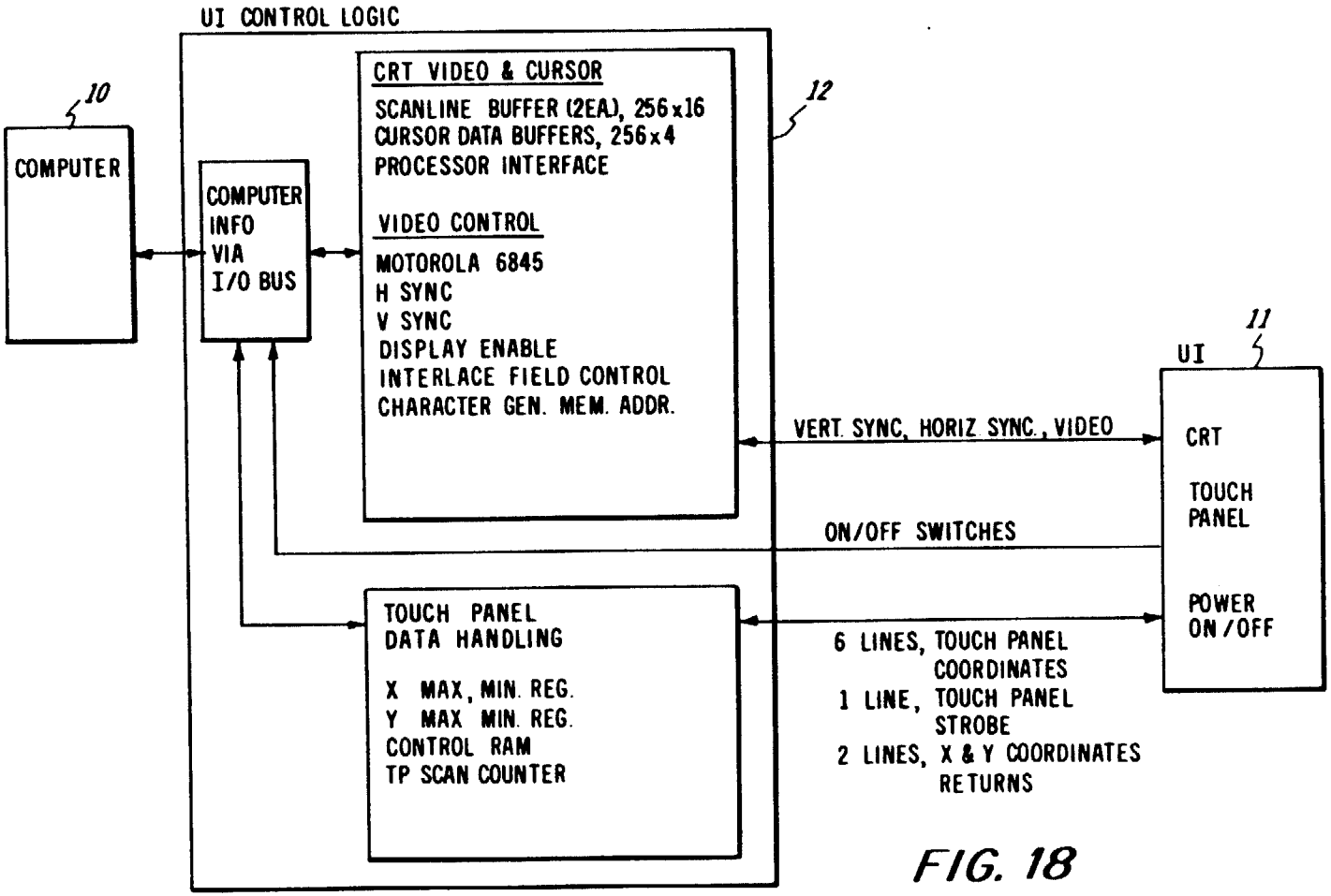
FIG. 18 is an overall block diagram of the circuits required to drive the UI.

FIG. 18 is an overall block diagram of the circuits required to drive the User Interface (UI) 11. The UI 11, which comprises a CRT and the touch panel, is coupled to the computer 10 through an interface which will be referred to as the user interface logic 12 (UIL). The computer 10 controls the system, not shown, through any well-known means.

The User Interface 11 has three major components, the CRT, the touch panel and a power on-off switch for the entire system.

The CRT is driven by signals typical of any CRT, vertical sync, horizontal sync and video, all of which originate in the UIL 12 as shown. The touch panel interface consists of six lines for the touch panel co-ordinates, a touch panel strobe line, and the X and Y cooordinate return lines, as shown.

The six touch panel co-ordinate lines are driven by a six bit counter in the UIL 12, the six lines being decoded to integrate one X and one Y matrix row and column at a time. There are 37 LED and photo-sensitive transistor pairs in the X (horizontal) direction and 41 in the Y (vertical) direction. The 64 bit (six line) counter therefore can service each row and column once per counter cycle. If a light beam of the matrix is interrupted, there will be a return to the UIL 12 on the appropriate return line at the time a strobe and the associated count is presented to the UI 11. After a complete cycle, an X co-ordinate and a Y co-ordinate will have been received by the UIL 12, determining a point on the two dimensional CRT face that has been touched.

A slight complication is created by the ambient room light which must be distinguished from the LED beam. This is accomplished by biasing the light sensitive transistor so that there is no reaction to the ambient light conditions. This may be done automatically by first applying an appropriate control signal to a selected photosensitive transistor to saturate it with ambient room light and then turning on the corresponding LED to sense additional light.

In this particular system, the matrix was designed to be driven by a counter which stops at a count of 37 in the horizontal direction and 41 in the vertical. As the count runs past these numbers, interrupts will be generated. To prevent these various responses a RAM control memory is supplied in the UIL 12 which maps the inputs into valid outputs, thus a non interrupt is always produced, ultimately, for columns numbered greater than 37 and rows numbered greater than 41.

This same RAM has an additional use. A matrix row or column may be defective, and generate an interrupt continually. This problem could also be discovered by a diagnostic run at turn-on time, and the control RAM programmed automatically to disregard interrupts on the defective channel. However, the matrix will still be usable for two reasons. First, a touching of the panel usually interrupts two or more channels in any direction so that the loss of a channel would not affect the operation. Second, the software may be written to shift the display "keys" away from a defective row or column.

Another complication arises when more than one row or column registers an interrupt. In fact, this is usually the case since the matrix is one quarter of an inch between rows and columns, and the operator's finger will usually intersect several in each direction. In a display of keys an uncertainty may arise. The preferred solution is for the software to compute the center point of the two or more interrupts in each direction, and use the key that encloses, or is nearest to, that point.

To accomplish this function, the UIL 12 contains X and Y max/min registers, a control RAM functionally described above and the touch panel scan counter, also previously described, all of which will be described in more detail below.

In this CRT one odd and one even "fill" are interlaced to produce one "frame", and the vertical sync pulse issued to start a new frame. The scan counter completes its count in approximately three fourths of the frame time. Therefore, the vertical sync pulse is used to reset and restart the touch panel scan, and the results are latched out to the UIL 12 during the retrace time directly before the next vertical sync pulse. In this embodiment, there is one sync pulse every 12.5 m sec, 80 fills per second and 40 frames per second.

At the end of each frame the X and Y co-ordinates are latched out from the UI 11 on the return lines to the date handling portion of the UIL 12 into the X and Y max/min registers, and therefrom, to the computer 10 which interprets this information into a suitable machine command or into the registered UI display.

The actual control of the UI 11 is accomplished by the CRT video handling and control portion of the UIL 12, and more specifically by a Motorola type 6845 CRT controller LSI chip. The CRT video handling circuit provides horizontal sync, vertical sync, interlaced field control and character generator memory addressing. In this embodiment, there are 875 scan lines, and about 612 dots per scan.

The CRT video handling part of the UIL 12 comprises two scan line buffers, each implemented from four buffer register parts, each 256 by 4 bits, a cursor data buffer and a processor interface through which the data transfer takes place.

The process is as follows. A complete display bit map is prepared in the main memory of computer 10 as explained in the reference U.S. Pat. No. 4,103,331. The CRT controller chip generates a vertical syn pulse at the beginning of the frame, which is used as a display enable. Thereafter, for each time that a scan line of video is required, a system interrupt is issued to the computer 10 which responds by filling the scan line buffer with 612 video data bits. In fact, there are two scan line buffers, one being loaded while the other is supplying video to the UI in real time.

As shown in FIG. 18, the CRT video handling portion of the UIL generates a Display Enable signal which signifies that the scan has settled at the top of the screen and is ready to accept video. The series of interrupts are then generated to produce the frame. However, at these interrupts, the scan buffers are not uniformly filled. The bandwidth may be significantly reduced by setting a horizontal tab counter instead of actually sending video which is all white. Then, as the tab counter is counted down, no video (which is interpreted as white video) is transmitted from the buffer. When the tab counter reaches zero, video is again output. A numerical example would be as follows: Assume there are 10 words of white video, and then 15 words of ramdon video in a particular scan line. The tab counter would be set to 10 and the 15 words of random video loaded into the buffer. To read out, first the scan buffer counts down 10 counts, then it outputs the 15 words of random video. The result is a decreased bandwidth requirement between the computer 10 main memory and the UIL 12.

Between the UIL 12 and the UI, data transfer of four parallel bits per word are timed by a video clock at a rate compatible with the CRT timing.

The cursor handling portion of the UIL 12 comprises the cursor control circuits and a cursor buffer. In this system a cursor is defined by a rectangular area within which the cursor is contained, and also by a shape (arrow, bar, dot, etc.). A cursor data buffer is loaded with the cursor shape which is then coupled out to the scan line buffer in the same way that a character generator would, to generate a particular video pattern. An electronic pointer is used to define the upper left corner of the cursor to position the cursor and the screen. In this embodiment, the cursor is defined within a $32\times32$ dot square, and is simply ORed with the video to produce a final image. Of course, provisions can be made to reverse the cursor color to allow it to be the reverse of the background video color.

Figure 19:
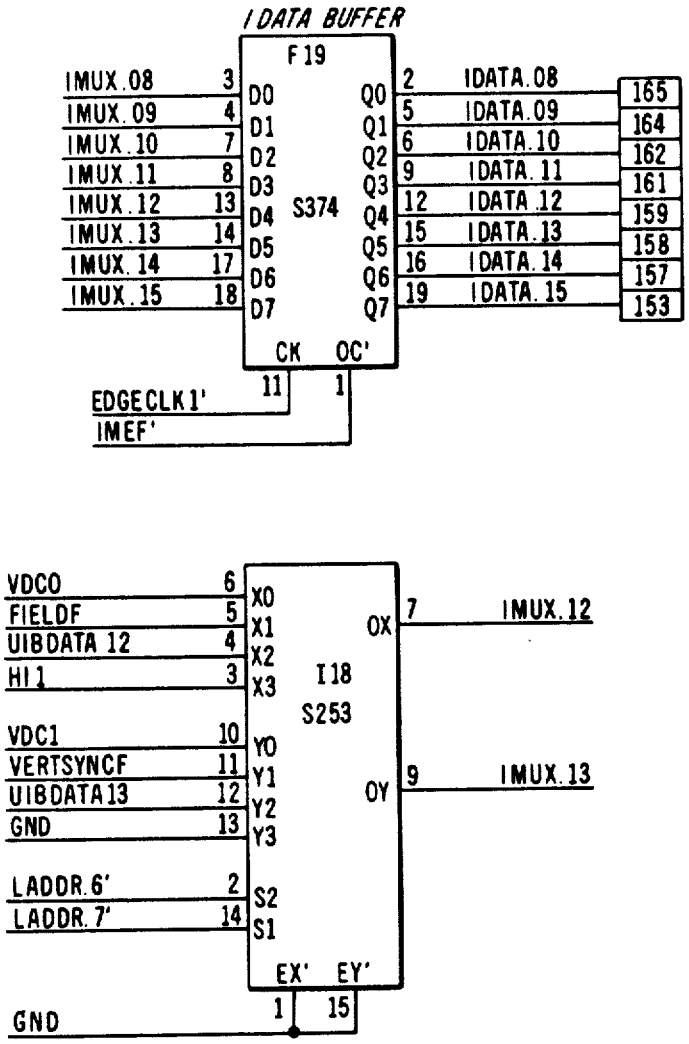
FIG. 19 is the UI control logic interface to the computer.

The detailed schematics will now be discussed. FIG. 19 is the UI control logic interface to the computer or processor 10 which couples system data to the processor. Various signals are multiplied through eight multipliers one of which, i18, is shown, onto a total of 16 Mux lines, two of which, IMUX 12 and 13, are shown, and then buffered through two data buffers one of which, f19, is shown. Typical signals are vertical and horizontal sync, diagnostic flags, video control signals, touch panel X and Y co-ordinates, odd-even fill, and power on-off (which initiates the power down sequence). The outputs are finally coupled onto the computer input data bus, lines Idata 00 through Idata 15.

The computer in this embodiment has a seventeeth parity input line, Idata 16, not shown in this diagram.

Figure 20A:
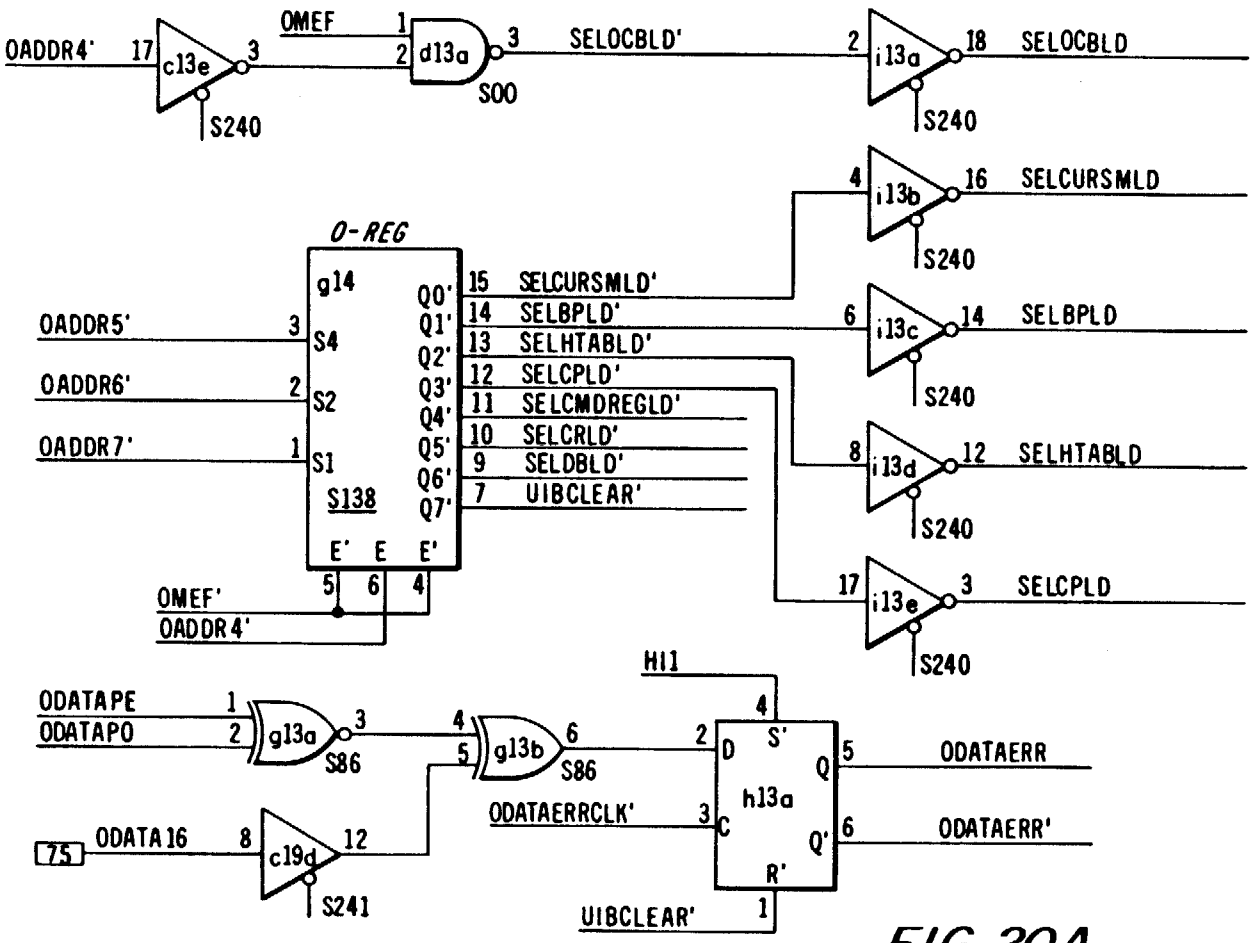
FIG. 20 is a schematic of the computer or processor output line to the UI.
Figure 20B:
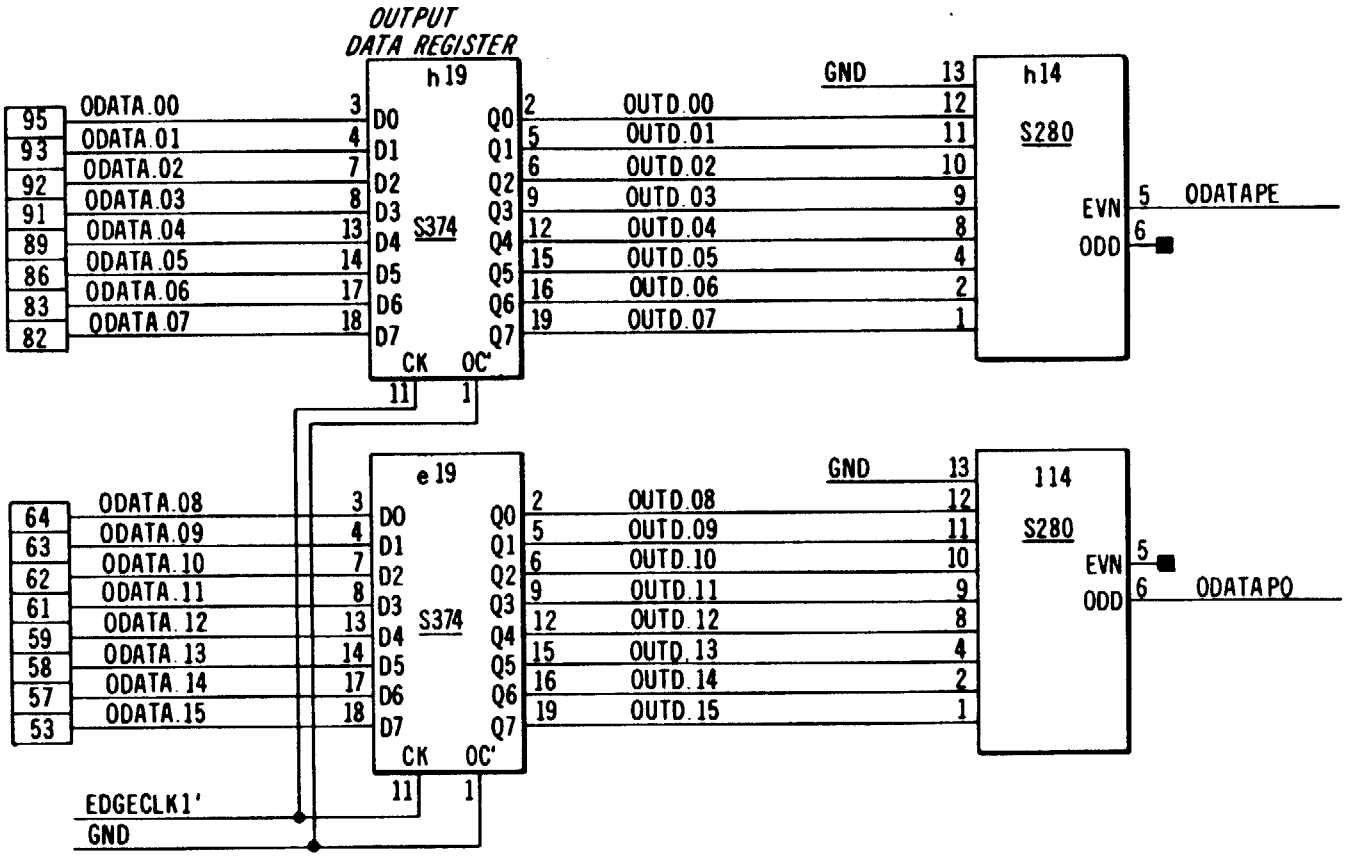

FIG. 20 is a schematic of the computer or processor output lines to the User Interface control logic unit, the UIL 12. The O register G14 is an instruction decoder which translates the contents of several processor output address lines Oaddr 5-7 into specific discrete control line commands. Examples are the discrete lines to set the cursor memory load, SelCuvsMLd, set buffer pointer load. SelBPLd, set tab pointer load, SelHTabLd, and set cursor pointer load, SelCPLd.

Register h19 and e19 are data buffer registers for the computer output data lines Odata 00-15. Parity generators h14 and l14 generate odd and even parity bits for the data and the processor parity bit, Odata 16 is handled in separate logic as shown.

Figure 21A:
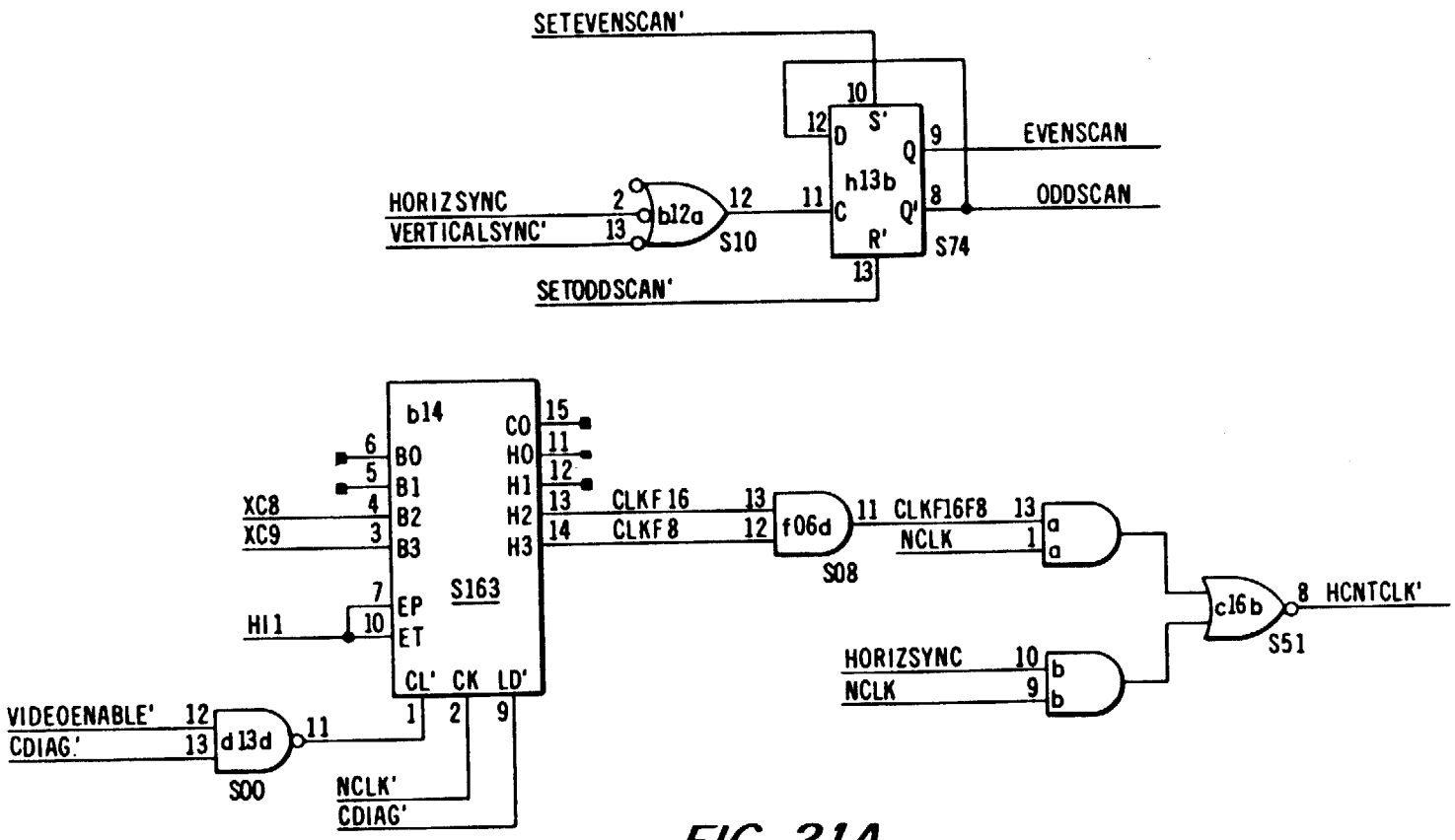
FIG. 21 is the circuit which processes the horizontal tab.
Figure 21B:
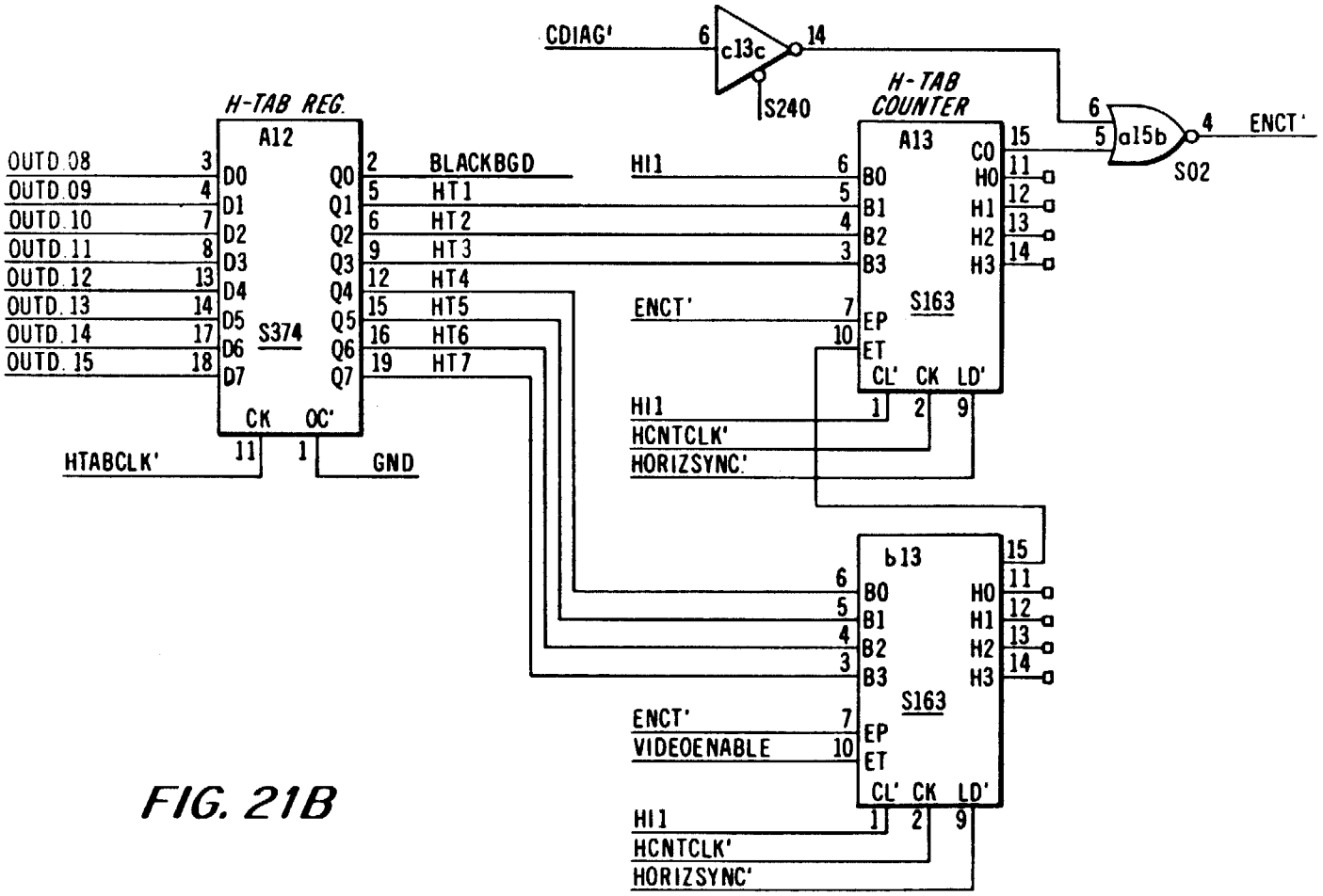

FIG. 21 is the circuit which processes the horizontal tab. Eight buffered processor output data lines OutD 08-15 are buffered in registers a12 and are used to set the tab counter a13 and b13. The control for this counter is supplied by counter b14 which produces the clock for counter a13, b13 under the appropriate conditions. In other words, the Horizontal Tab Counter a13 and b13 is parallel loaded through the H-Tab Register from the processor and then counted down with clocks from counter b14. The purpose of this Tab counter is as described above.

In the upper part of FIG. 7, flip flop h13b generates a signal to indicate whether the CRT is an odd or even scan, as indicated by the signals Buffer 2 and Buffer 1, respectively. As shown, the sync pulses trigger the flip-flop h13b to alternate on every scan. The set and reset lines are for diagnostic purposes only. In all cases, the original signals are generated by and coupled from the processor.

Figure 22A:
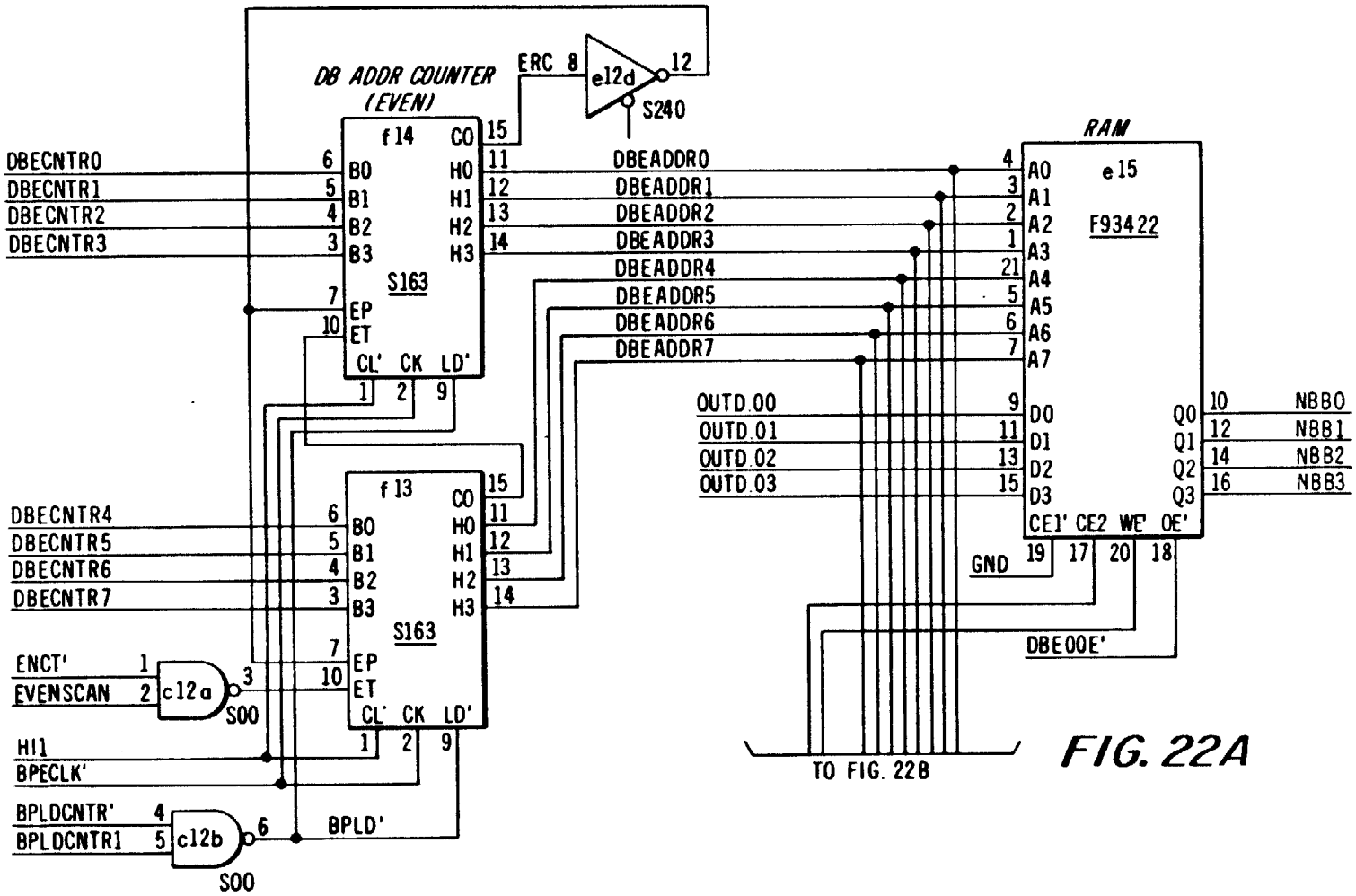
FIG. 22 is a schematic of a data buffer.
Figure 22B:
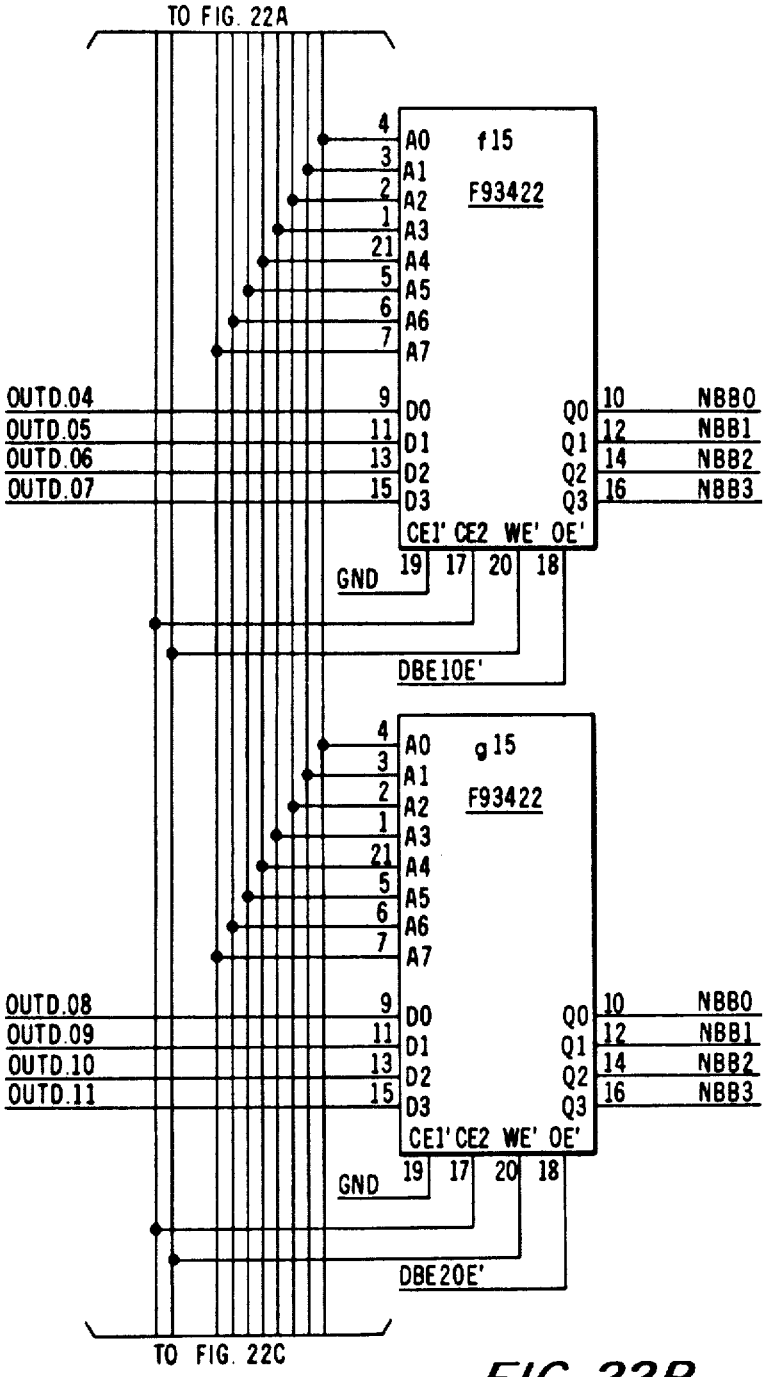
Figure 22C:
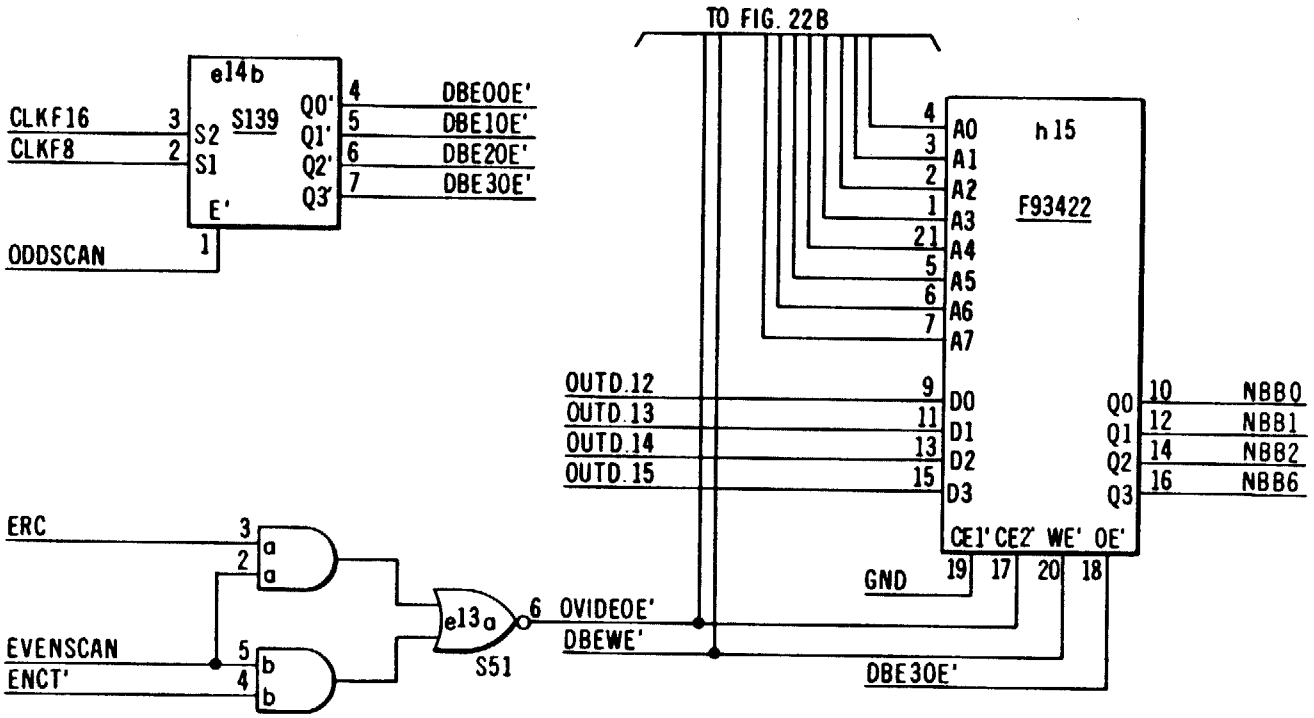
Figure 23A:
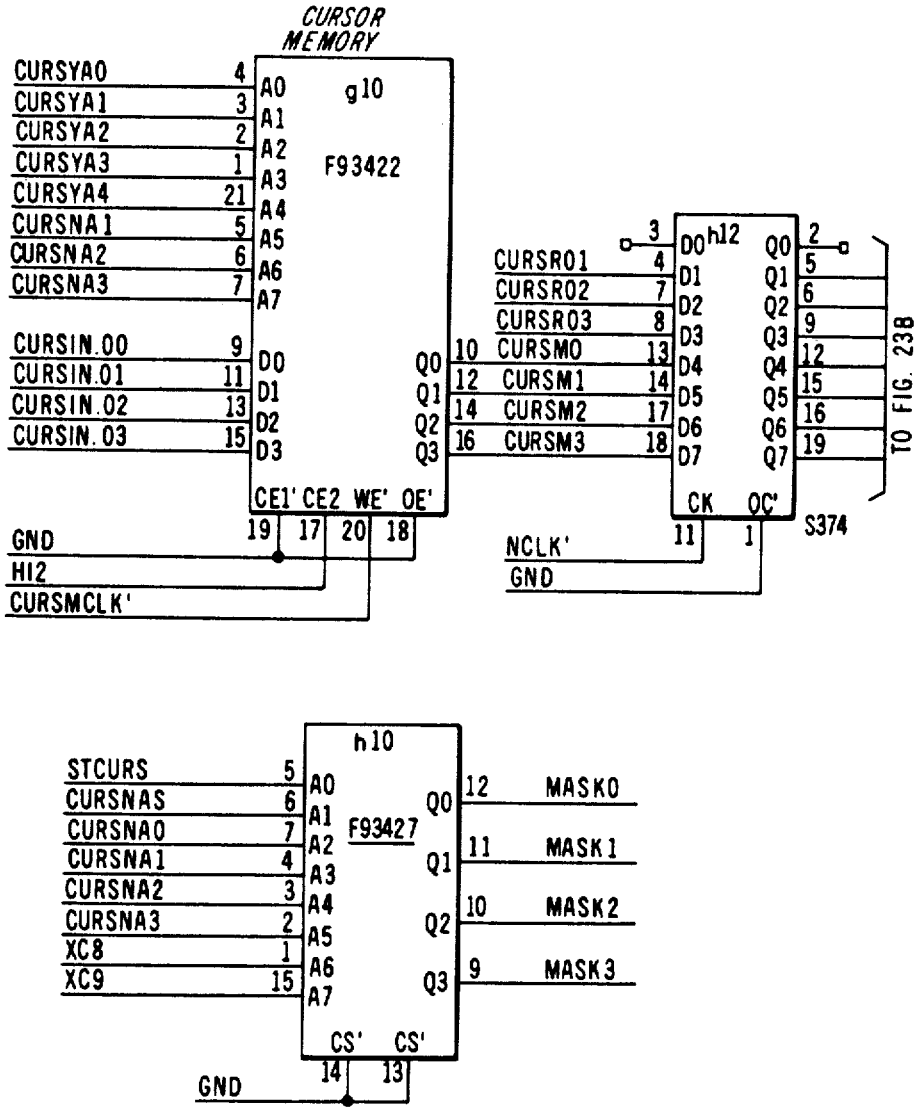
FIG. 23 is a schematic of the cursor logic.
Figure 23B:
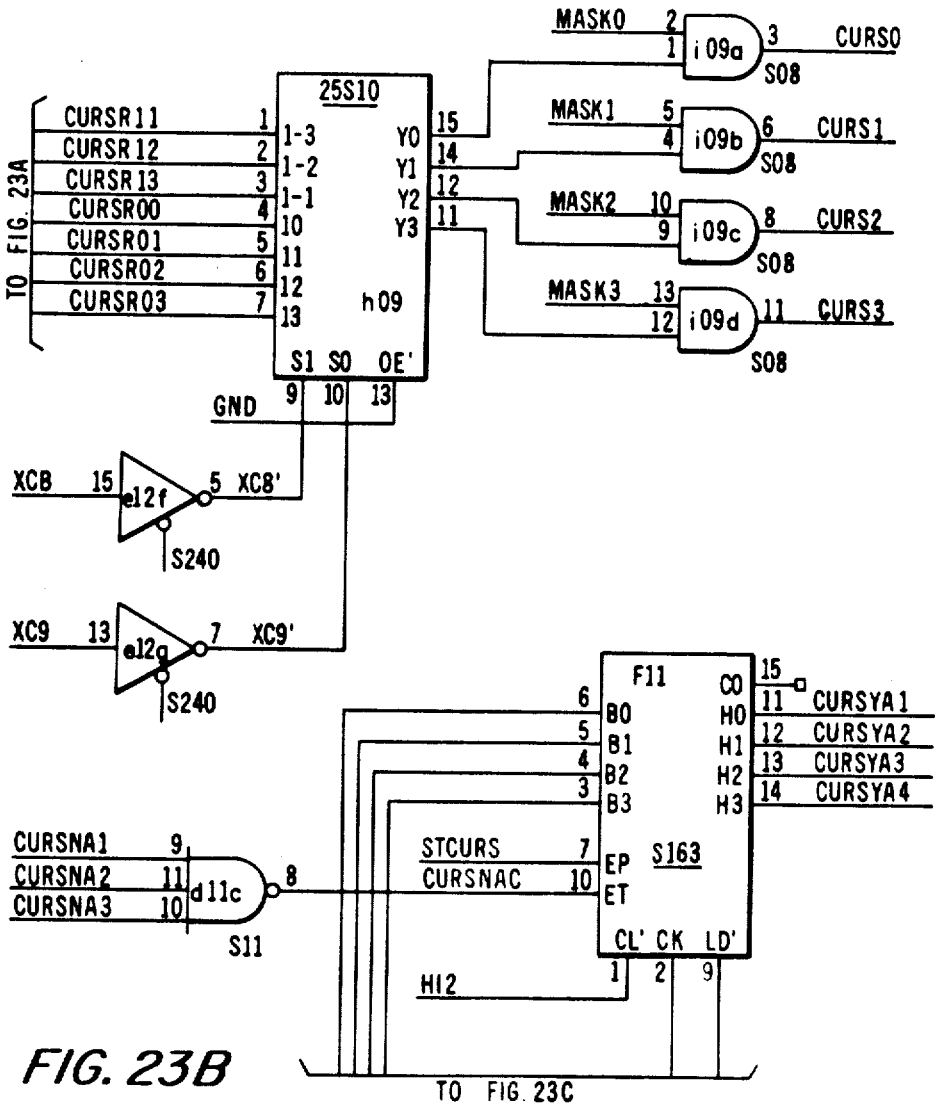
Figure 23C:
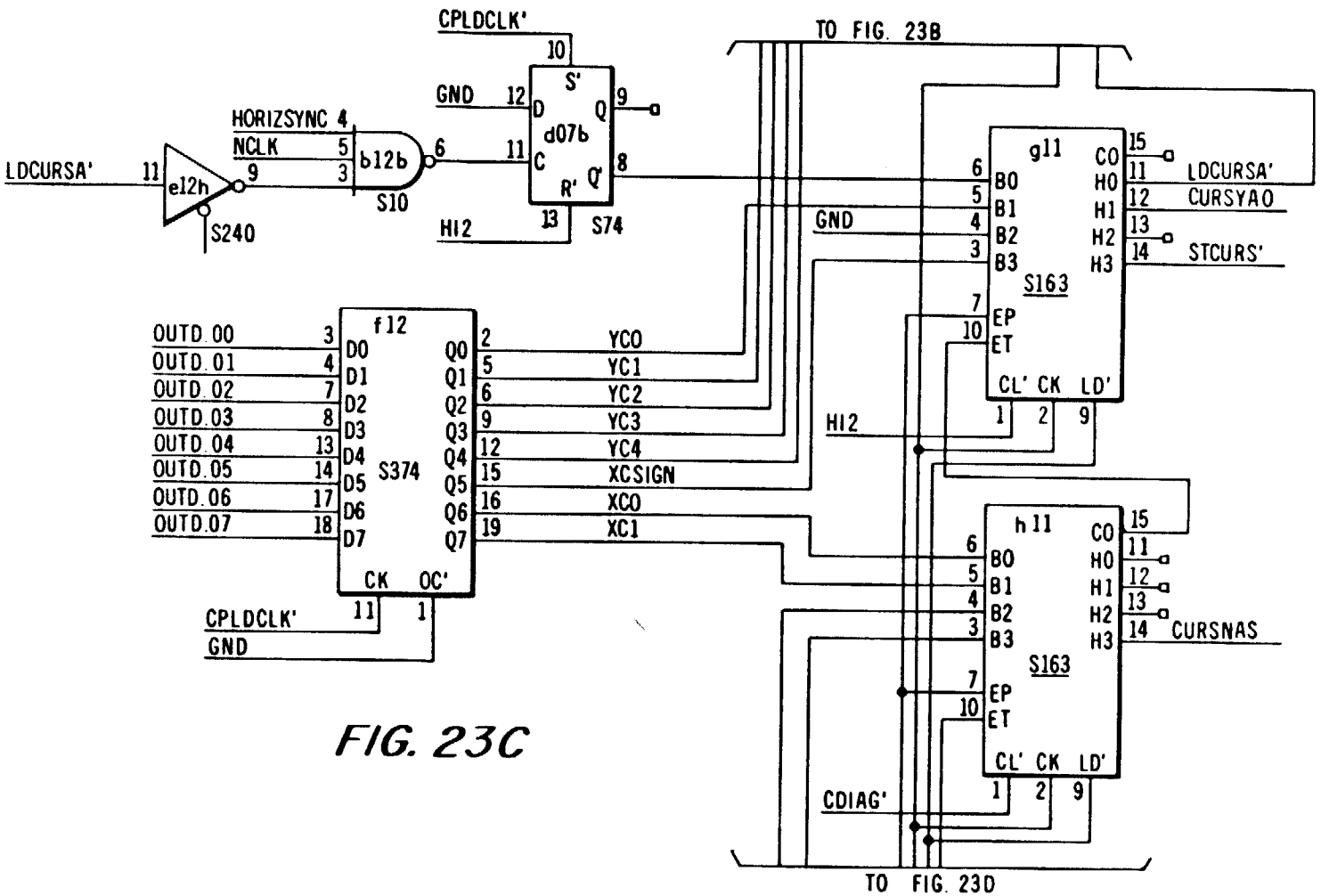
Figure 23D:
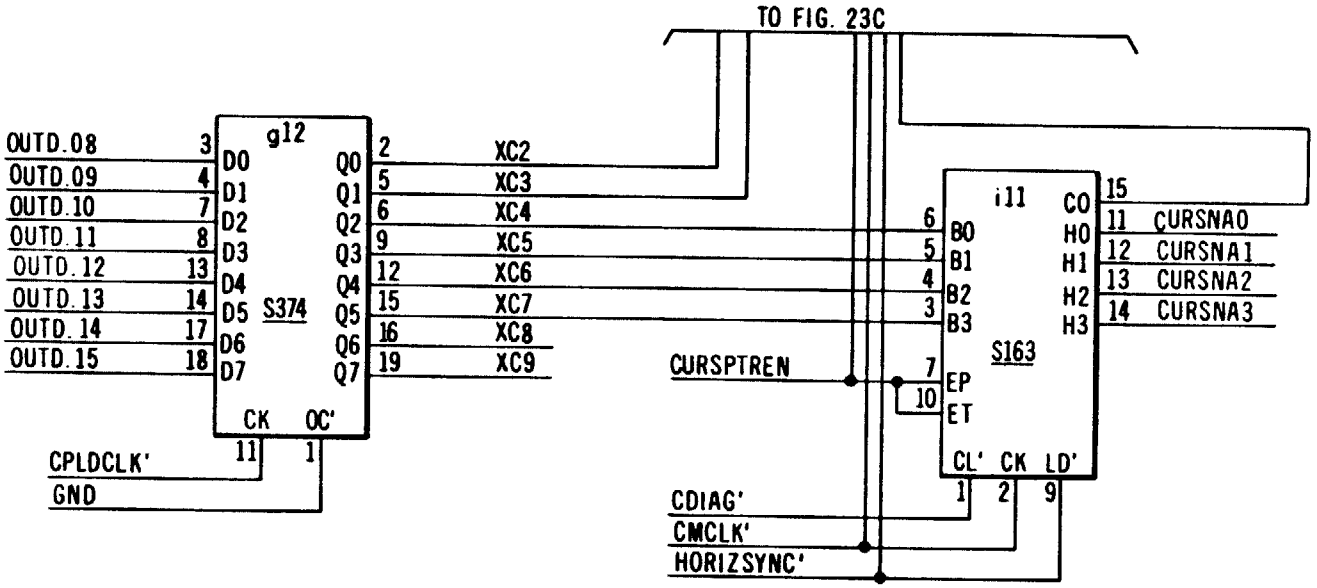

FIG. 22 is data buffer No. 1 for even scan line data. Buffer No. 2, for odd scan line data, is identical and therefore not included. During the loading of data from the processor, one is being loaded while the other is supplying video the the CRT. Each F93422 RAM has a capacity of 256×4 bits resulting in a total buffer capacity of 256×16 bits. Two counter devices, f14 and f13, are used to implement the data buffer address counter, the eight bit output, DBEAddv 0-7 supplying the addresses for the RAM's e15, f15, g15 and h15. The RAMs may be parallel loaded from the processor on lines OutD 00-15 and are selected and enabled by decoder e146. The clock input to the address counter f14, f13, line EnCt' is supplied from the H-tab Counter a13, b13 of FIG. 7. The data buffer counter f14, f13 may also be parallel loaded on lines DBCntr 0-7 from the processor. The final output is four parallel bits of video data coupled out on lines NBB 0-3.

FIG. 23 is a schematic of the cursor logic, including the cursor memory g10, a 256×4 bit RAM. The eight address lines CURSYd 0-4 and CURSNa 1-3 are the cursor pointer lines from registers f11 and l11. The other main components are the cursor registers f12 and g12 which is loaded by the processor, and the cursor counter, g11 and h11, which receives a count in parallel on inputs B0-B3, and counts down from the start of the scan line (HOR12Sync) using the cursor clock (CMClk) to start the cursor at the proper point on the scan.

The cursor memory g10 stores the cursor image itself which could be an arrow, a bar, or any other simple image which can be created on a 32×32 bit matrix. As shown, the cursor image is output four parallel bits at a time. However, since the cursor must be able to start on any bit within each four bit nibble, the cursor mask PROM (256×4 bits) h10 is provided to output signals MASK 0-3 to gates 109 a-d to allow the cursor image, as buffered through resister h12 and multiplier h09 to begin on any bit. The XC8 and XC9 inputs to gates e12f and e12g are received from the processor and control multiplier h09, the total result of the masking function being to enable output bits from the cursor memory g10 at the appropriate point within the four bit nibble.

Two cursor start signals are required, one supplied by counters h11 and l11 to start the cursor at the appropriate point on the scan line (x direction) the other supplied by counters f11 and g11 to start the cursor on the appropriate scan lines (y direction). As shown, some of these outputs are used (CURSYa 0-4) to address the cursor memory g10.

Figure 24A:
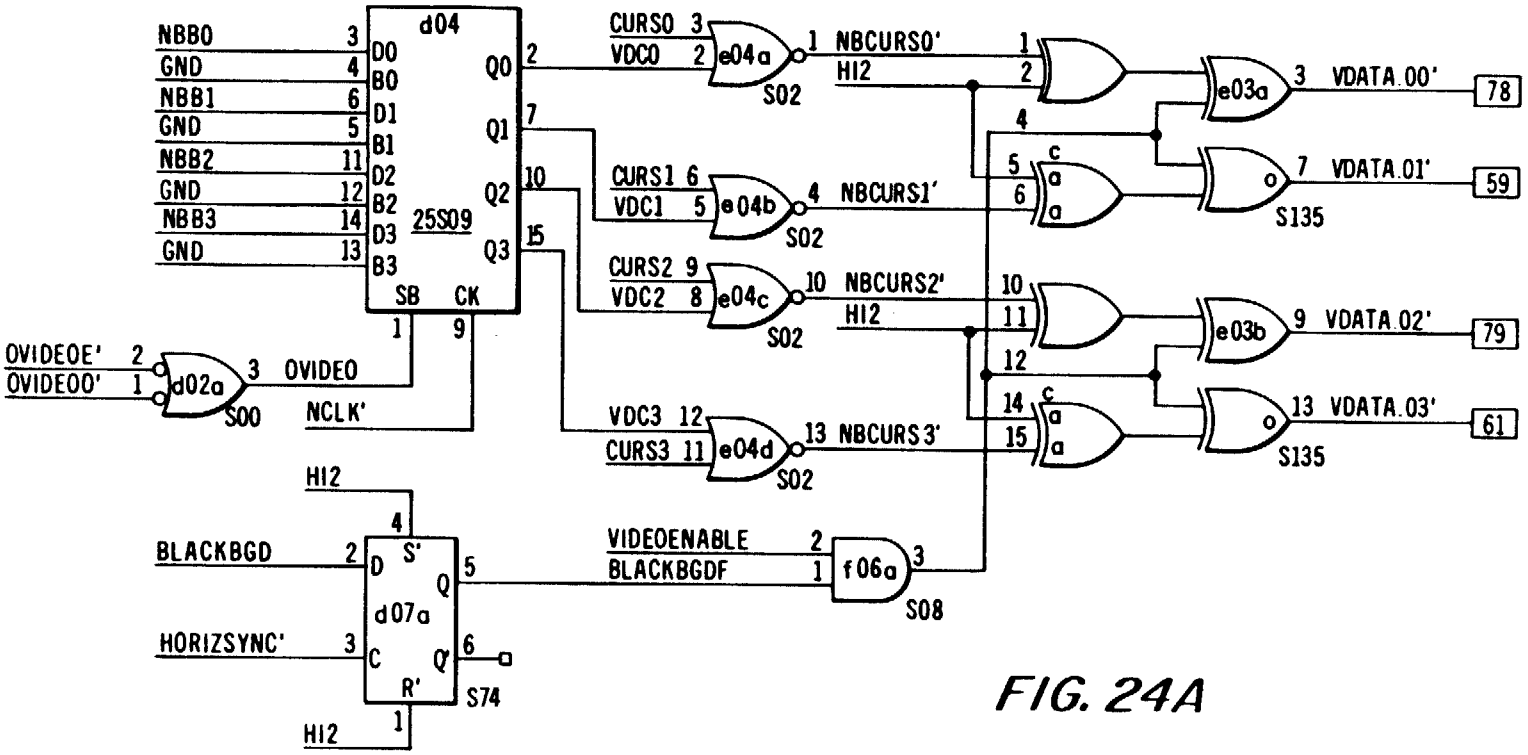
FIG. 24 is a schematic of the cursor and video data OR circuit.
Figure 24B:
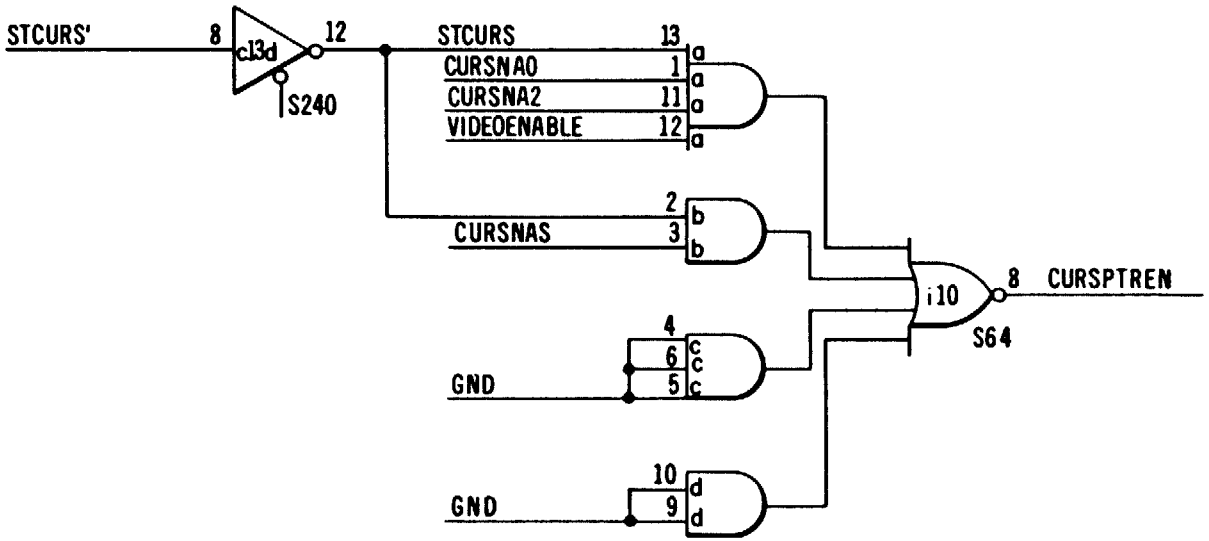

The ORing of the cursor and video data is done in the circuit shown in FIG. 24, the cursor being supplied on lines Curs 0-3 from FIG. 23 and the video being supplied on lines NBB 0-3 from FIG. 22. The video is supplied through a multiplexer and latch d04 for timing purposes and is then ORed with the video in gates e04-a-d to produce the final video which is sent out on lines VData 00-03 to the FIG. 27 circuit.

Gates c13d and l10 of FIG. 24 provide a cursor pointer, CursPtEn, which controls the cursor bit counter l11 of FIG. 23, and therefore enables when to start and stop the cursor on each scan line. Thus, there will be a cursor pointer at the beginning and end of the cursor on each scan line that intersects the cursor.

The remainder of the circuits comprise a CRT Controller Device, a character generator and enough memory to display messages to the generator even when the remainder of the system, including the main processor, becomes inoperative. In normal operation the processor creates the fonts and loads the buffers with a bit map which is simply displayed by the CRT. However, when the processor is not operating, the CRT Controller and associated circuits can still generate messages, allowing the generator to run limited diagnostics, and be informed on the system status. To accomplish this function, the remainder of the circuits in the described embodiment have a separate power supply. The result is a stand-alone display system which can be exercised separately from the remainder of the system, an inherent advantage in using an interactive display to control a computer system.

Figure 25A:
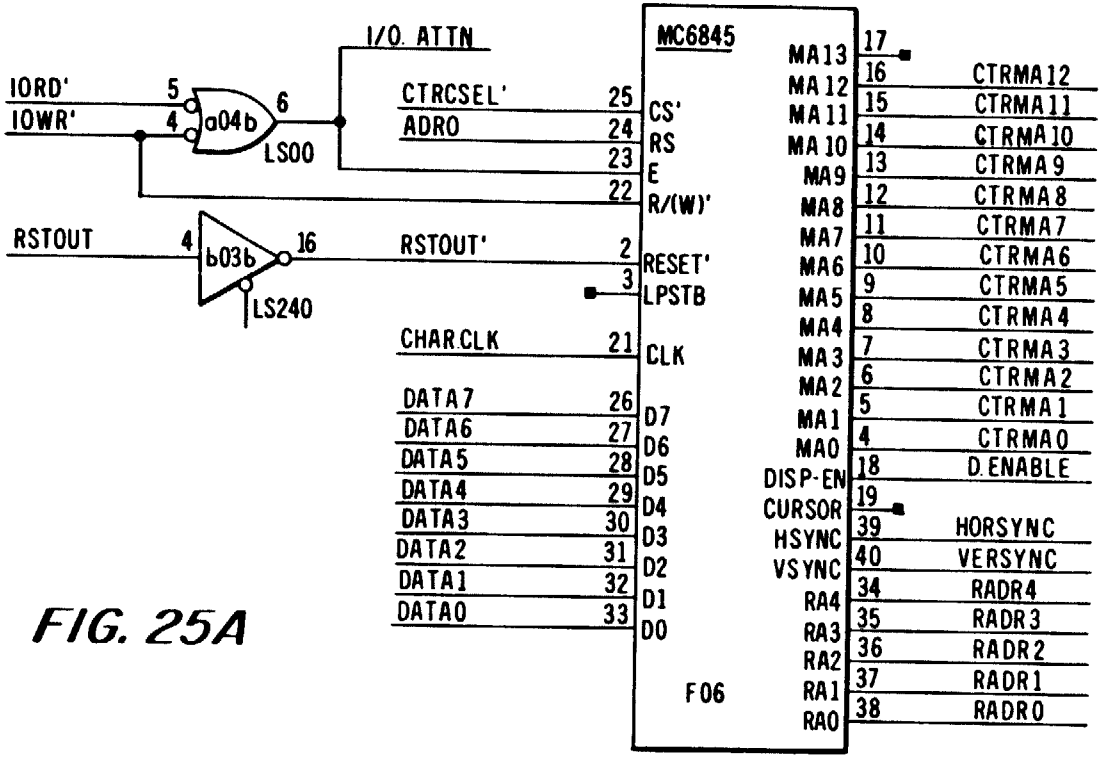
FIG. 25 is a schematic of the CRT controller.
Figure 25B:
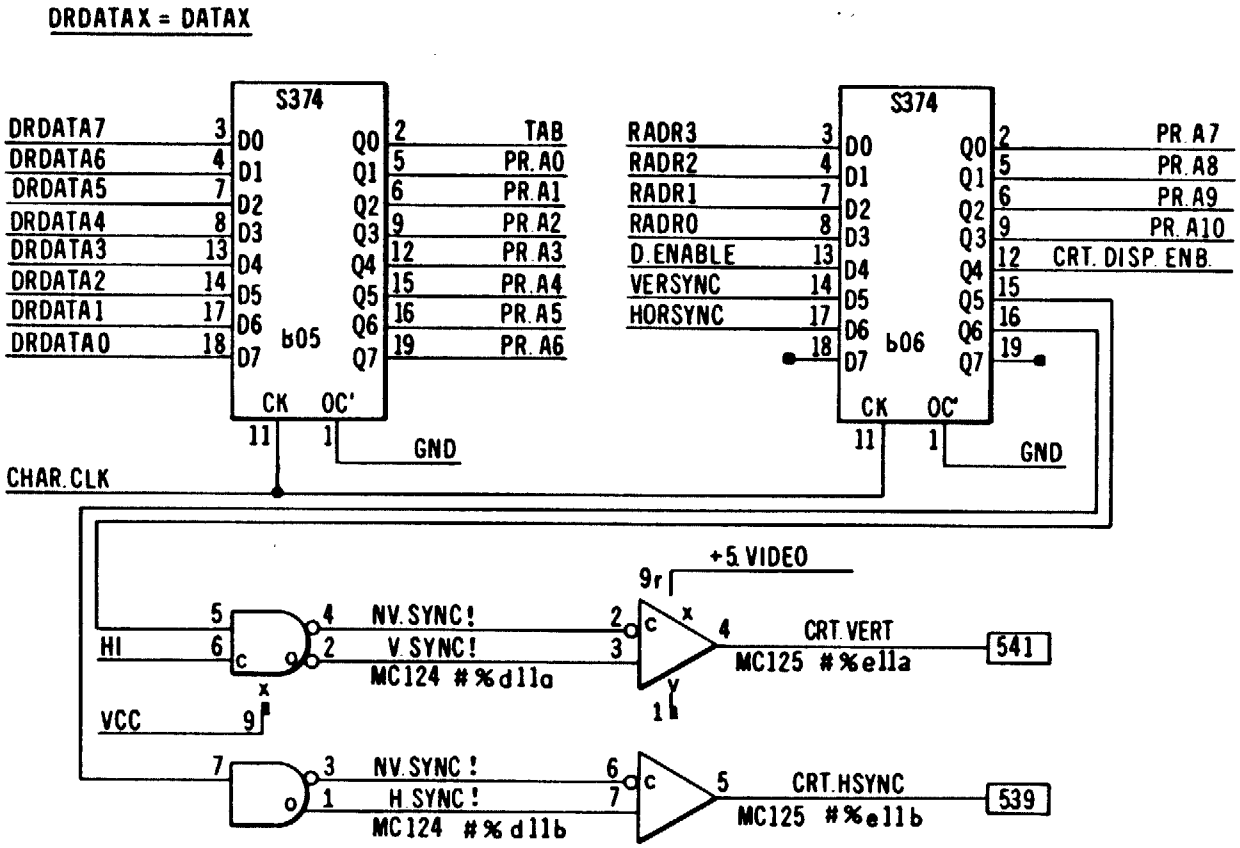
Figure 25C:
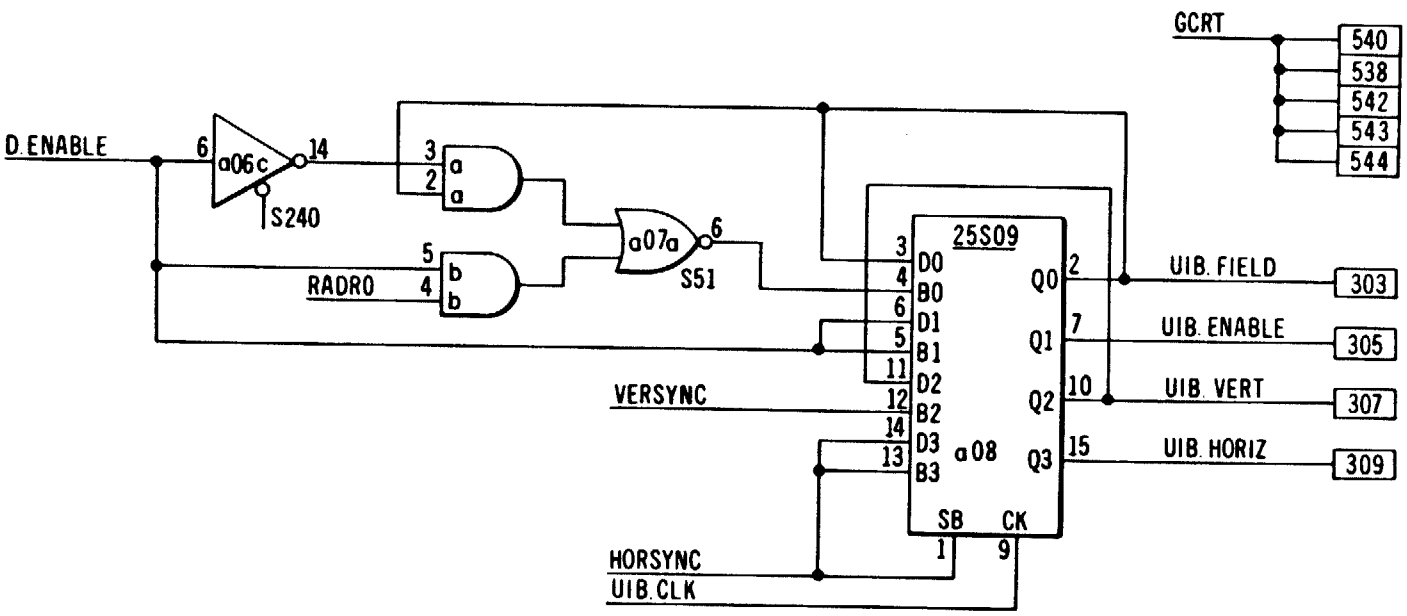

FIG. 25 is a schematic diagram of the CRT controller section and includes the CRT controller, part number MC6845. This part receives control signals and chip parameters from the processor, such as the number of scan lines in the display, the number of bits per scan line, and the interlaced mode command.

Output lines CRTMA 0-12 are character generator memory address lines, and are used to address the local memory of FIG. 11 which contains operator messages which are used in the local mode when the system processor is inoperative. This CRT controller also generates the vertical and horizontal sync pulses which are latched through device b06 and several gates to the CRT. The Disable signal is similarly latched out through multiplexer 208 to the processor and indicates whether the current fill is odd or even, and with the sync pulses, enables the output of the video from the processor when needed.

Figure 28A:
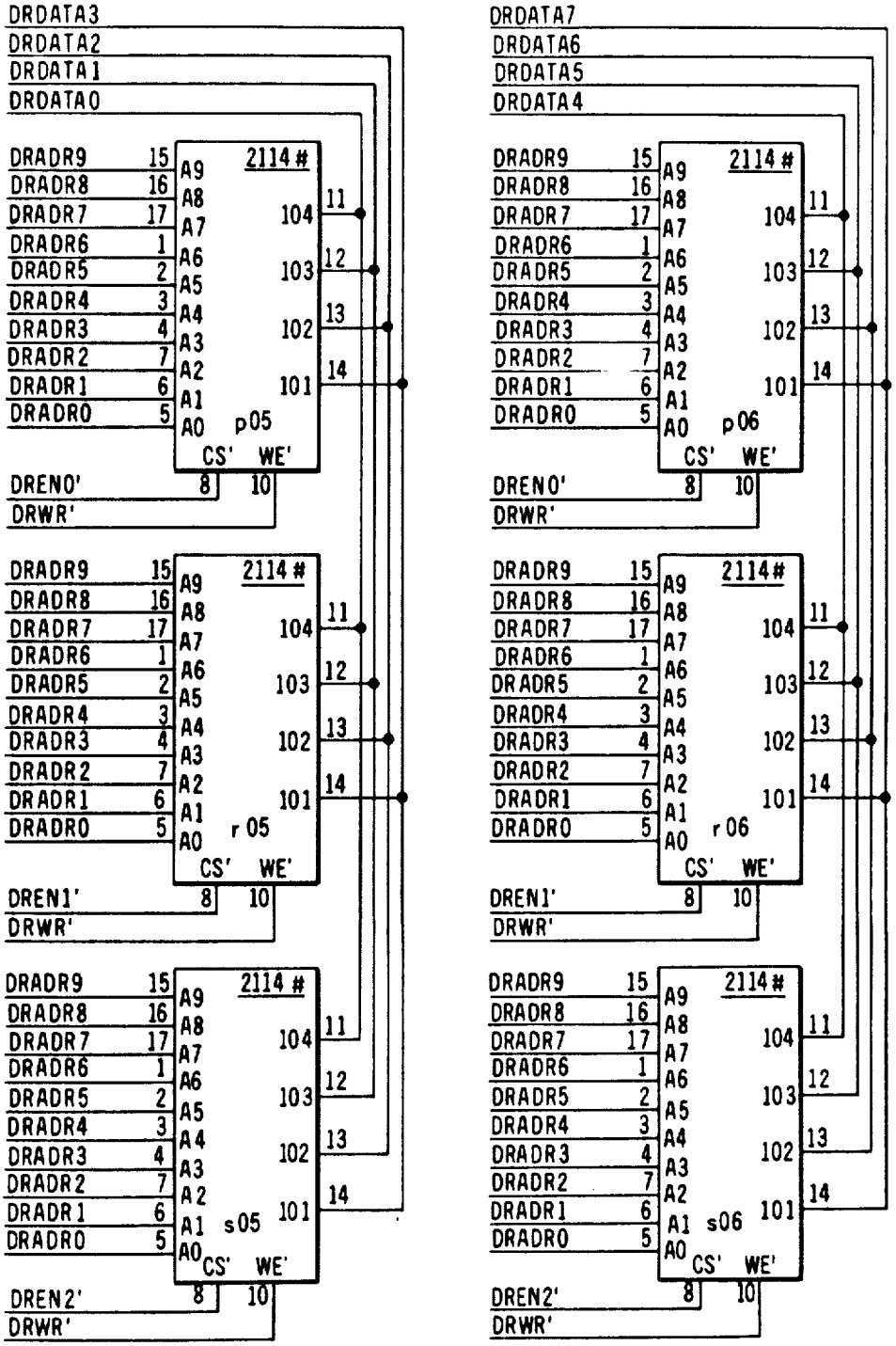
FIG. 28 is a schematic of the page buffer.
Figure 28B:
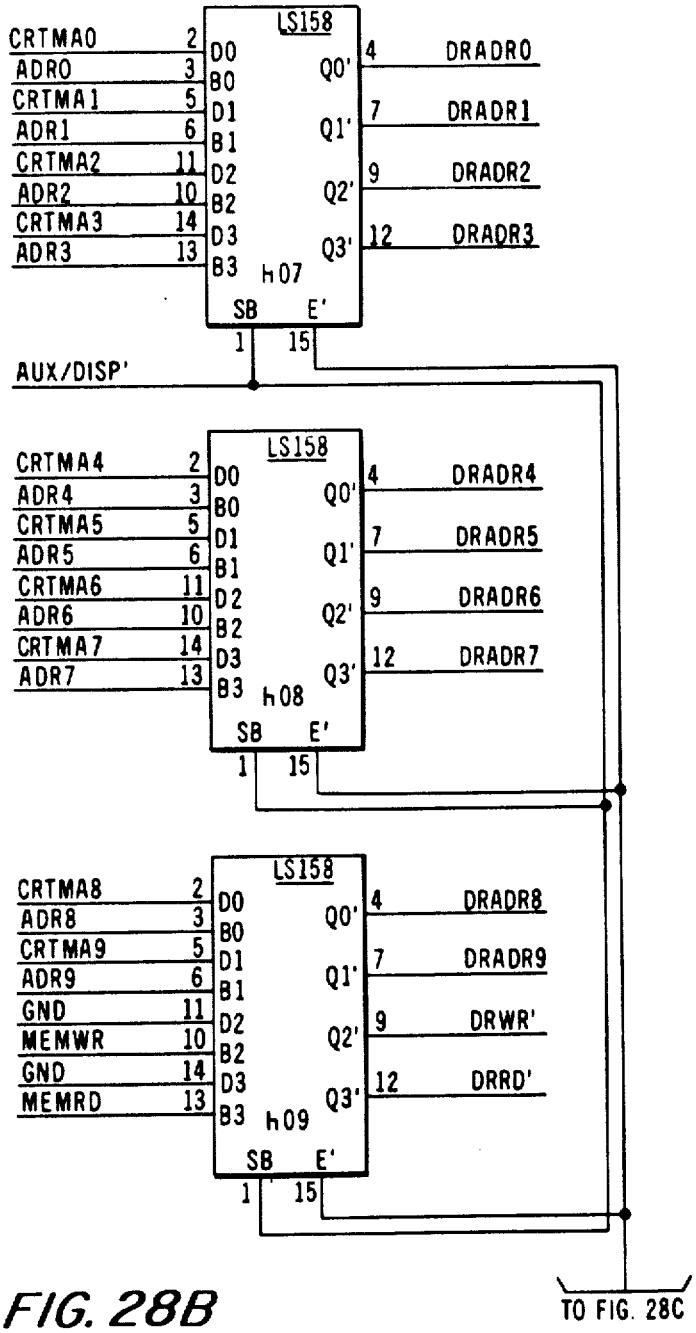
Figure 28C:
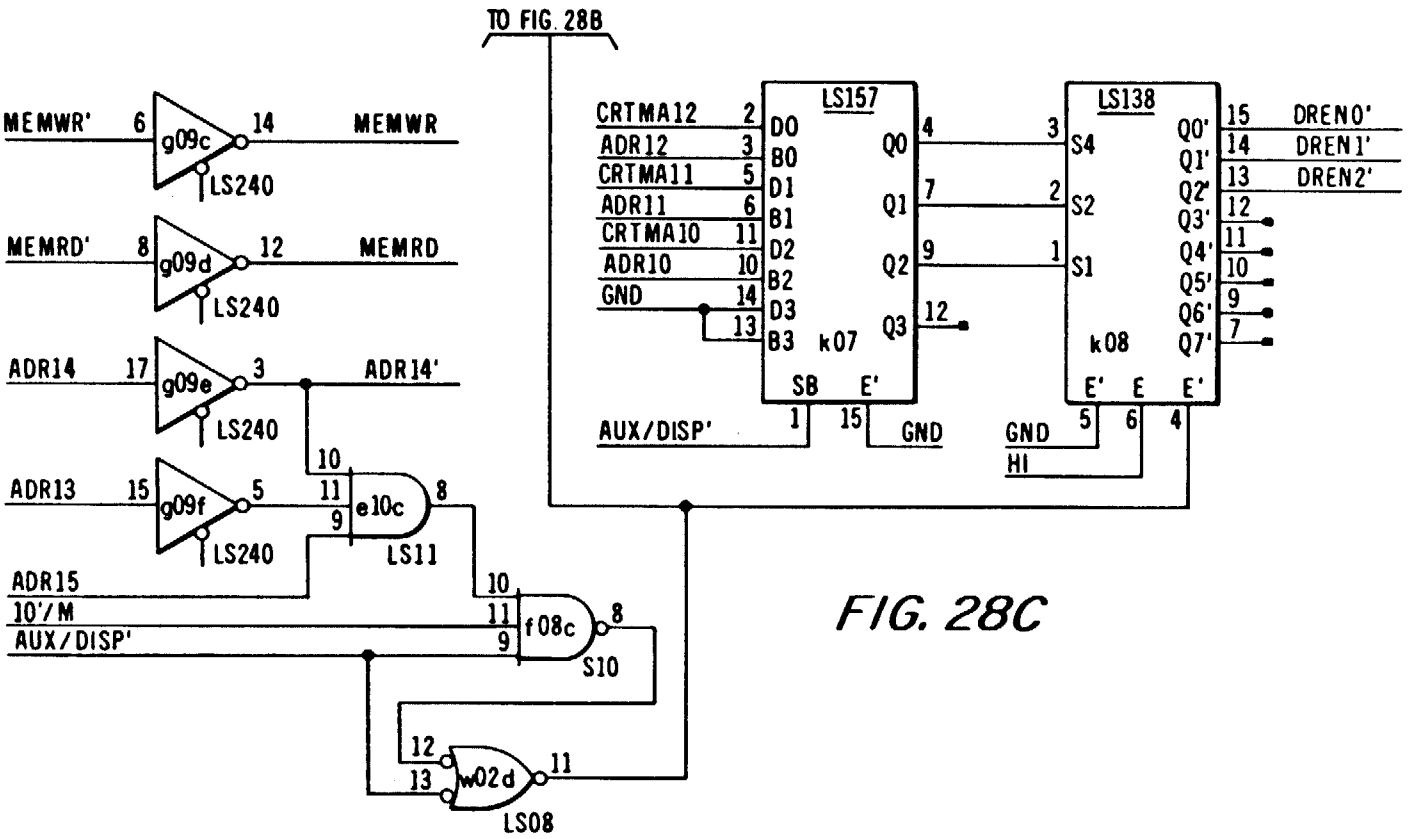

The scan line address output lines from the CRT controller RAdr 0-4 are connected to the registers b05, b06 along with lines DR Data 0-7 which may be driven by either the local message store of FIG. 28 or the processor. In either case, the outputs PR.A0-10 are coupled to the front generator of FIG. 26.

Figure 26:
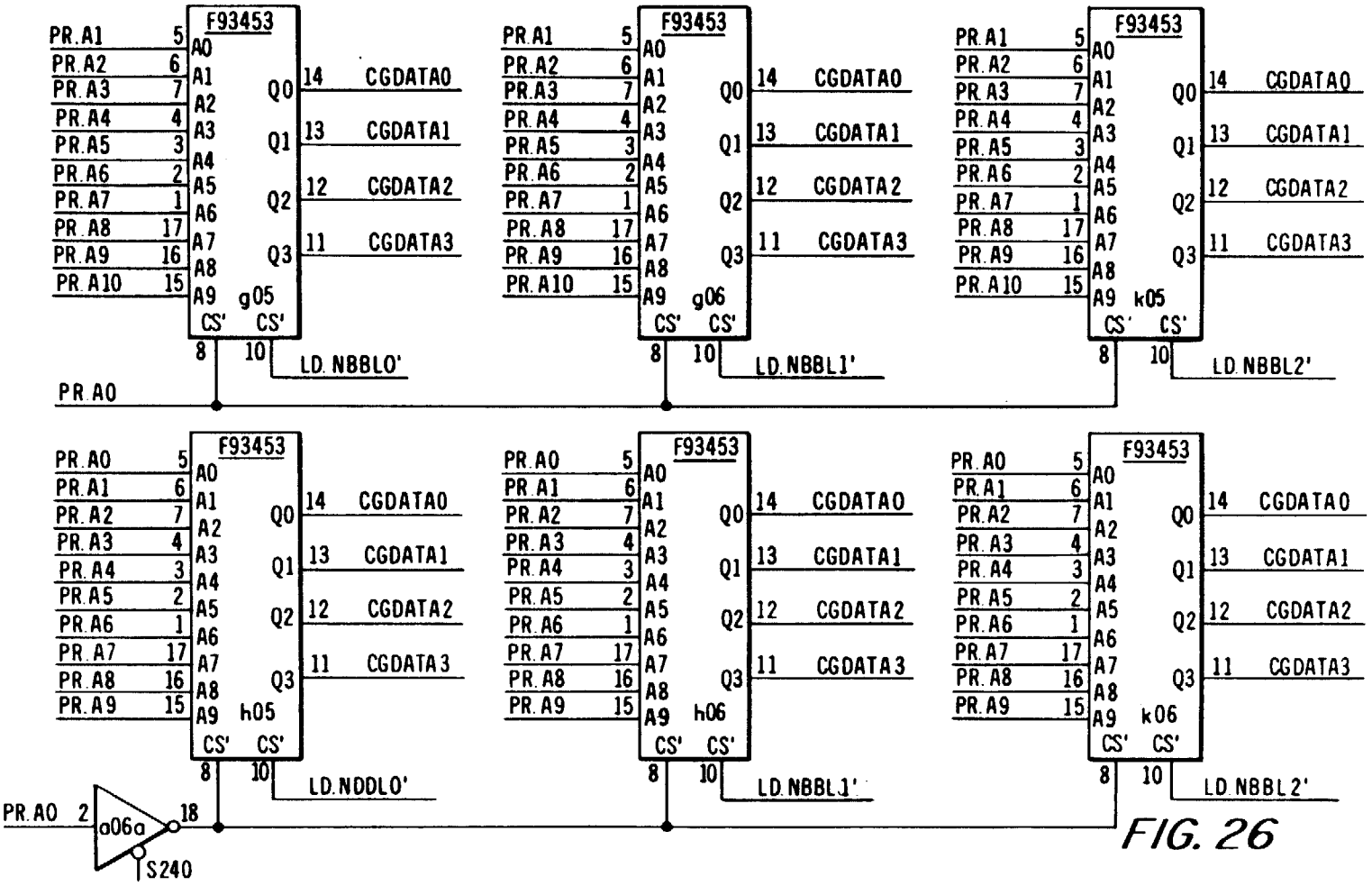
FIG. 26 is a schematic of the local font storage.

The FIG. 26 circuit comprising PROMs g05, g06, K05, h05, h06, and k06, is the local font storage, and is used if the central processor is inoperative. The address lines PR.A1-10 are coupled from FIG. 25 and the video output is coupled to the CRT on lines CGData 0-3.

Figure 27:
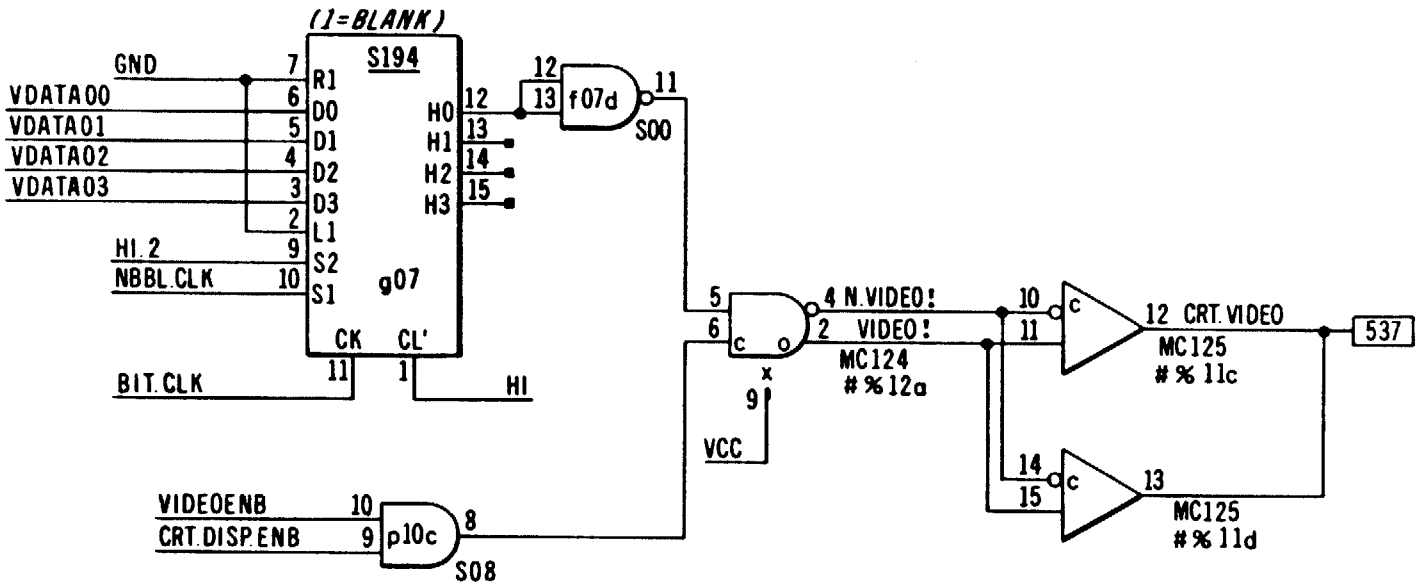
FIG. 27 is a schematic of the video output circuit.

FIG. 27 shows the path of the four bit nibbles which are supplied on lines VData 00-03 from FIG. 24 through register g07 where they are output in serial form to the CRT on the CRT.VIDEO line.

FIG. 28 is a schematic of the page buffer comprising a 3K×8 bit memory implemented from RAM devices p05, r05, s05, p06, r06, and s06. Address information is received on lines DRAdr 0-9 from multiplexers h07, R08 and R09 which select from address information from the processor on lines Adr 0-9 or from the CRT controller f06 of FIG. 25 on lines CRTMA 0-9 in the local mode. In either case its memory contents, which is a maximum of three thousand ASCII characters, will be output on lines DRData 0-3 to the registers b05 and b06 of FIG. 25. Line DRWR is the read/write enable line, allowing this memory to be loaded from the processor on the input/output lines DRData 0-7.

FIG. 28 also contains the address control for the character generator memory. This comprises a multiplexer k07 and decoder k08 for enabling two of the six memory devices p05, p06, v05, v06, 505 and 506. The DRWR line controls the read/write enable function.

Figure 29A:
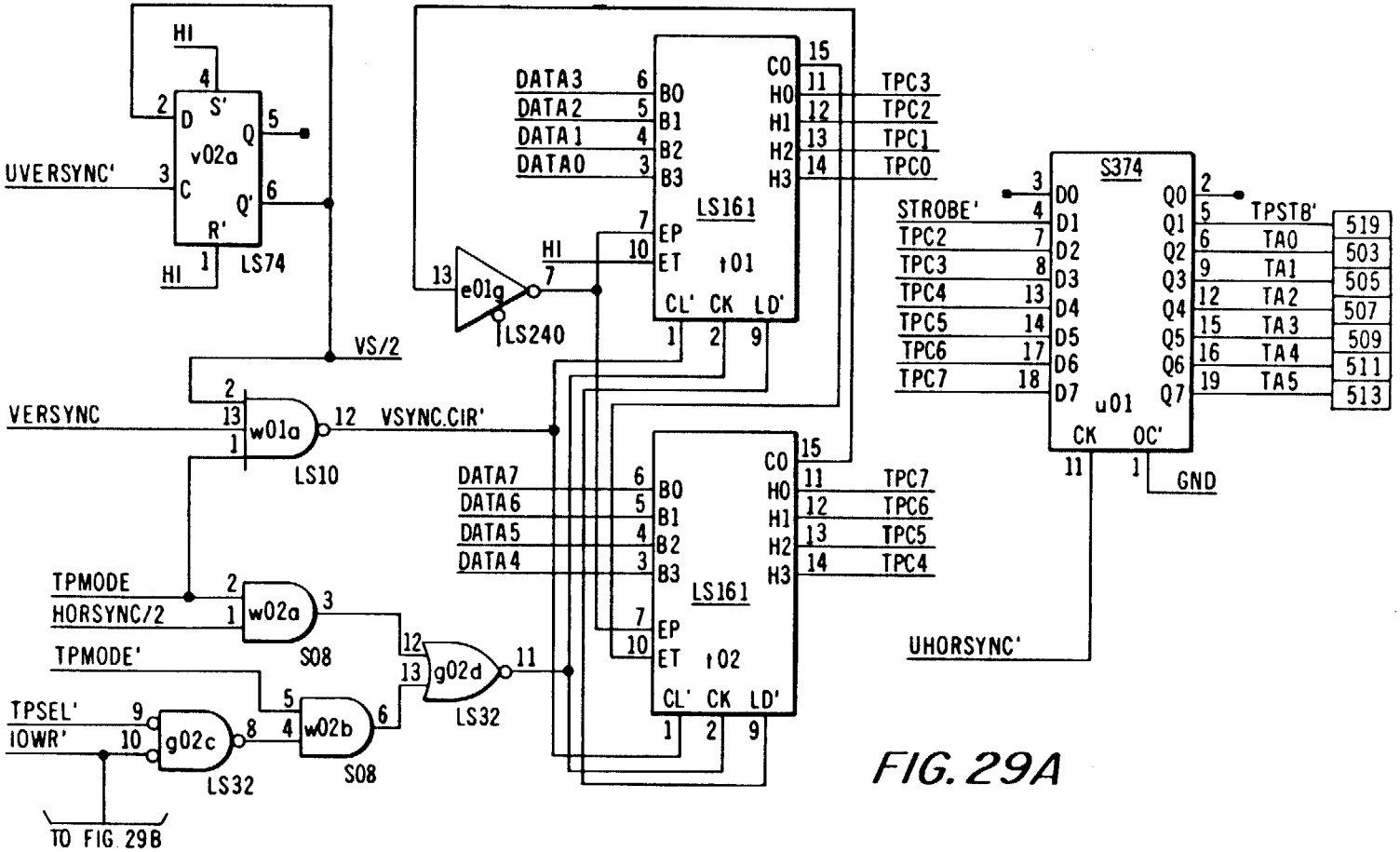
FIGS. 29 and 30 are the touch panel interface schematics.
Figure 29B:
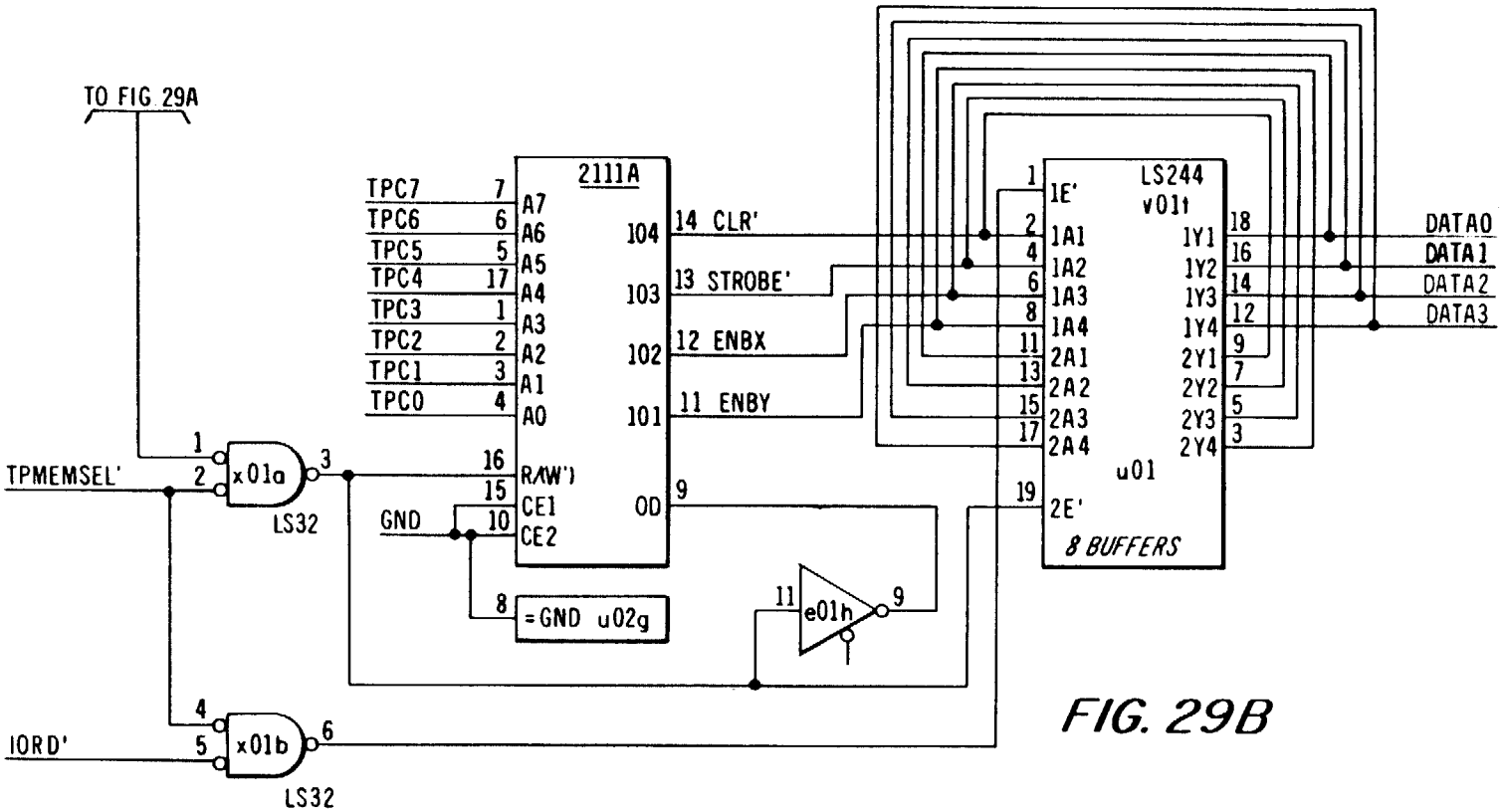
Figure 30A:
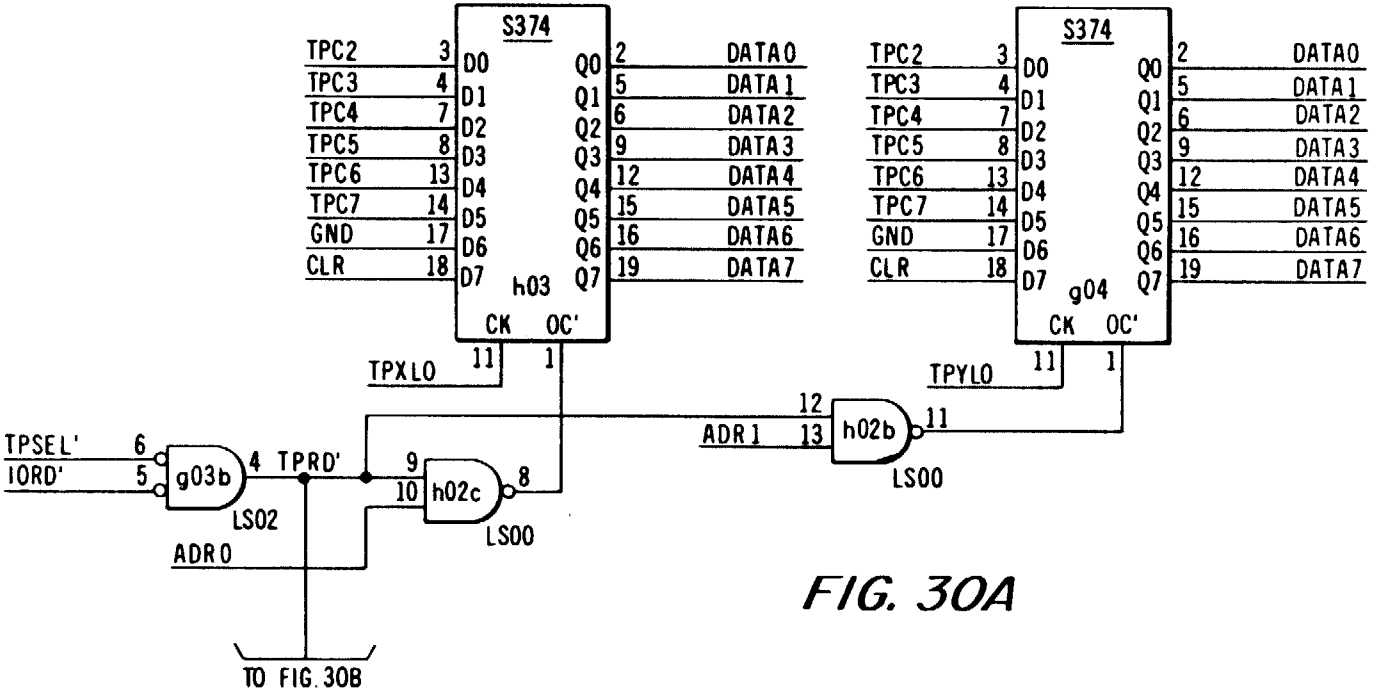
Figure 30B:
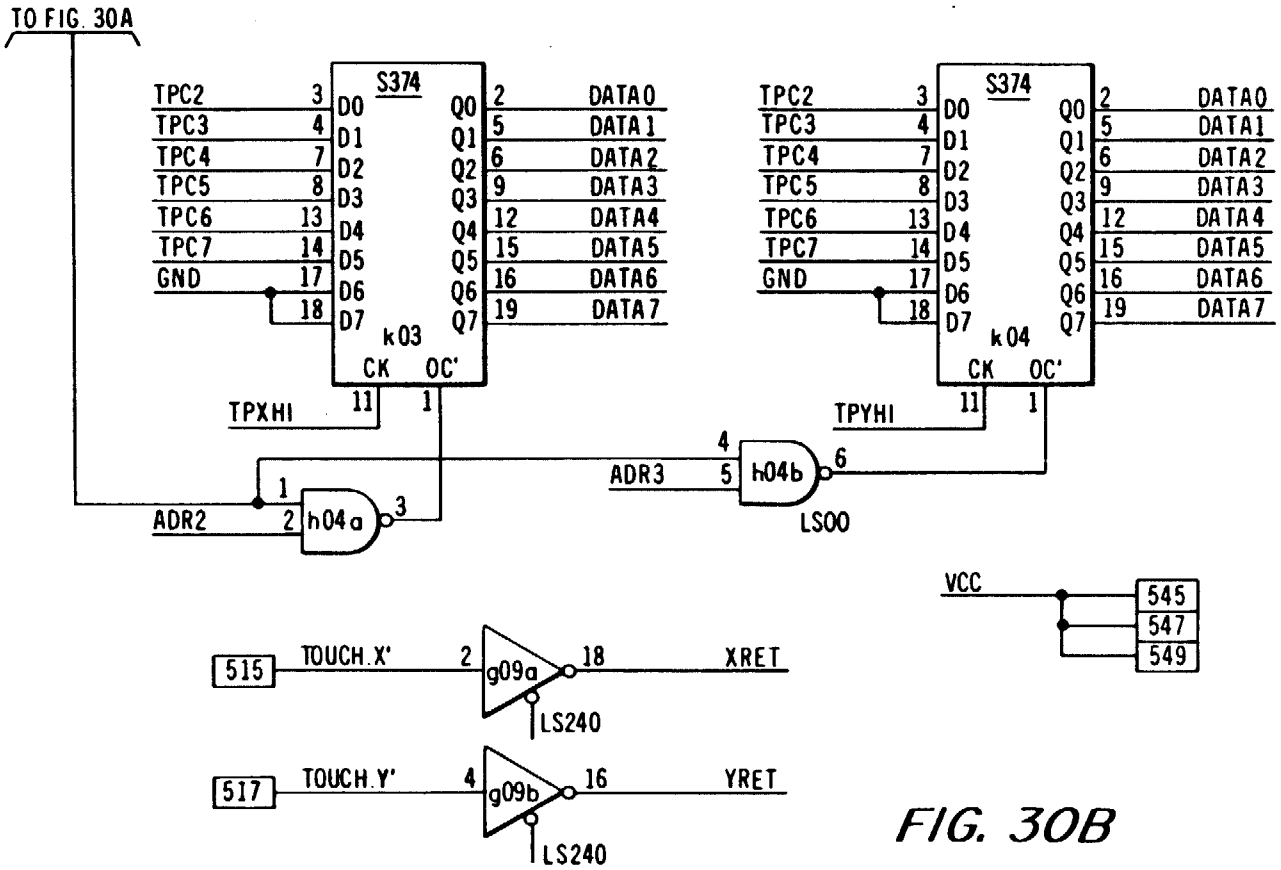
Figure 30C:
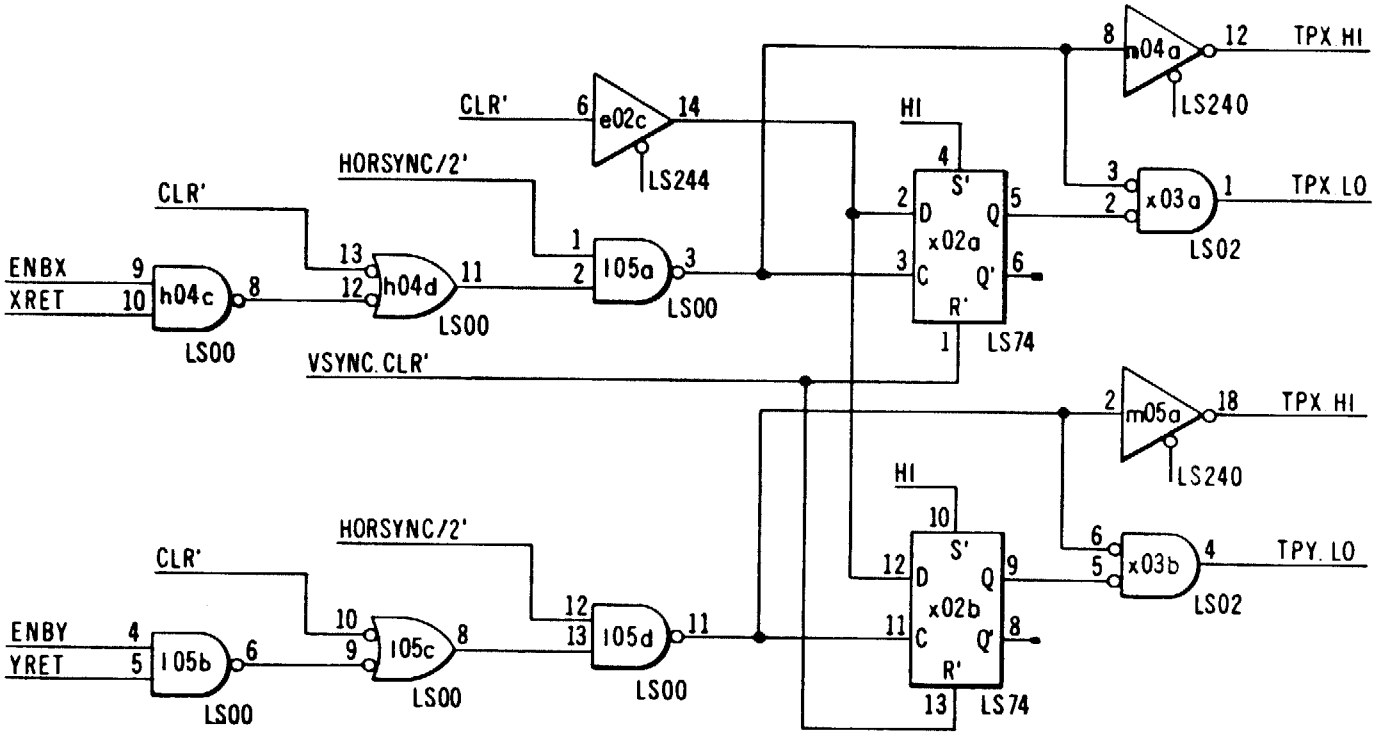

FIGS. 29 and 30 are the touch panel interface. The touch panel counter t01 t02 of FIG. 29 counts through the rows and columns, driving the control RAM u02. This RAM is loaded with the appropriate data corresponding to the number of CRT rows and columns so that an enable X strobe, ENBX and an enable Y strobe, ENBY, will be generated for each CRT row and column, as implemented by a photo diode and transistor pair. The data to load the RAM is originally received from the processor on lines Data 0-3, and the RAM output is also output on the same lines. The counter t01 t02 output also drives the touch panel strobe through resistor u01.

In FIG. 30, the count of the touch panel counter t01, t02 is latched into register h03 when the first x hit occurs. Similarly the count at the time of the last x hit is loaded in register k03. These two values are then coupled out in the Data 0-7 lines to the processor where the center of the x hit is calculated. Registors g04 and h04 are the Y minimum and maximum registers.

FIG. 30 gates g09a and g09b couple the X and Y coordinate returns to the UIL from the touch panel, as shown also in FIG. 18.

The remainder of the logic in FIG. 30 uses the timing of the X and Y return signals to produce signals TPX, HI, TPX.LO, TPY.HI and TPY.LO to latch the registers h03, g04, k03 and k04 as described above.

Figure 34:
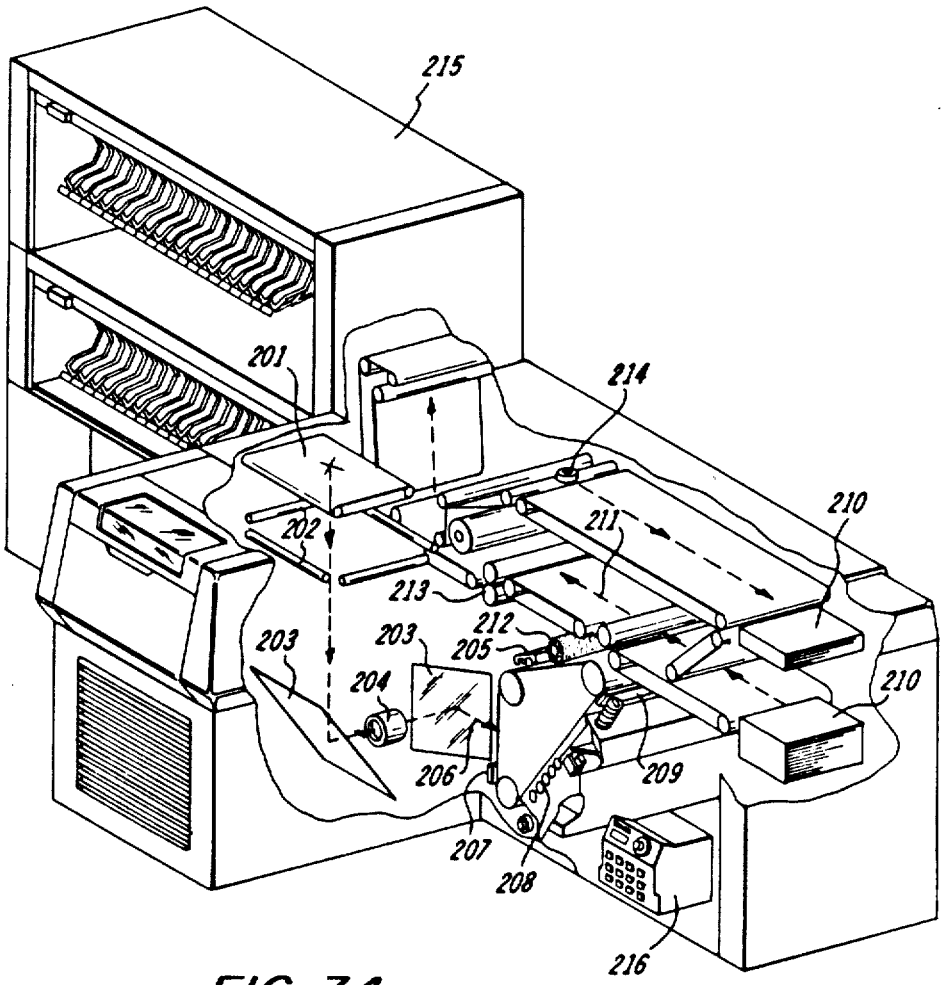
FIG. 34 is a simplified cut-away diagram of a copier.

A typical copier/duplicator, in which this invention could be used, is shown in FIG. 34. An automatic document handler 201 automatically feeds originals onto the platen glass and properly registers them against the registration edge. Four xenon lamps 202 flash to illuminate the original document. Mirrors 203 are used to reflect the image to the photoreceptor belt. Lens 204 is used to transmit infocus images of the original in several modes of amplification or reduction. The charge corotron 205 charges the photoreceptor belt. The reflected image 206 from the original discharges the photoreceptor belt in the background areas while the image area remains charged. Lamps 207 are used to discharge the area around edges and in between copies to lower dry ink consumption and keep the duplicator clean. Five magnetic rollers 208 brush the photoreceptor belt with a positively charged steel developer which carries the negatively charged dry ink. The dry ink is attracted to the positively charged areas of the photoreceptor belt to form a dry ink image. A lamp 209 and a corotron are used to loosen the dry ink image. Copy paper 210 is fed from either the main tray or the auxillary tray. Registration fingers time the copy paper to the image on the belt, properly registering the copy. The transfer of the dry ink image onto the copy paper, shown as arrows 211, takes place as the copy paper passes between the biased transfer roller and the photoreceptor belt. The detack corotron is used to strip paper from the photoreceptor belt. A lamp corona and cleaning brush 212 clean the photoreceptor belt for the next copy. Pressure and heat are applied to the copy paper as it passes through the section containing the pressure roller 213. This roller applies pressure to the copy paper and the heat roller melts the dry ink into the copy paper. The turnaround station 214 is used to return copies to the auxillary tray for automatic duplexing if the system is, in fact, capable of that function. When running duplex copies into the sorter 215, the copies are inverted here for proper orientation in the sorter. The sorter automatically collates copies into sets or stacks depending on the mode elected. A maintance module 216 may be used by the technical representative or key operator to adjust the various system voltages and currents to the correct specifications.

The copier/duplicator described herein projects a focused square image from the document glass to the photoreceptor belt. Components used in the image projection are an object mirror 220 of FIG. 36, a lens 221, additional lens 222, an image mirror 223 and a lens aperture control, not shown. The document image is transmitted from the document glass to the photoreceptor by these two mirrors and lenses.

Copy size is adjustable to produce a copy that is either larger or smaller than the original. In the configuration shown in FIG. 35, the copy sizes are 101.5%, 98%, 74% and 65%. The two methods of varying the copy size is to reposition the lens assembly or to add additional lenses. Both methods are used in this described embodiment.

Figure 35A:
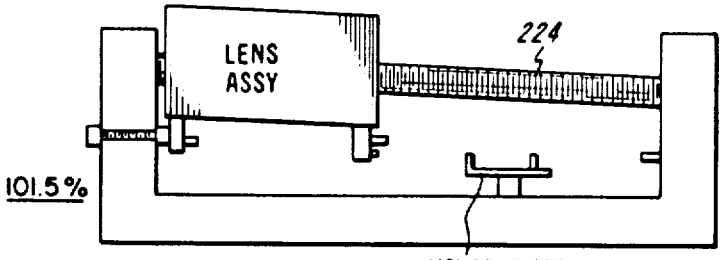
FIG. 35 is a diagram of the system's moveable lens assembly.
Figure 35B:
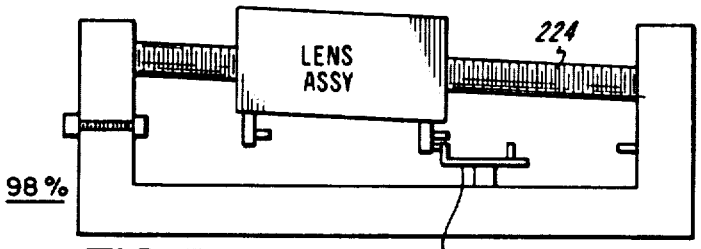
Figure 35C:
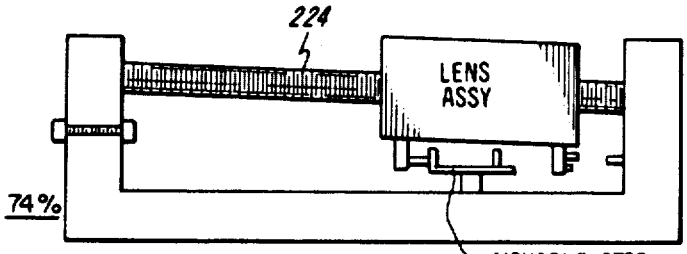
Figure 35D:
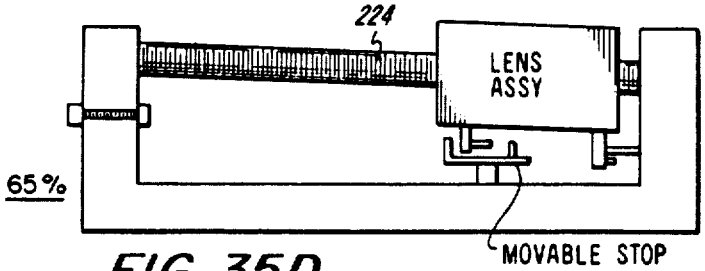
Figure 36:
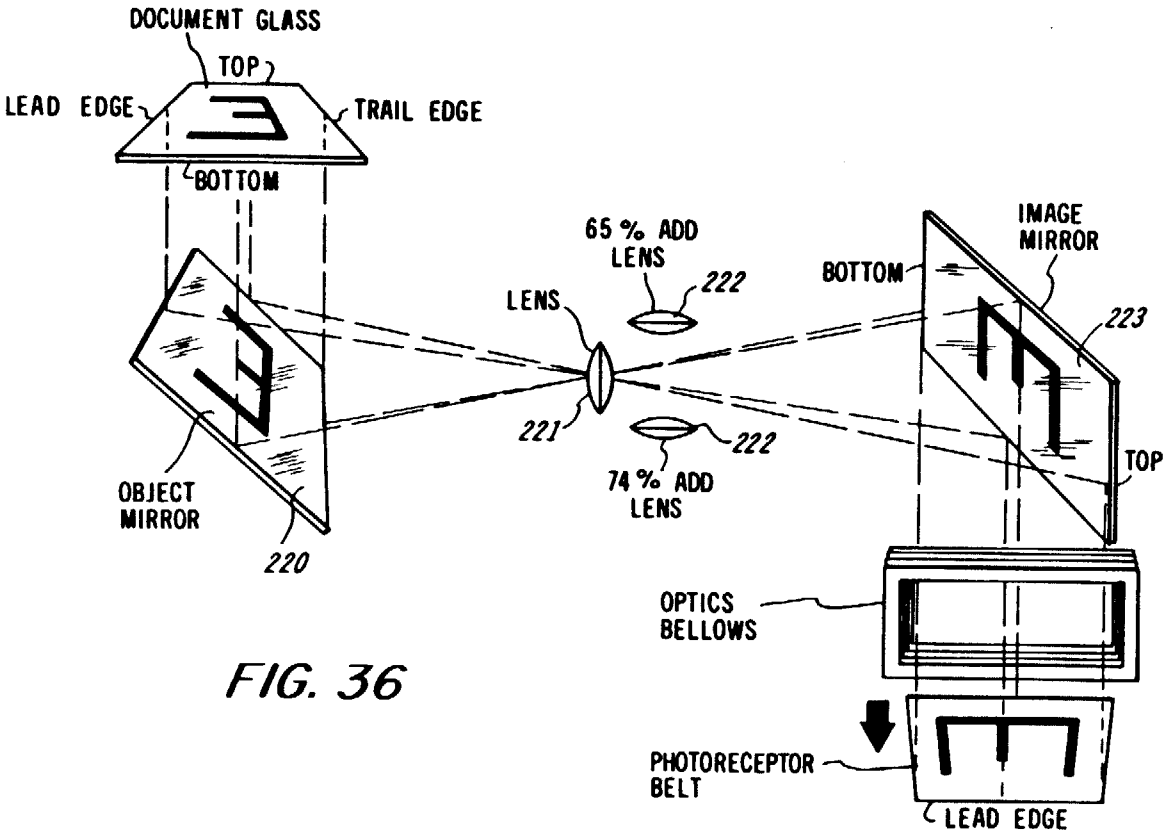
FIG. 36 is a diagram of the lens arrangement.

As shown in FIG. 36, the 65% and 74% copy sizes are made possible through the use of additional lenses to change the focal length of the lens to insure proper focus. The factor that determines the position of the lens and the total length of the optical path is the focal length of the lens. The focal length is the distance behind the lens that will focus incoming parallel rays from an object that is at an infinite distance from the lens. In the 74% and 65% reduction modes, there is considerable movement of the lens toward the image plane. To keep the image in focus, it is necessary to change the focal length of the lens. This is effectively accomplished by the additional lens elements 222 of FIG. 36. The added lens are attached to the lens assembly and moved into position by cams located inside the optics cavity. In addition, sensing elements are attached to the additional lenses to signal to the user interface processor that the focal length has been changed. In addition to the use of additional lenses, the distance between the lens and the image mirror must also be adjustable. A schematic of this adjustment is shown in FIG. 35 where the lens assembly motion is controlled by a lead screw 224 which drives the lens assembly and a moveable stop. As shown in the upper diaphragm, the lens assembly in its left most position produces a 100.5% copy size. For a copy size of 98% of the original the lead screw drives the lens assembly to the position shown in FIG. 35B. To achieve a 74% copy size the moveable stop rotates temporarily out of interference with the lens assembly and allows the lens assembly to continue on to the position shown in FIG. 35C. In similar fashion, a 65% copy size is shown in FIG. 35D. To change from a lower to a higher percent copy size, it is necessary for the lens assembly to be driven to the left past its destination and then driven to the right to contact the moveable stop. The action of the lead-screw, and therefore the action of the lens assembly and moveable stops, is controlled by the copier/duplicator control processor, with positioning pickoffs coupled to the processor to communicate various lead screw and lens assembly positions.

The smooth adjustment of size of the copy in relation to the size of the original is indicated to the operator on the user interface display shown in FIG. 16, where the lens assembly position is sensed and coupled to the user interface to produce a bar chart type of indicator which tells the operator what, on a scale from 65% to 100% or greater, the actual copy size will be. Furthermore, the operator, by touching the "higher" indicator 162 or the "lower" indicator 163, can input to the system a command for increasing or decreasing the copy size. In this way, communication between the copier and the operator is implemented in terms easily understandable to an operator, even one that is not trained for this specific system.

Figure 37:
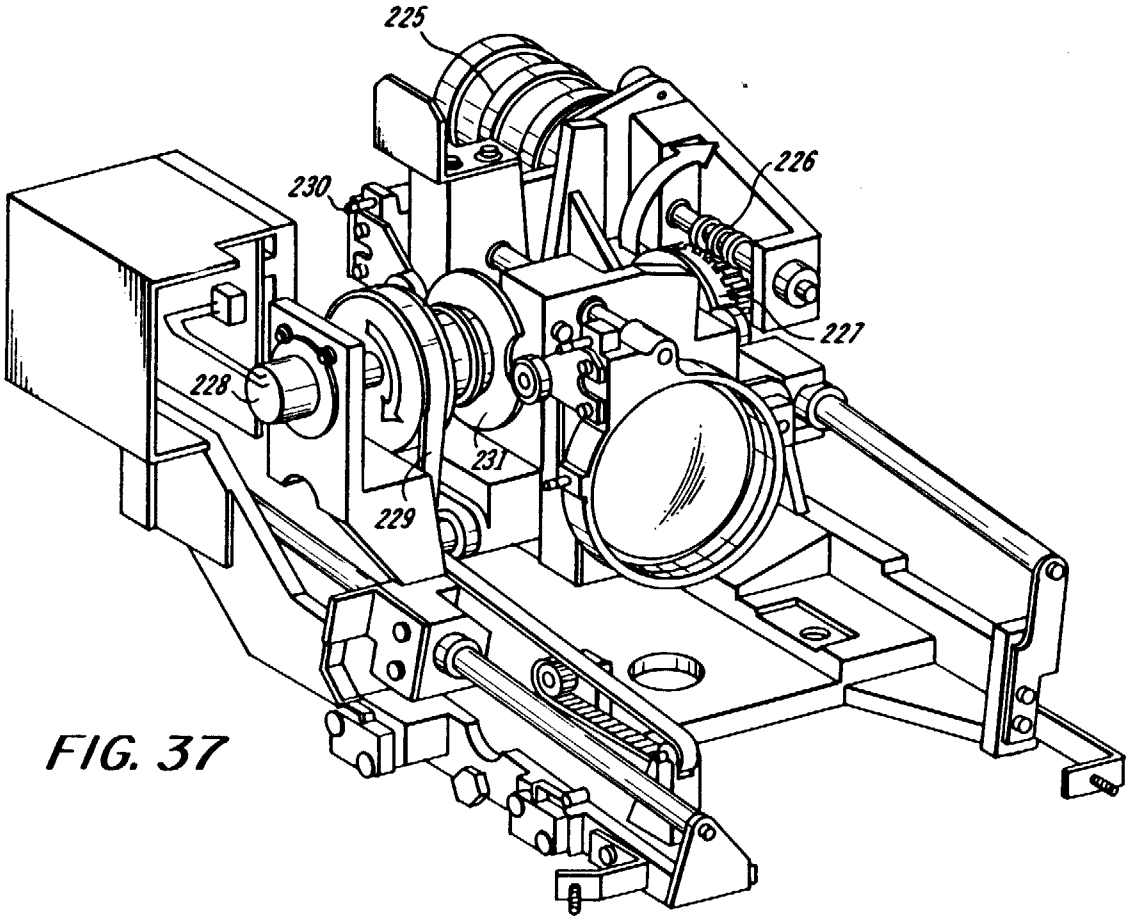
FIG. 37 is a detailed view of the lens arrangement.

FIG. 37 is a more detailed view of the lens assembly. The motor 225 drives the worm-gear 226 in a clockwise direction. This worm-gear 226 in turn transfers the drive to the lens drive shaft 227, the shaft extending completely through the lens assembly to the potentiometer 228 which senses the lens position and produces a corresponding voltage. This voltage is compared to a reference voltage to determine the actual lens position. When the lens position voltage equals the variable reference voltage, a relay de-energizes to stop drive power to the lens assembly motor 225. The position of the shaft 227 is coupled to the lens assembly by a belt 229.

The reference voltage is generated as a function of the "percent of original" bar indicator of FIG. 16. As long as this voltage differs from the potentiometer 228 output voltage, the motor 225 will continue to be driven. The control circuit is arranged so that when the lens is driven to the right, a relay with a built-in time delay will result in the lens driving past the selected position. The lens position voltage at this time would then be lower than the variable reference voltage and a second relay will energize causing the lens assembly to be driven left to the selected position. In other words the lens assembly will always reach its final position from the right, travelling left.

Aperture control and focusing occur simultaneously with lens positioning. As the lens moves to any position (in either direction) a spring loaded follower 230 directly connected to the lens aperture components follows the aperture guide. This insures the correct exposure intensity is maintained for all reduction selections between 102% and 61.5%. Focusing occurs when the lens focusing cams rotate and the lens focusing cam followers move the two lens objectives to achieve focus. When the lens position voltage equals the variable reference voltage the relay is de-energized and lens movement stops. Lens focusing cams 231 move the two lens objective to achieve focus.

In a similar fashion the user interface can control the image density of the copy. In both cases, a continuous machine function can be represented by a one dimensional display on the user interface which gives the operator an immediate and easily understandable indication of the function being controlled. It is frequently necessary to control the image density for colored originals, for which the image density may have to be set lighter, and for light originals, for which the density may have to be set darker.

Figure 39:
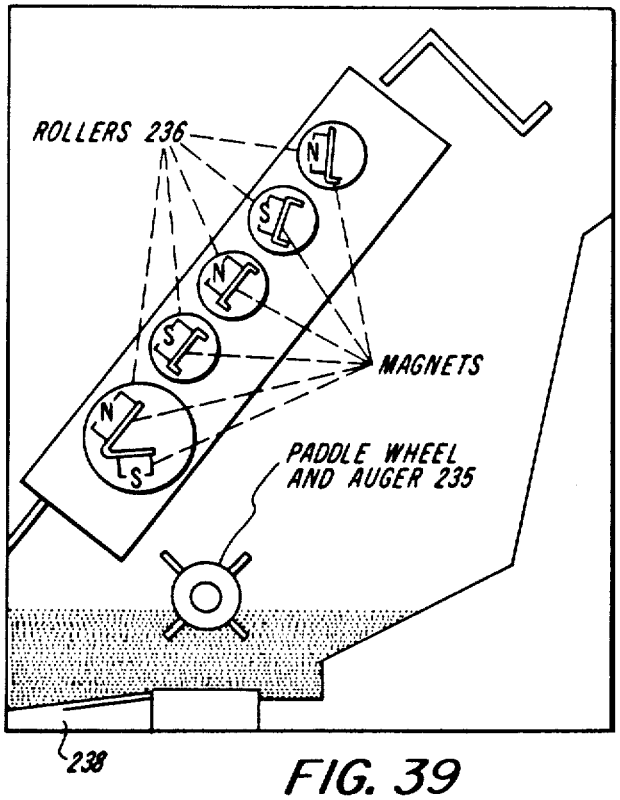
FIG. 39 is a diagram which shows how the developer system operates.

In the copier, when the developer leaves the container 232 through the action of the drive belt 234 and dispensing roll 235, it falls through a screen 233 which removes foreign materials such as staples, paper clips, etc. from the developer, preventing photoreceptor belt damage. A motor on signal from the controller turns the developer drive motor, not shown, on during the print operation which is coupled to the drive belt 234 and the paddle wheel 235 of FIG. 39.

Figure 38:
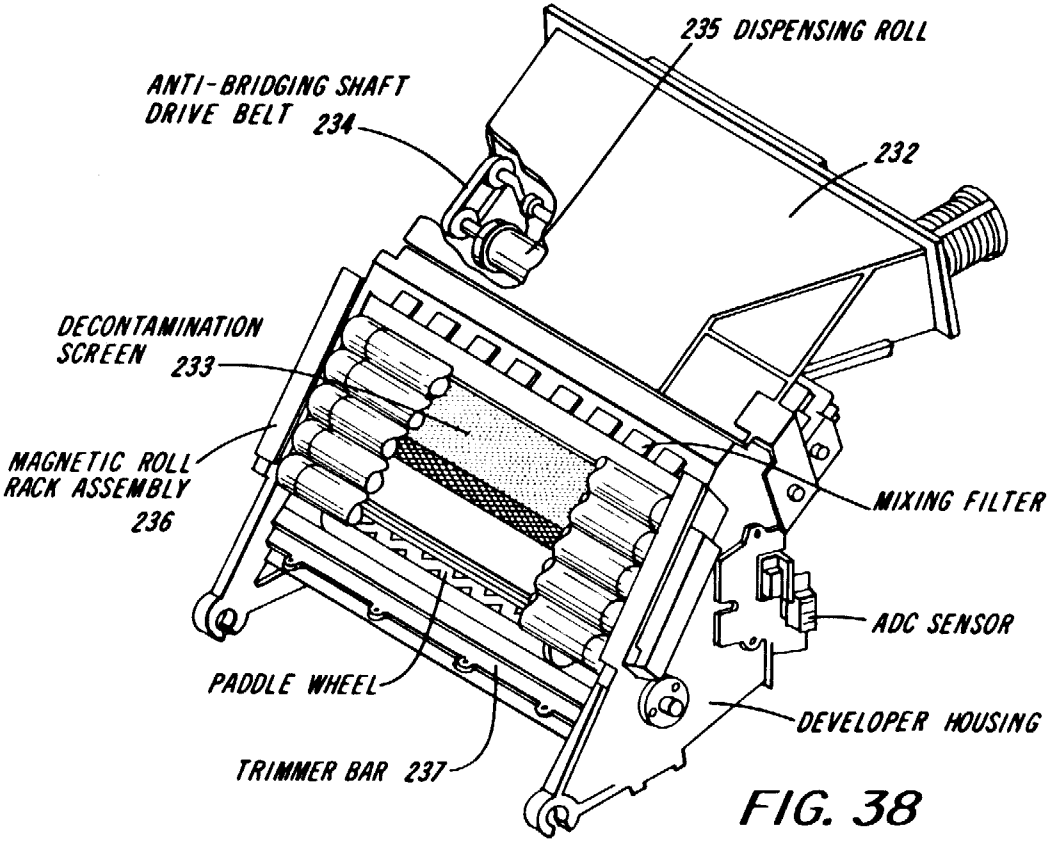
FIG. 38 is a view of the developer system.

The paddle wheel vigorously mixes the developer and toner, completing the mixing process. The paddle wheel 235 transports the developer to the lower magnetic roll 236 of FIGS. 38 and 39, where the developer is magnetically attracted to the lower roll. As the roll turns a magnetic brush of developer is formed. To control the height of the brush, a trimmer bar 237 is used. The adjustment of the trimmer bar is important to the height of the developer on the roll. Too small a gap provides less developer flow, and too much of a gap allows too much developer onto the roll. If the gap is too close, the brushing has little effect, if too great the developer brush will break up the developed image. The excess developer is separated from the lower roller and returned to the sump 238 in the developer housing. Each magnetic roller has a permanent magnet inside of the rotating outer roll. The magnet is held stationary by a flat spot on the magnet. These magnets are polarized by a steel strip (keeper) glued to one side of the magnet. This polarizing of the magnet makes it very strong on one side, and weak on the other. As the roller turns, the developer walks from roller to roller and forms an endless belt or blanket of developer to brush the photoreceptor.

The goal of the copying process is to develop a copy with no background. The copier must therefore deal with three types of originals: normal originals, such as black typewritten pages on white paper, colored originals such as black letters on colored paper, and light originals such as light blue or faint pencil marks on white paper. The roll rack 239 has a biased voltage that will improve copy quality for all three types of originals. The operator, through the user interface display, is able to change this bias by the selection of "variable density", for different degrees of original quality.

The display seen by the operator is similar to the display for a reduction of the original as shown in FIG. 16, except that the "higher" and "lower" controls will refer to greater or less copy density. In all other respects the operation of the user interface with respect to the machine function to be controlled is very similar.

Figure 40:
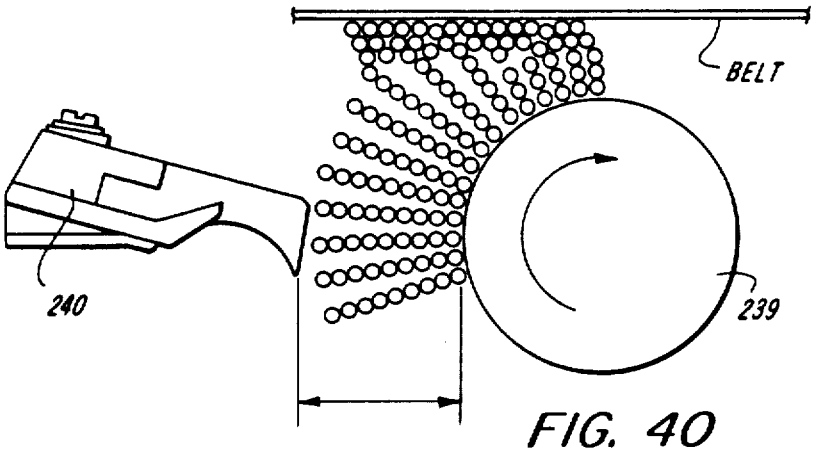
FIG. 40 is a diagram of the roll rack.

For normal originals, at exposure the image area of the photoreceptor belt will have a charge of 800 volts DC. The background voltage will be 200 DC. To eliminate dry ink from being attracted to the background, where there is a charge of 200 volts, the roll rack 239 of FIG. 40 is biased to 300 volts (see FIG. 41). With the image charge higher than the roll rack bias, the dry ink is transferred from the carrier beads to the laten image on the photoreceptor. At the same time however, no dry ink will transfer to the background because the roll rack has a greater potential than the background.

For colored background originals such as a dark brown image on light brown paper, the charges on the photo receptor belt after exposure would be approximately 600 volts for the image and 450 volts for the background. Under normal copy conditions, the bias on the roll rack would be 300 volts. This would allow dry ink to transfer into the background areas and print a copy with a gray background. However, if variable density is selected, the bias can be raised to about 400 volts, the voltage of the roll rack and the background are about equal and very little dry ink will transfer onto the background.

Light originals, such as light blue print, or a light pencil, must be copied with the user interface variable density option selected. The charge on the photoreceptor belt under these conditions is approximately 250 volts in the latent image area and 200 volts in the background area. If a normal developer bias of 300 volts were used, very little dry ink would be transferred even for the image. However, with variable density selected, the developer bias can be reduced to 200 volts. This lower developer bias would allow dry ink to be transferred to the image area and not to the background area.

Figure 41:
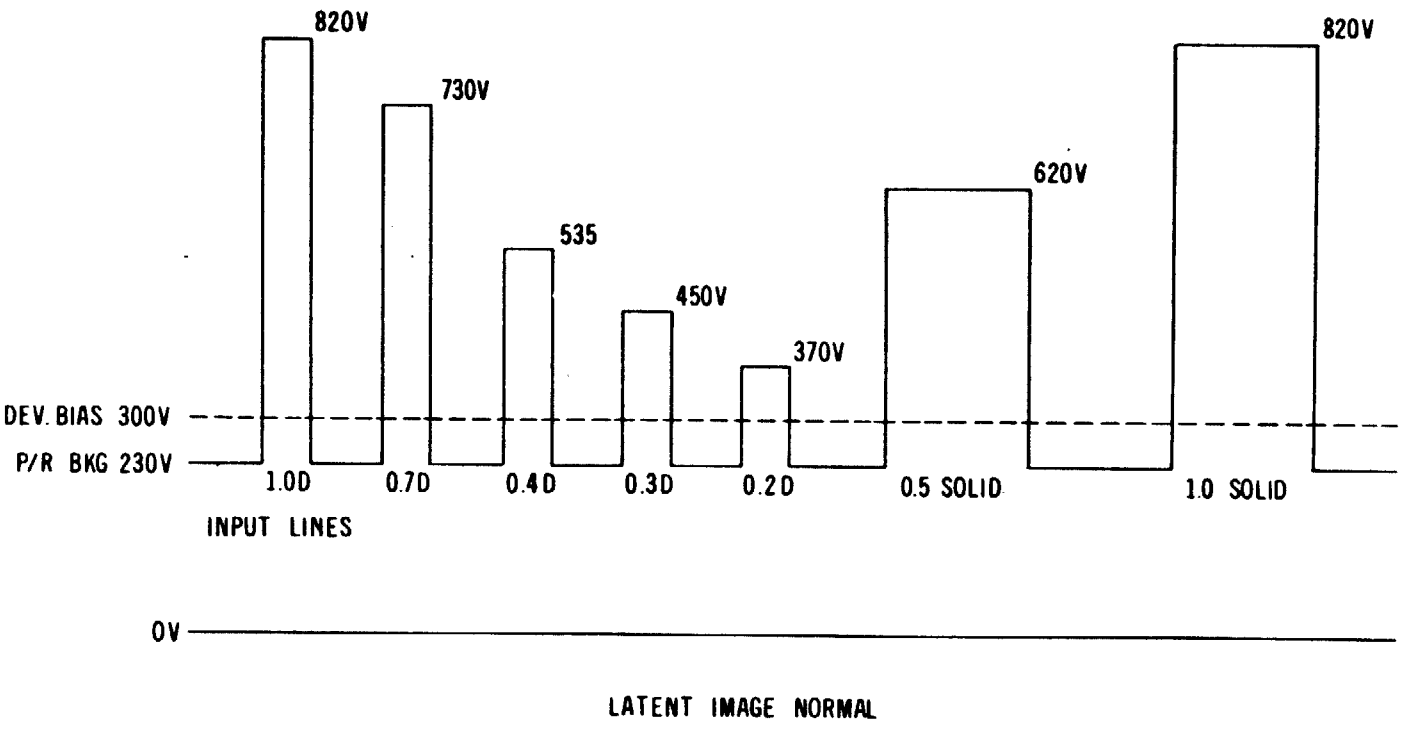
FIG. 41 is a diagram of normal latent image voltages.

Another function which can be efficiently and easily controlled from the user interface is the elimination of lines resulting from a paste up of the original. A post—exposure corotron is included in the system. It is used to expose the receptor belt after exposure to the document. This corotron will add a DC voltage to the photoreceptor belt. This voltage will increase the background and solid area potentials, but not the line image potentials which are generated by paste up edges, typically with small line densities as shown in FIG. 41.

Figure 42:
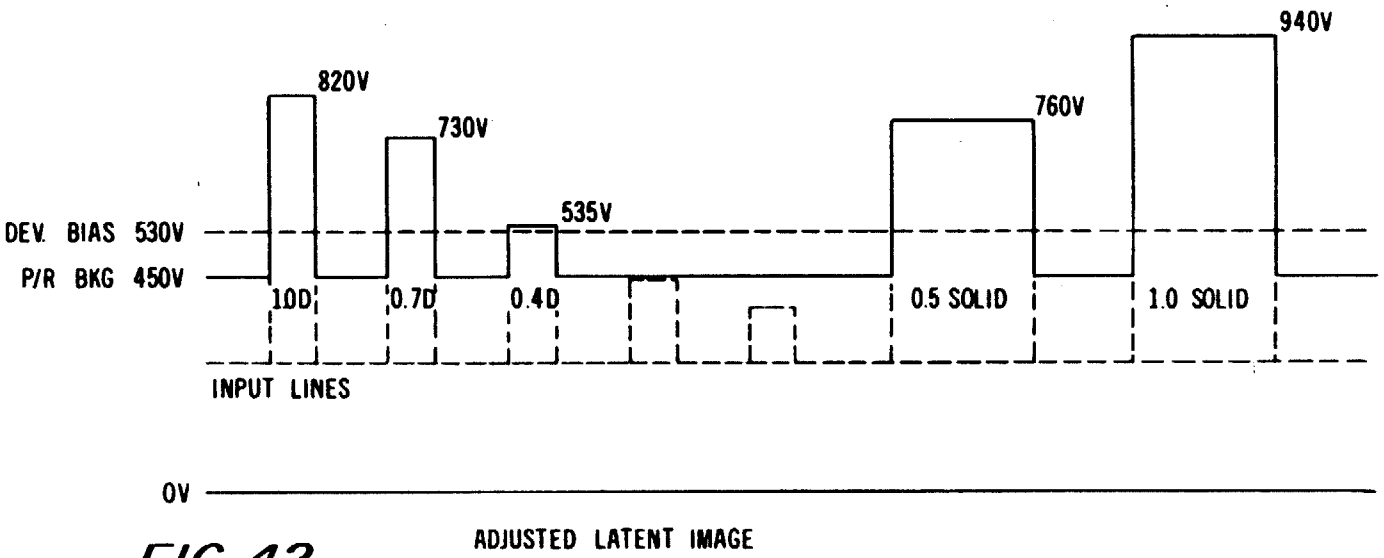
FIG. 42 is a diagram of biased latent image voltages.
Figure 44:
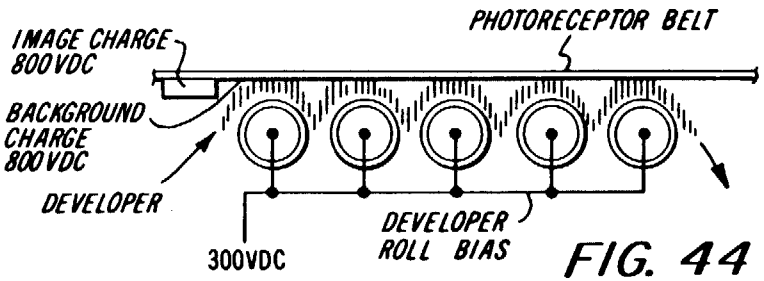
FIG. 44 is a diagram showing the application of developer to the photoreceptor belt.

To keep the background to a nominal level, the developer bias voltage is thereby raised to insure a minimum distance of about 80 volts between the developer housing roll rack and the photoreceptor belt background voltage, as shown in FIG. 42. As a result, the lower density line images are suppressed as a function of the post exposure corotron voltage.

The level of this post exposure corotron generated voltage is easily controllable from the user interface through the user of a display similar to the one of FIG. 16. Under normal machine operation, a low preset value of post exposure corotron voltage is applied to the photoreceptor belt. However, when a "lighter/darker select button" is pressed the lighter/darker control becomes operable. This display is not shown because it is highly similar to the one shown in FIG. 16. It has a control scaled from 0 to 10. At the low end of the scale, the value of the post exposure corotron voltage is at its highest. A paste up suppression indicator would be given to the operator and the copies would be lightest at the 0 end of the display. As the control is manually adjusted toward 10 on the user interface scale, the value of the post exposure corotorn voltage decreases and the copies get darker. At approximately 4 on the indicated scale, the post exposure corotron is turned off completely and a "bold" indicator is shown.

Another category of machine functions that can be most efficiently controlled from the kind of user interface described herein is the detection and correction of copier jams, and the associated function of indicating the results of self-run system diagnostics. A copier may be implemented with light source/light sensor circuits which monitor the paper flow. As the paper comes between the source and sensor, a discrete signal is sent to the processor which monitors the timing of the signal. A jam is indicated when the light beam is blocked too soon, too late, out of sequence, or permanently rather than for a predetermined amount of time. A fault indication can then be flashed to the operator. Of course, this kind of fault monitoring can be implemented using any kind of machine operator interface. The advantage of the user interface described herein is that in addition to a verbal description, any one of a large number of images or diagrams corresponding to the machine location and function can simultaneously be given to the operator, even one that is untrained, so that the operator will quickly and easily understand the location and nature of the problem.

Figure 43:
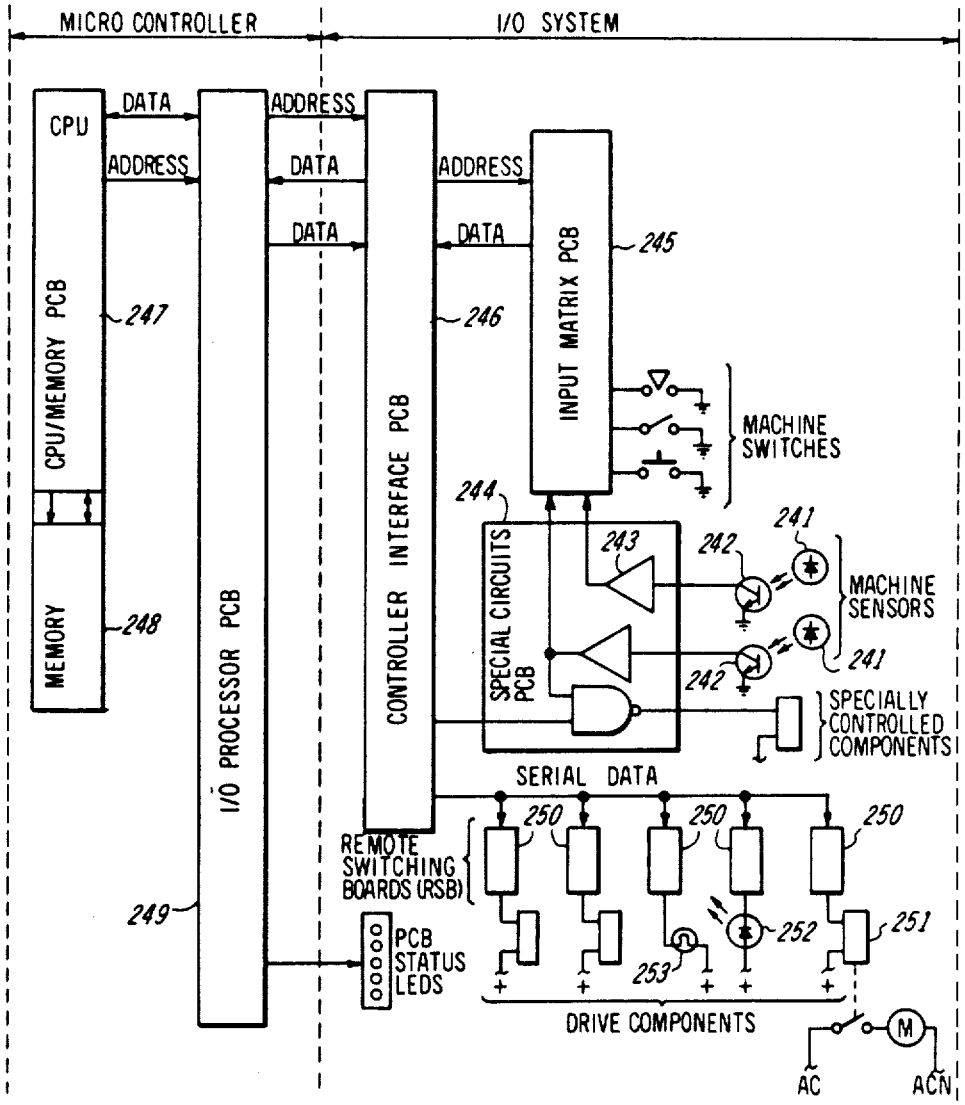
FIG. 43 is a schematic diagram of the circuit connections within the copier.

Circuit connections between the various machine sensors which provide input to the user interface computer specifying the various states within the machine are shown in FIG. 43. The machine sensors, as shown, are light emitting diodes, the light from which may or may not reach a photo sensitive transitor, depending upon whether or not the light path is blocked by a paper or piece of machinery. The signals are amplified in various buffers 243, which are part of a special circuits printed circuit board (PCB) 244, and are then formatted into words in the input matrix printed circuit board 245 for transmission through a controller interface printed circuit board 246 to the controller. The controller itself comprises a CPU 247, its associated memory 248, and an input/output processor 249. Similarly, the machine is controlled by commands originating in the CPU through a similar interface path which eventually provides data in serial form to remote switching boards 250 which may drive a variety of control mechanisms such as solenoids 251, light emitting diodes 252 which work in conjunction with light sensitive transistors, indicator lamps 253 or any other kind of control circuit including those used in the driving of motors which may be required to implement the desired function.

The computer or CPU 247 contains two types of memory, read only and read/write. Program instructions are stored in the read only memory, while the read/write memory is used to store such pieces of changing information as the operational mode which has been selected, the state of output components, copies on developer, and imaging parameters. The CPU and memory are physically located at a central location but, of course, the machine sensors and drive components are distributed throughout the machinery.

Figure 46:
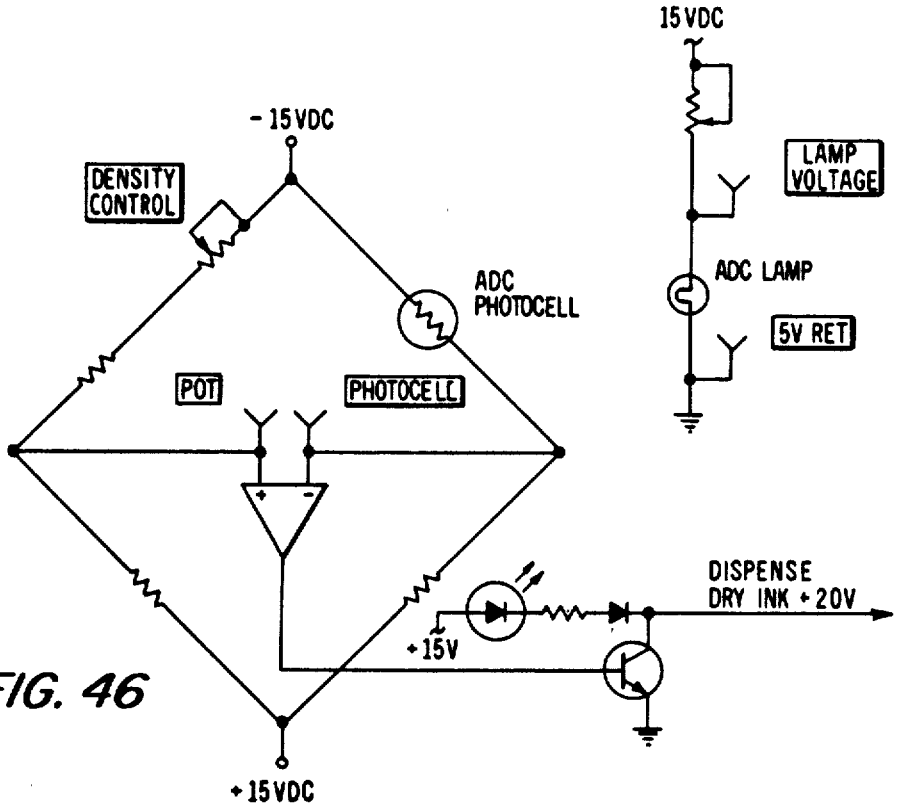
FIG. 46 is the electrical circuit used in the automatic dispensing control system.

The automatic toner dispensing system in the described copier/duplicator separates the dry ink from the developer and then, through the use of a light meter, measures the amount of dry ink in the system and sends a signal to the dispenser logic to dispense dry ink if needed. The automatic dispensing control (ADC) system for controlling the amount of dry ink in the system, FIG. 46, comprises an ADC lamp which is adjusted manually by a service representative, and an ADC photocell which forms the resistance for one leg of a resistive bridge. An unbalanced bridge provides an electrical output which is eventually applied to the dry ink dispenser, closing the loop. The operator, through the User Interface, controls the Density Control using a one-dimensional bar indicator similar to the one of FIG. 16. The result is a operator adjusted automatic density control to set the density level of the average copy.

Figure 45:
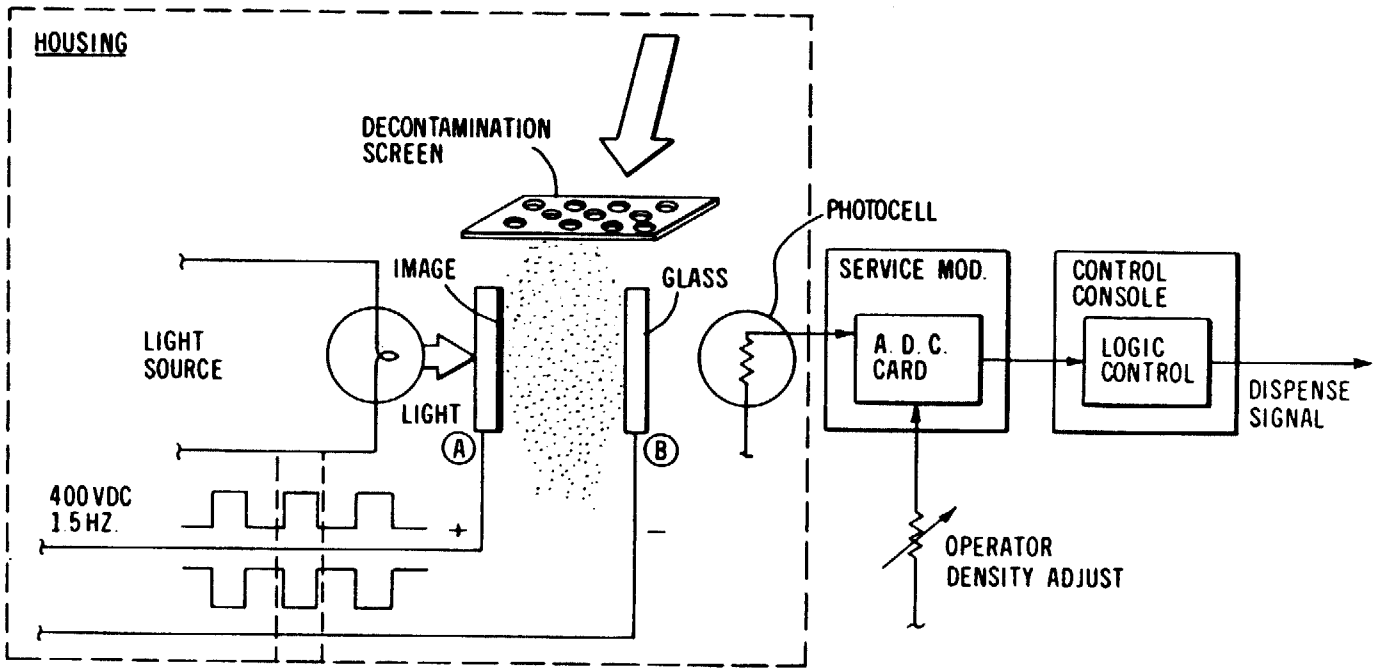
FIG. 45 is a diagram of the hardware used in the automatic dispensing control system.

The ADC system also compensates for each individual copy using the hardware of FIG. 45. Each image is projected onto the glass plates between the photocell and light source. The particular copy is therefore a function of the dry ink density and the original average color density.

Figure 47:
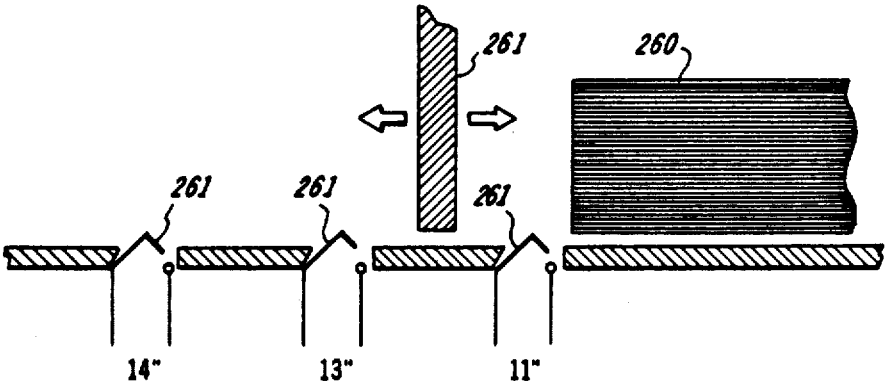
FIG. 47 is a diagram of the paper tray.

Another machine state that can be automatically monitored and displayed to the operator through the user interface is the copy paper size. Many types of sensors can be built into a paper tray; one system using micro-switches is shown in FIG. 47. When paper 260 is stacked in the tray and a paper plate 261 pushed to engage the stock, one of several micro-switches 261 will be closed informing the user interface of the copy paper size.

Figure 48:
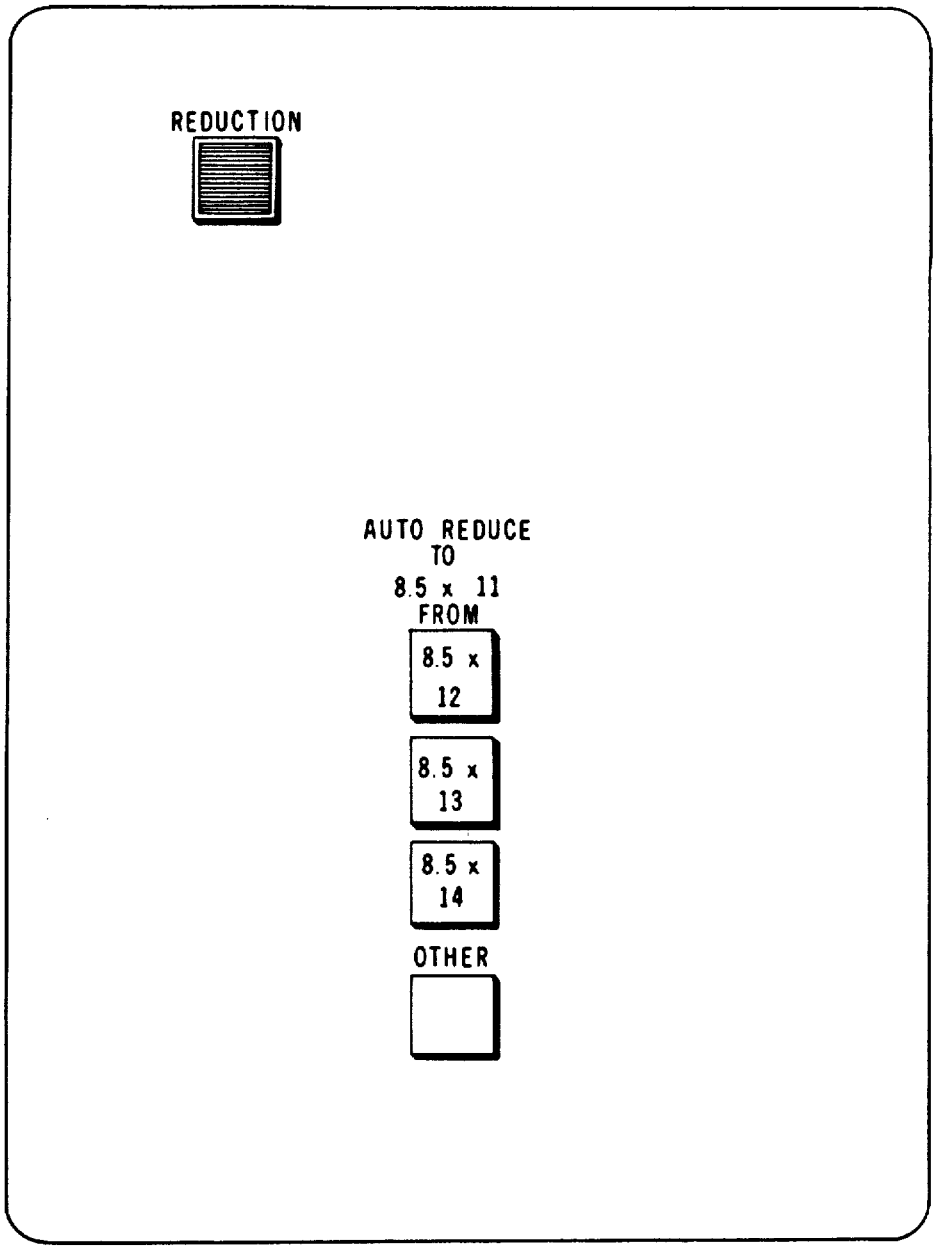
FIG. 48 is a display for automatically controlling image reduction.

At the same time, the operator places an original on the platen, and since the platen is marked in inches, the operator now knows the original size and can enter it at the display. At this point, automatic magnification or reduction by the system to fit the original image size to the copy paper is possible using a display such as the one shown in FIG. 48. The system displays the copy size (here shown as 8 5×11) and the operator touches the button corresponding to the original size. The system is now capable of setting the final length and aperture setting to accomplish the reduction or magnification.

Figure 49:
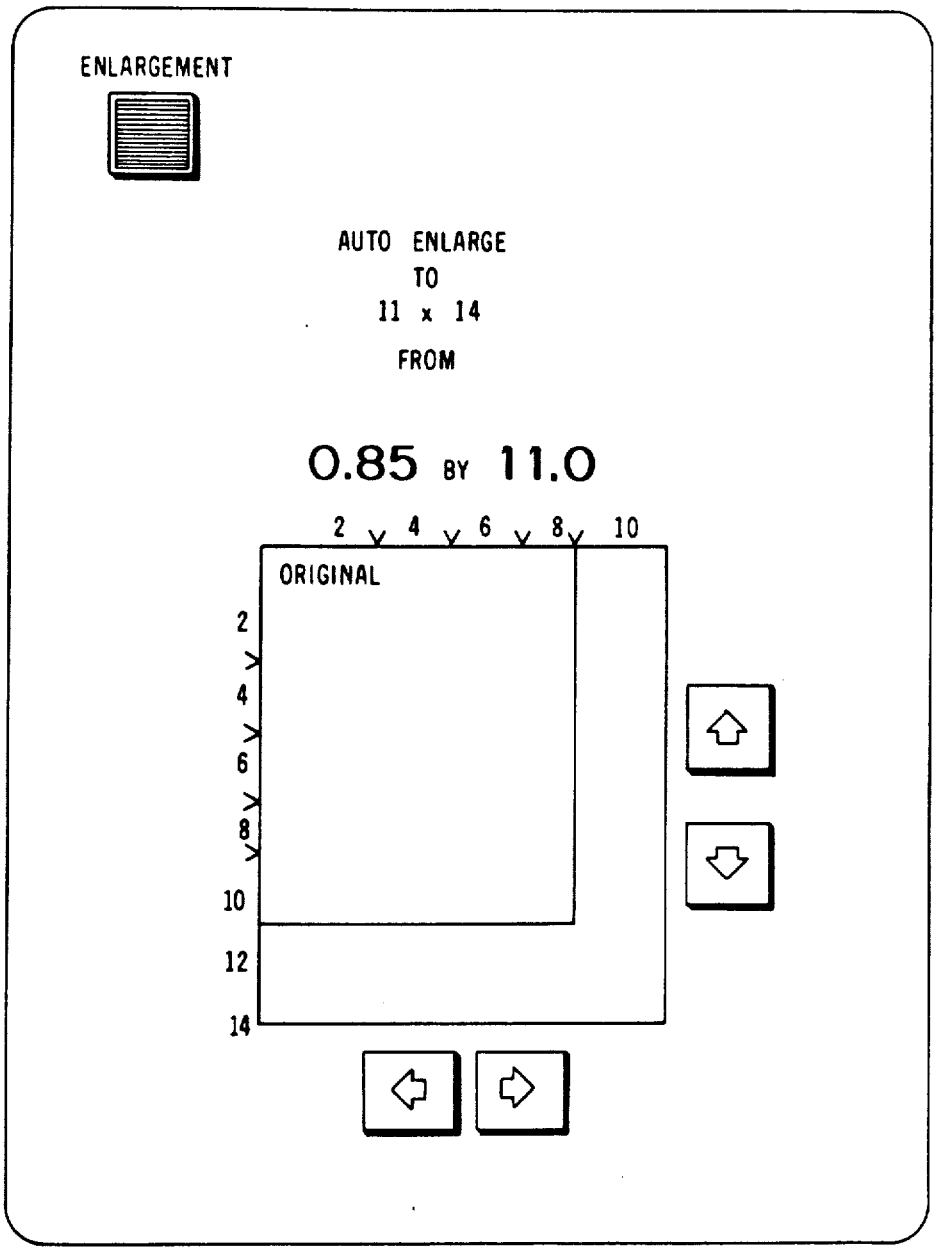
FIG. 49 is a display for manually controlling image enlargement.

An alternative is shown in FIG. 49. Here the user interface displays in text the copy size (11×14), and the original size (8½×11) as entered by the operator, and produces a display which shows the operator, in two dimensions, the image of the original on the platen.

Figure 50:
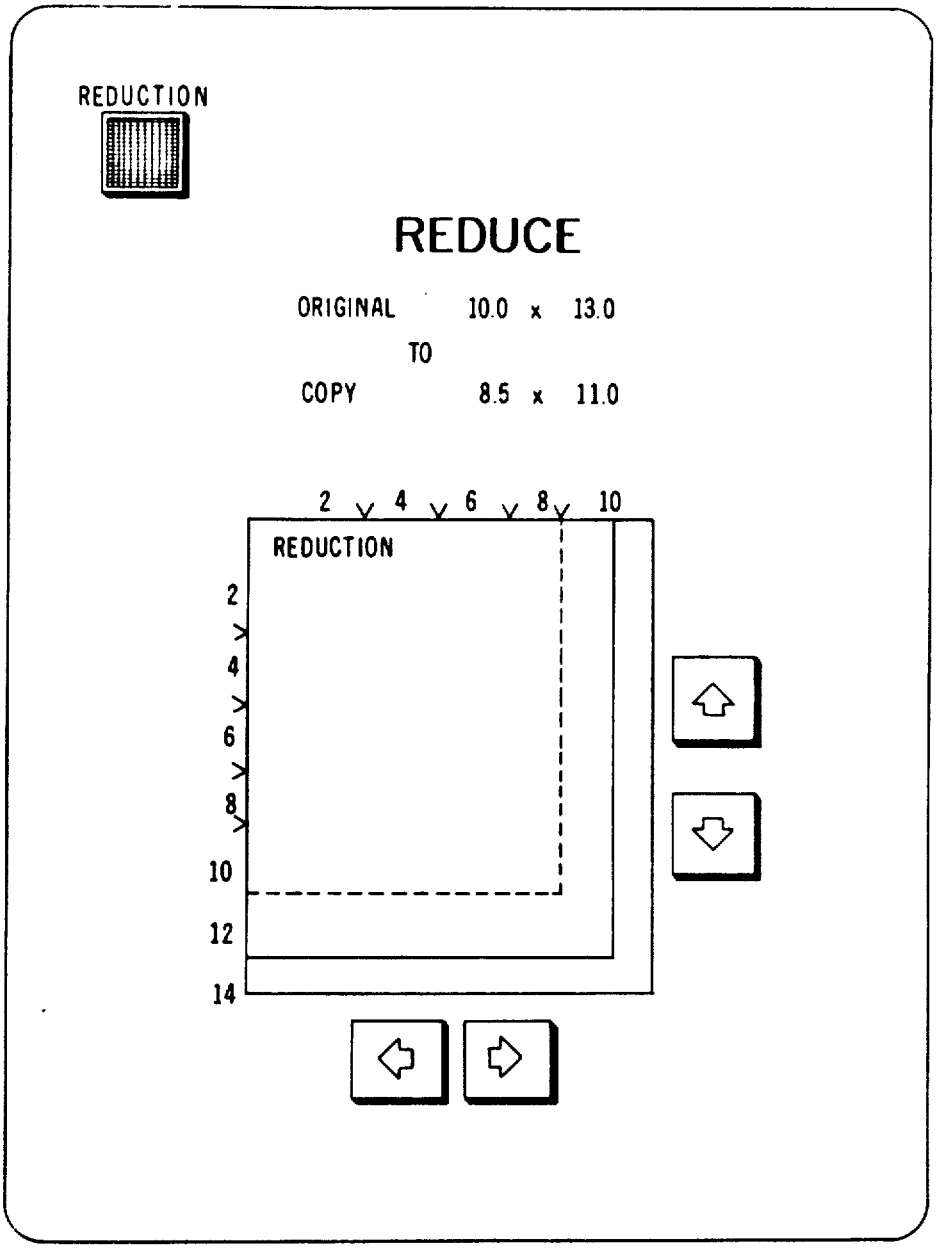
FIG. 50 is a display for manually controlling image reduction.

Another possible variation is shown in FIG. 50. Here the display shows the operator an image of an original (10×13) on the platen (11×14) and the copy (8½×11). As before, the system adjusts the optics automatically.

Figure 51:
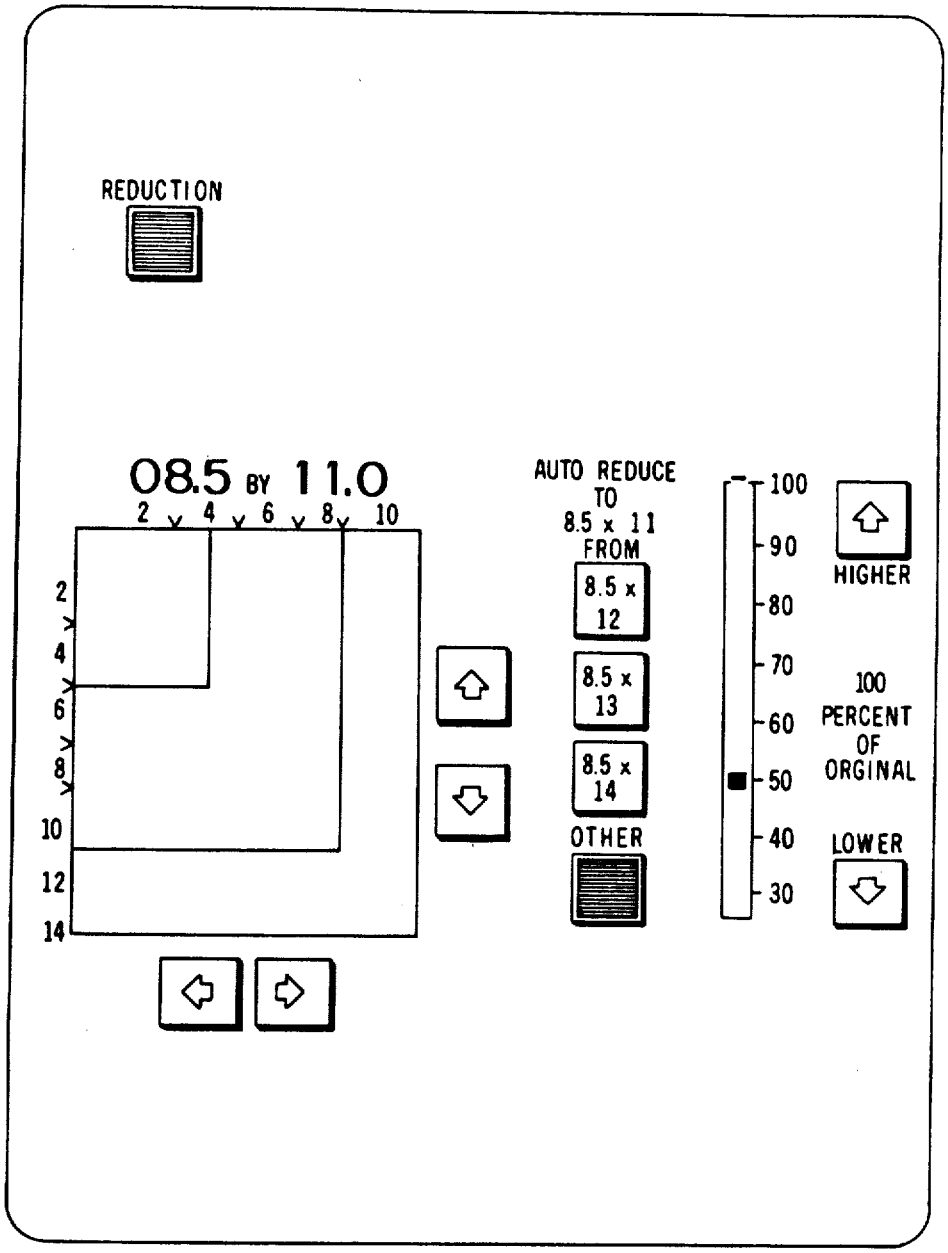
FIG. 51 is another display for manually controlling reduction.

Variable magnification and reduction are similarly produced, as shown in FIG. 51. Here the display shows the copy size (8½×11) both in text and in a two-dimensional image, and provides the operator with a control to set in the original size (here also shown as 8½×11). Also provided to the operator are "higher" and "lower" controls to increase and decrease the amount of reduction. As, for example, these controls are depressed, the bar indicator varies from 30 to 100%, the size of the displayed copy varies as shown by the display, and the optics are simultaneously adjusted to produce the displayed amount of reduction.

A shift capability is also shown in FIG. 51. As one of the arrows is depressed, the displayed copy will shift right, left, up, or down, and the system optics will simultaneously shift to produce the desired copy shift. Enlargement is similarly accomplished. Thus, automatic size changes, variable size changes, and image shift are under operator control, and are displayed to the operator in a way that allows a relatively untrained operator to manipulate a relatively powerful and feature-rich copier/duplicator.

The invention is not limited to any of the embodiments described above, but all changes and modifications thereof not constituting departures from the spirit and scope of the invention are intended to be covered by the following claims.

What is claimed is:

1. A system for controlling a copying or printing system comprising:

video means for displaying orthographic and imaginal displays to the operator, pointing means under operator control for determining a selected point on said video means, and for generating electrical signals which are a function of the location of said point on said video means, sensors in said system to sense the system status, drivers in said system to drive the system to a selected status, means for generating displays on said video means in response to said signals and the system status sensed by said sensors and for commanding said drivers in response to said pointing means electrical signals and the system status sensed by said sensors, wherein said means for generating is a computer comprising programs, said system sensors include a measuring means for determining the size of the paper loaded in the paper tray, and said means for generating, in response to said measuring means, produces a display for said video means to indicate the copy paper size.

2. The apparatus of claim 1 wherein said means for generating, in response to an appropriate signal from said pointing means, produces a display for said video means to indicate the original paper size.

3. The apparatus of claim 2 wherein said system further comprises means for adjusting the system optics in response to said measuring means and said pointing means signals to adjust the optic focal length and aperture so that the original image, through magnification or reduction, will be printed at the copy paper size.

4. The apparatus of claim 3 wherein said system further comprises means for adjusting the copier optics in response to said measuring means and said pointing means signals to adjust the optic focal length and aperture so that there will be a variable amount of magnification or reduction of the image.

5. The apparatus of claim 4 wherein said means for generating will produce for said video means a display comprising a bar indication displaying the amount of magnification or reduction.

6. The apparatus of claim 5 wherein said means for generating will produce for said video means a display comprising a two-dimensional representation of the copy size and the original image as it will look on the copy in its magnified or reduced size.

7. [The apparatus of claim 1 further comprising:] *A system for controlling a copying or printing system comprising:*

*video means for displaying orthographic and imaginal displays to the operator,*

*pointing means under operator control for determining a selected point on said video means, and for generating electrical signals which are a function of the location of said point on said video means,*

*sensors in said system to sense the system status,*

*drivers in said system to drive the system to a selected status,*

*means for generating displays on said video means in response to said signals and the system status sensed by said sensors and for commanding said drivers in response to said pointing means electrical signals and the system status sensed by said sensors,* means for determining the average light value of the current original image, toner means, responsive to said means for determining, for applying to the photoreceptor belt an amount of toner to produce a copy of pre-determined density, and density adjustment means, responsive to signals produced by said pointing means, for changing said pre-determined density value.

8. The apparatus of claim 7 wherein said means for generating displays further comprises means for generating a bar display showing the adjusted toner density value.

9. [The apparatus of claim 1] *A system for controlling a copying or printing system comprising:*

*video means for displaying orthographic and imaginal displays to the operator,*

*pointing means under operator control for determining a selected point on said video means, and for generating electrical signals which are a function of the location of said point on said video means,*

*sensors in said system to sense the system status,*

*drivers in said system to drive the system to a selected status,*

*means for generating displays on said video means in response to said signals and the system status sensed by said sensors and for commanding said drivers in response to said pointing means electrical signals and the system status sensed by said sensors.* further comprising bias means responsive to signals produced by said pointing means, for changing the bias voltage on the system developer roll to reduce the printing of paste-up lines and faint marks on the original, and wherein said means for generating generates a bar display for said video means indicating the amount of developer roll bias.

* * * * *